US012534447B2

(12) United States Patent
Abad Fuentes et al.

(10) Patent No.: US 12,534,447 B2
(45) Date of Patent: Jan. 27, 2026

(54) BIOCONJUGATES AND ANTIBODIES FOR IMMUNODETECTION ASSISTED BY DERIVATIZATION OF THE MYCOTOXIN PATULIN

(71) Applicants: CONSEJO SUPERIOR DE INVESTIGACIONES CIENTIFICAS (CSIC), Madrid (ES); UNIVERSITAT DE VALENCIA, Valencia (ES)

(72) Inventors: Antonio Abad Fuentes, Valencia (ES); Josep Vicent Mercader Badia, Valencia (ES); Hadyn Duncan, Valencia (ES); Antonio Abad Somovilla, Valencia (ES); Consuelo Agulló Blanes, Valencia (ES)

(73) Assignees: CONSEJO SUPERIOR DE INVESTIGACIONES CIENTIFICAS (CSIC), Madrid (ES); UNIVERSITAT DE VALÈNCIA, Valencia (ES)

( * ) Notice: Subject to any disclaimer, the term of this patent is extended or adjusted under 35 U.S.C. 154(b) by 765 days.

(21) Appl. No.: 17/800,401

(22) PCT Filed: Feb. 17, 2021

(86) PCT No.: PCT/ES2021/070111

§ 371 (c)(1),
(2) Date: Aug. 17, 2022

(87) PCT Pub. No.: WO2021/165557

PCT Pub. Date: Aug. 26, 2021

(65) Prior Publication Data

US 2023/0150969 A1 May 18, 2023

(30) Foreign Application Priority Data

Feb. 17, 2020 (ES) .................................. 202030133

(51) Int. Cl.

*C07D 339/08* (2006.01)
*C07K 16/44* (2006.01)
*G01N 33/02* (2006.01)

(52) U.S. Cl.

CPC ........... *C07D 339/08* (2013.01); *C07K 16/44* (2013.01); *G01N 33/025* (2013.01)

(58) Field of Classification Search

CPC ..... C07D 339/08; C07K 16/44; G01N 33/025
USPC ........................................................ 549/20
See application file for complete search history.

(56) References Cited

FOREIGN PATENT DOCUMENTS

| | | | |
|---|---|---|---|
| CN | 102081094 | A | 6/2011 |
| CN | 202710570 | U | 1/2013 |
| KR | 10-2016-0064781 | A | 6/2016 |
| WO | 2007083345 | A1 | 7/2007 |

OTHER PUBLICATIONS

H. Mhadhbi, "Studies on the affinity chromatography purification of anti-patulin polyclonal antibodies by enzyme inked immunosorbent assay and electrophoresis", Journal, 2005, 1243-1251, vol. 22, No. 12, Food Additives and Contaminants.

M. Mehl, "immunologischer nachweis des mykotoxins patulin"Journal, 1985, vol. 41, Pharmazie.

Noelia Pallares, "Mycotoxin Dietary Exposure Assessment through Fruit Juices Consumption in Children and Adult Population", Journal, 2019, 1-12, vol. 11, No. 684, Toxins.

Anna Pennacchio, "A surface plasmon resonance based biochip for the detection of patulin toxin", Journal, 2014, 1670-1675, vol. 36, Optical Materials.

Fuu Sheu, "The Synthesis of Antigens and the Production of Antibodies against Patulin Derivatives", Journal, 1999, 65-72, vol. 7, No. 1, Journal of Food and Drug Analysis.

N. F. Starodub, "Nano-Porous Silicon Based Immune Biosensor for the Control of Level of Mycotoxins", Journal, 2013, 7-15, vol. 2, No. 2, Advances in Biosensors and Bioelectronics (ABB).

Carolin Pfenning, "The mycotoxin patulin reacts with DNA bases with and without previous conjugation to GSH: Implication for related α, β-unsaturated carbonyl compounds?", Journal, 2016, 433-448, No. 90, Genotoxicity and Carcinogenicity—Arch Toxicol.

Marcella Dde Champdore, "A New Competitive Fluorescence Assay for the Detection of Patulin Toxin", Journal, 2007, 751-757, vol. 79, No. 2, Analytic Chemistry.

Ahmet Erdogan, "Patulin Contamination in Fruit Juices and Its Control Measures", Journal, 2018, 39-48, No. 14, European Journal of Science and Technology.

Riccardo Funari, "Detection of parathion and patulin by quartz-crystal microbalance functionalized by the photonics immobilization technique", Journal, 2015, 224-229, vol. 67, Biosensors and Bioelectronics.

L.J. Mcelroy, "The production of polyclonal antibodies against the mycotoxin derivative patulin hemiglutarate", Article, 1993, 861-863, vol. 39, Canadian Journal of Microbiology.

(Continued)

*Primary Examiner* — Kristin A Vajda
(74) *Attorney, Agent, or Firm* — Hayes Soloway P.C.

(57) ABSTRACT

The present invention relates to bioconjugates and labeled derivatives of the adducts formed by the reaction of patulin with benzene-1,2-dithiols or their salts. Said conjugates are suitable for the production of antibodies capable of recognizing the aforementioned patulin-(benzene-1,2-dithiols) adducts with high affinity and specificity. Likewise, the present invention also relates to the use of bioconjugates of patulin-(benzene-1,2-dithiols) adducts and of labeled derivatives thereof as assay antigens. Furthermore, the present invention also relates to immunochemical methods for the analysis of patulin, using the bioconjugates and labeled derivatives and antibodies of the invention, which include a previous step to quantitatively convert patulin into these adducts. This invention also provides a kit for analyzing patulin comprising a benzene-1,2-dithiol or its salts, antibodies against patulin-(benzene-1,2-dithiols) adducts, and assay antigens.

37 Claims, 1 Drawing Sheet

(56) References Cited

OTHER PUBLICATIONS

Xianjiang Li, "Determination of trace patulin in apple-based food matrices", Journal, 2017, 290-301, vol. 233, Food Chemistry.
Ralph Fliege, "Electrophilic Properties of Patulin. N-Acetylcysteine and Glutathione Adducts", Journal, 2000, 373-381, vol. 13, Chemical Research in Toxicology.
Valentin Jaumouille, "Coupling of B2 integrins to actin by a mechanosensitive molecular clutch drives complement receptor-mediated phagocytosis", Journal, 2019, 1357-1369, vol. 31, Nature Cell Biology.
Hee Soon Shin, "Arctigenin from Fructus Arctii (Seed of Burdock) Reinforces Intestinal Barrier Function in Caco-2 Cell Monolayers", Article, 2015, 1-7, Evidence-Based Complementary and Alternative Medicine.
Tzu-Yan Lin, "Mapping Chromatic Pathways in the Drosophila Visual System", Journal, 2016, 213-227, vol. 524, The Journal of Comparative Neurology.

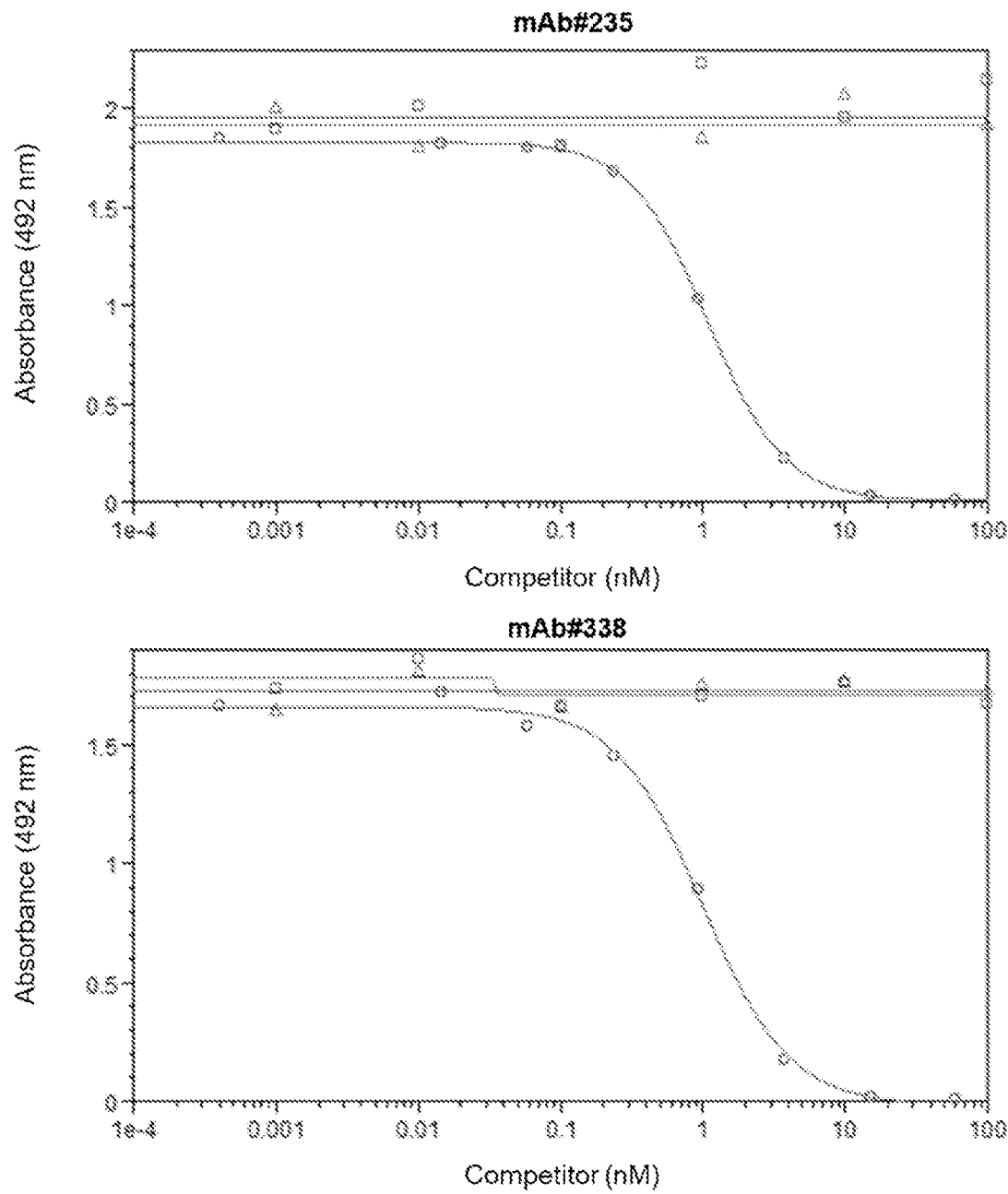

BIOCONJUGATES AND ANTIBODIES FOR IMMUNODETECTION ASSISTED BY DERIVATIZATION OF THE MYCOTOXIN PATULIN

CROSS-REFERENCE TO RELATED APPLICATIONS AND PRIORITY

This patent application claims priority from PCT Application No. PCT/ES2021/070111 filed Feb. 17, 2021, which claims priority from Spanish Patent Application No. P202030133 filed Feb. 17, 2020. Each of these patent applications are herein incorporated by reference in their entirety.

FIELD OF THE INVENTION

The present invention relates to bioconjugates and labeled derivatives of the 1:1 adducts formed by the reaction of patulin with benzene-1,2-dithiols or its salts. Said bioconjugates are suitable for the production of antibodies capable of recognizing the aforementioned patulin-(benzene-1,2-dithiols) adducts with high affinity and specificity. Likewise, the present invention also relates to the use of bioconjugates of patulin-(benzene-1,2-dithiols) adducts and of labeled derivatives thereof as assay antigens. Furthermore, the present invention also relates to immunochemical methods for the analysis of patulin, using the bioconjugates and labeled derivatives and antibodies of the invention, which include a previous simple and rapid step to quantitatively convert patulin into these adducts.

STATE OF THE ART

The presence of toxic chemical contaminants in food, particularly those intended for children's consumption, is a matter of great concern to consumers and European health authorities. According to the annual reports published by the Rapid Alert System for Food and Feed (RASFF) of the European Commission, around 45% of the informative notifications issued in recent years were related to the presence of chemical substances such as pesticides, biotoxins, veterinary drugs, food additives, etc. Among them, mycotoxins are the hazard responsible for the highest number of notifications. The presence of mycotoxins in food, feed, and beverages has been recognized as a potential threat to human and animal health, either caused by direct contamination of plant materials or their products, or by the transfer of said mycotoxins and their metabolites to animal tissues, milk, and eggs as a consequence of the ingestion of contaminated food. Due to the extreme difficulty of avoiding their presence, mycotoxins also pose an economic cost to the agri-food sector that annually represents the loss of millions of euros worldwide.

Mycotoxin contamination is considered an unpredictable problem, even when good agricultural, storage, and processing practices are implemented, posing a difficult challenge to ensure the safety of food and feed. Additionally, many mycotoxins are not easily removed during food processing due to their stability in physical and chemical treatments. The main mycotoxin-producing fungi belong to the genera *Aspergillus, Penicillium, Fusarium*, and *Alternaria*. So far, more than 400 mycotoxins with great structural diversity have been identified. The most relevant, due to their incidence and/or toxicity, are aflatoxins, ochratoxins, patulin, fumonisins, deoxynivalenol, zearalenone, T-2, and alternariol. In consequence, national and international public health authorities have adopted strict regulatory guidelines aimed at controlling the presence of the main classes of mycotoxins in food and feed.

Patulin [4-hydroxy-4H-furo[3,2c]pyran-2(6H)-one] is a toxic polyketide metabolite produced mainly by *Penicillium expansum*. Although it can occur in infected fruits, grains, and other foods, the main route of exposure to patulin is through the ingestion of infected apples and some of its derivatives, such as juices and compotes. The Joint FAO/WHO (Food and Agriculture Organization of the United Nations/World Health Organization) Committee of Experts on Food Additives (JECFA) established in 1995 a provisional maximum tolerable daily intake (PMTDI) for patulin of 0.4 μg/kg of body weight/day. Based on this recommendation, the European Union has established maximum allowed levels of patulin of 50 μg/kg for juices, 25 μg/kg for apples, and 10 μg/kg for foodstuffs intended for child consumption. Other national bodies, such as the United States Food and Drug Administration (USFDA), the Ministry of Health of the People's Republic of China, the Ministry of Health of Canada, or the Ministry of Health of the Russian Federation, among others, have adopted similar criteria. Various international studies on the incidence of patulin in apples and apple-derived products show that a very high percentage of the samples analyzed contained detectable concentrations of patulin. In many cases, those levels are greater than 50% of the established limit, and occasionally exceedances are reported [Erdoğan et al. al., *Eur. J. Sci. Technology,* 2018, 14, 39-48; Pallarés et al., *Toxins,* 2019, 11, 684]. More importantly, there have been a series of alerts and product recalls in recent years due to the presence of excessive levels of patulin in apple-derived products in Europe, the United States, Canada, Australia, Hong Kong, and others. Therefore, the control of patulin in food is essential for both food safety reasons and quality control of raw materials.

Analytical methods are deemed essential tools for regulatory bodies to ensure high standards in food and feed safety. The procedures for the determination of mycotoxins are essentially of two types: chromatographic methods and molecular recognition techniques. Chromatographic methods are considered the reference techniques, since they are capable of simultaneously determining several mycotoxins with great sensitivity, selectivity, and reproducibility. Concerning patulin, the method adopted by the AOAC (Association of Official Analytical Chemists) is high performance liquid chromatography coupled with ultraviolet detection (HPLC-UV, official methods 995.10 and 2000.02). The main disadvantage of this method is the lack of selectivity, since compounds such as 5-hydroxymethylfurfural and phenolic compounds, both present in apple-based products, can interfere with the measurement. Other instrumental techniques that have also been used to determine patulin are capillary electrophoresis (CE), micellar electrokinetic capillary chromatography (MEKC), gas chromatography (GC) with derivatization, and HPLC coupled to mass spectrometry detection (HPLC-MS) [Li et al., *Food Chem.,* 2017, 233, 290-301]. Despite their high reliability and precision, instrumental techniques have some drawbacks, the most notable of which is the need to perform the analysis in well-equipped facilities with highly qualified personnel to handle the sophisticated instrumentation that is required. Other drawbacks are associated with the complexity of the matrices to be analyzed, which entails the need to implement prior steps for sample preparation, purification, and concentration.

On the other hand, analytical techniques based on molecular receptors, be they aptamers, molecularly-imprinted polymers, membrane proteins or, especially, antibodies, are deemed the best option when the analysis of large number of samples is required in a short time, in situ, and/or in low-resource settings, and for the selective purification, concentration, and cleaning of samples before the determination thereof by instrumental methods. Immunoanalytical methods are based on the high affinity, selective, reversible, and non-covalent binding between a target substance (analyte) and an antibody. Depending on the analytical requirements, the antibodies van be implemented in a wide variety of assay formats, such as enzyme-linked immunosorbent assays (ELISA), immunoaffinity columns, lateral-flow immunochromatography (immunostrips), biosensors, microarrays, and flow injection systems. In this regard, mycotoxins are the group of chemical contaminants potentially present in food and feed for which immunoanalytical techniques enjoy the highest degree of implementation and acceptance in analytical laboratories worldwide, in some cases even endorsed and recommended by regulatory agencies. In fact, a large number of immunodiagnostic companies are currently marketing rapid methods for the control and detection of several mycotoxins (Abraxis, Europroxima, Zeulab, BiooScientific, r-Biopharm, Romer Labs, Neogen, Creative Diagnostic, etc.). However, none of these companies market rapid kits for the determination of patulin, and this is due to the lack of antibodies capable of recognizing this mycotoxin with the affinity and specificity required.

There are some examples in the scientific literature reporting approaches to obtain anti-patulin antibodies. Most of these articles use protein conjugates of patulin-hemiglutarate [Seong et al., KR20160064781, 6 Aug. 2016; Weimin et al., CN102081094A, 6 Jan. 2011; Mhadbhi et al., *Food Addit. Contam.*, 2005, 22, 1243-1251; McElroy et al., *Can. J. Microbiol*, 1993, 39, 861-863], or patulin-hemisuccinate [Mehl et al., *Pharmazie*, 1986, 41, 147-148; Sheu et al., *Yaowu Shipin Fenxi*, 1999, 7, 65-72] as immunogens. In all those cases, the unsatisfactory results that were obtained can be attributed to the small size and low structural complexity of the patulin molecule (its molecular mass is 154.12), and especially to its electrophilic reactivity, which allows it to easily react with thiolated nucleophiles such as glutathione and proteins with free residues of cysteine [Fliege et al., *Chem. Res. Toxicol.*, 2000, 13, 373-381; Pfenning et al., *Arch. Toxicol.*, 2016, 90, 433-448]. Accordingly, the epitopes of the patulin-functionalized analogues are very probably destroyed or modified after in vivo exposure of the bioconjugate to the immune system during vaccination. Other authors have evaluated obtaining anti-patulin antibodies using for immunization structural analogues that maintain the original skeleton of the natural mycotoxin, but in which some of the functional groups have been modified to reduce its reactivity and increase its chemical stability [D'Auria et al., WO 2007/083345 A1, 26 Jul. 2007; de Champdore et al., *Anal. Chem.*, 2007, 79, 751-757]. Nor did this strategy lead to anti-patulin antibodies suitable for their incorporation into commercial analytical systems. The use of anti-patulin antibodies produced according to some of the above-mentioned strategies for the development of biosensor has also been described. Specifically, it describes a nano-porous silicon-based optical immunosensor [Starodub et al., *Adv. Biosens. Bioelectron.*, 2013, 2], a surface plasmon resonance-based biochip [Pennachio et al., *Opt. Mater,* 2014, 36, 1670-1675], and a quartz crystal microbalance based on the photonic immobilization of anti-patulin antibodies [Funari et al., *Biosens. Bioelectron.*, 2015, 67, 224-229]. Regardless of whether these analytical systems actually possess the suitable sensitivity for the determination of patulin at the required levels, their use also has most of the drawbacks previously mentioned for instrumental methods based on chromatographic techniques.

Therefore, and in light of the state of the art, there is an outstanding need for immunoreagents (bioconjugates and antibodies) that enable the development of simple, fast, reliable, and high-throughput methodologies for in situ immunodetection of patulin and/or in low-resource environments; methodologies that will allow satisfying the demands in this regard of the agri-food sector and immunodiagnostic companies.

DESCRIPTION OF THE INVENTION

The present invention overcomes many of the problems in the state of the art by providing a novel method for a simple, rapid, inexpensive, and high-throughput immunoassay for the mycotoxin patulin.

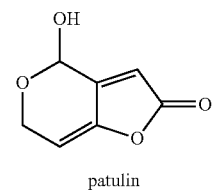 [SMILES: O=C1C=C2C(=CCOC2O)O1]

patulin

The foundation of the invention resides in the discovery, not previously known, of the particular reaction that patulin undergoes with benzene-1,2-dithiols of general structure (i) or its salts,

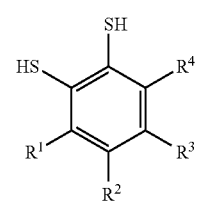

(i)

wherein $R^1$, $R^2$, $R^3$, and $R^4$ are selected from H, substituted or unsubstituted aryl groups, linear or branched alkyl groups of 1 to 6 carbon atoms, OMe, OEt, OPr, C≡N, $CO_2H$, $CO_2$-alkyl, $NO_2$, F, Cl, Br, and I.

When patulin in an aqueous solution is treated with at least one equivalent of a benzene-1,2-dithiol of general structure (i) or its salts, at temperatures between −20° C. and 60° C., the formation of a single 1:1 adduct between both compounds that responds to the structure of general formula (ii), wherein $R^1$, $R^2$, $R^3$, and $R^4$ are as have been defined above for the structure (i), is produced takes place in few minutes and with very high yields, in many cases practically quantitatively.

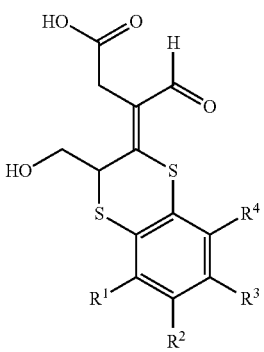

(ii)

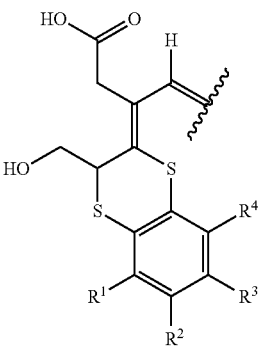

R-II

This novel discovery is particularly relevant, since it contrasts with the known reaction that patulin undergoes with monothiols, both with benzene-1-thiols and with alkyl-1-thiols [Fliege et al., *Chem. Res. Toxicol.,* 2000, 13, 373-381], in which a mixture of up to 16 different products is formed, among which the patulin-monothiol adducts with molar ratios of 1:1, 1:2 and 1:3 are identified.

The discovery of the reaction between patulin and benzene-1,2-dithiols of general structure (i) or their salts, has made it possible to obtain the adducts of formula (ii), as well as the bioconjugate compounds derived from said adducts from which it has been possible to generate antibodies capable of specifically recognizing the formed stable patulin adducts of structure (ii), thus overcoming the aforementioned problems related to the small size, low structural complexity, and high reactivity of patulin, which greatly hinder the induction of an adequate immune response against this mycotoxin. These antibodies are useful for the development of robust and sensitive immunoanalytical methods for the determination of patulin. Said methods include a previous simple and rapid step to quantitatively convert patulin into a predefined derivative of general structure (ii).

Therefore, a first aspect of the present invention relates to a bioconjugate of general formula (I)

[T-L-Z]$_m$—P  (I)

where:

T is selected from the group consisting of the radicals R-I and R-II, wherein R$^1$, R$^2$, R$^3$, and R$^4$ are independently selected from H, substituted or unsubstituted aryl groups, linear or branched alkyl groups of 1 to 6 carbon atoms, OMe, OEt, OPr, C≡N, CO$_2$H, CO$_2$-alkyl of 1 to 6 carbon atoms, NO$_2$, NH$_2$, F, Cl, Br, and I.

R-I

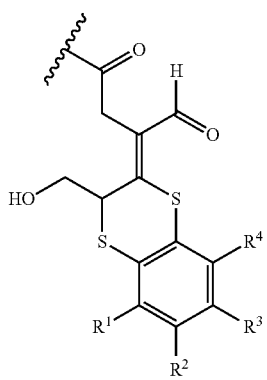

L is a hydrocarbon chain, saturated or unsaturated, of 0 to 14 carbon atoms, where the chain is linear or branched, and said hydrocarbon chain comprises the substitution of between 0 and 7 carbon atoms by heteroatoms, which are selected from the group consisting of S, O and N; preferably, L is a saturated linear hydrocarbon chain of 0 to 7 carbon atoms and optionally the hydrocarbon chain comprises the substitution of 0 to 3 carbon atoms by heteroatoms selected from the group consisting of O and N; and more preferably, L is a saturated linear hydrocarbon chain of 0 to 3 carbon atoms and optionally the hydrocarbon chain comprises the substitution of 0 to 2 carbon atoms by heteroatoms selected from the group consisting of O and N; and Z is a functional group selected from:
—NH—, —NH(C=O)—, —NH(C=O)O—, —(O=O)NH—, —(C=O)O—, —O(O=O)—, —O(O=O)O—, —O(C=O)NH—, —S—,

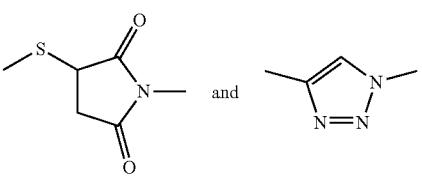

In a preferred embodiment, Z is selected from the group consisting of:
—NH—, —NH(C=O)—, —(C=O)NH—,

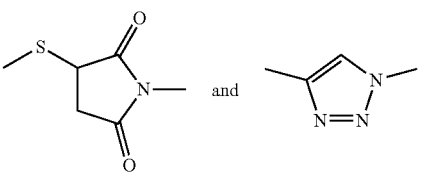

More preferably, Z is —(C=O)NH—

P it is a natural or synthetic peptide or polypeptide, or a protein, with a molecular weight greater than 2000 daltons, preferably greater than 15000 daltons, for example, greater than 35000 daltons.

The term "bioconjugate" refers in the present invention to the complex formed by the covalent binding of a hapten to a peptide, polypeptide, or protein.

The term "hapten", as used in the present invention, refers to a low molecular weight molecule that alone is not capable of generating an immune response in an animal and needs to be linked to a carrier molecule to generate an immune response. Therefore, the hapten is a non-immunogenic small molecule with the ability to induce the formation of antibodies when it is covalently bound to a carrier molecule, in particular a carrier protein. In the present invention, the haptens are the adducts of formula (ii) or functionalized derivatives thereof, that is, structural analogs of these adducts that incorporate a functional group capable of being used for conjugation to a P carrier.

According to another preferred embodiment of the present invention, the bioconjugate of formula (I) described in this patent application is characterized in that P is selected from the group consisting of albumin, thyroglobulin, hemocyanin, beta-galactosidase, phosphatase, peroxidase, and oxidase. More preferably P is albumin, which can be egg albumin or serum albumin, or peroxidase; and m is a number with a value between 1 and 500; preferably m is a value between 1 and 50.

The value of m indicates the degree of conjugation, that is, the molar ratio between the fraction derived from the compound of formula T-L-Z and P, in the resulting bioconjugate of formula (I).

According to another preferred embodiment of the present invention, the bioconjugate of formula (I) is a bioconjugate of formula (Ia)

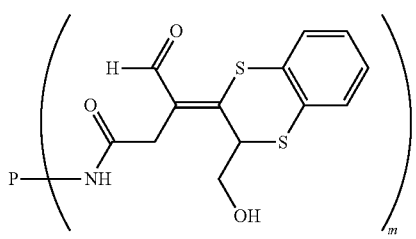

(Ia)

where:

P and m have been defined above. Preferably, P is albumin or peroxidase and m is a value selected between 1 and 50.

According to another preferred embodiment, the bioconjugate of formula (I) is a bioconjugate of formula (Ib)

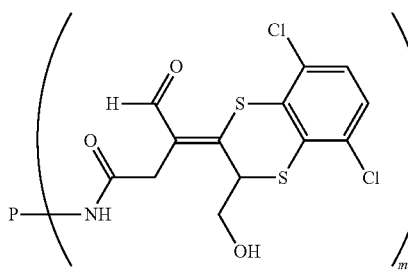

(Ib)

where:

P and m have been defined above. Preferably, P is albumin or peroxidase and m is a value selected between 1 and 50.

According to another preferred embodiment, the bioconjugate of formula (I) is a bioconjugate of formula (Ic)

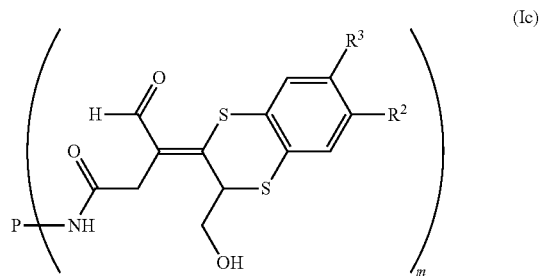

(Ic)

where $R^2$ is $CH_3$ and $R^3$ is H, or $R^2$ is H and $R^3$ is $CH_3$,

P and m have been defined above. Preferably, P is albumin or peroxidase and m is a value selected between 1 and 50.

According to another preferred embodiment, the bioconjugate of formula (I) is a bioconjugate of formula (Id)

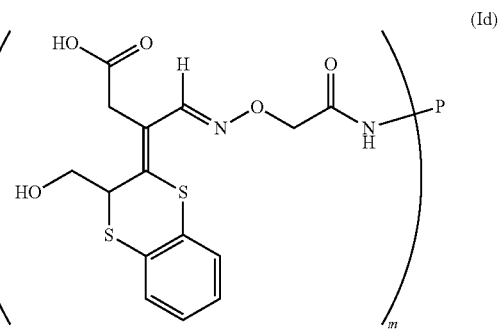

(Id)

where:

P and m have been defined above. Preferably, P is albumin or peroxidase and m is a value selected between 1 and 50.

According to another preferred embodiment, the bioconjugate of formula (I) is a bioconjugate of formula (Ie)

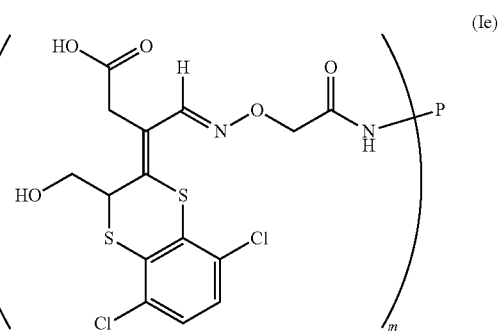

(Ie)

where:

P and m have been defined above. Preferably, P is albumin or peroxidase and m is a value selected between 1 and 50.

According to another preferred embodiment, the bioconjugate of formula (I) is a bioconjugate of formula (If)

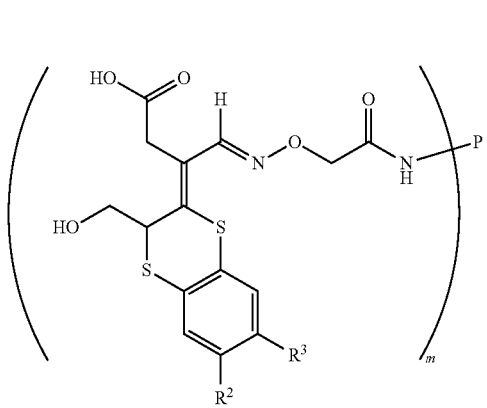

(If)

where $R^2$ is $CH_3$ and $R^3$ is H, or $R^2$ is H and $R^3$ is $CH_3$.

P and m have been defined above. Preferably, P is albumin or peroxidase and m is a value selected between 1 and 50.

According to another preferred embodiment, the bioconjugate of formula (I) is a bioconjugate of formula (Ig)

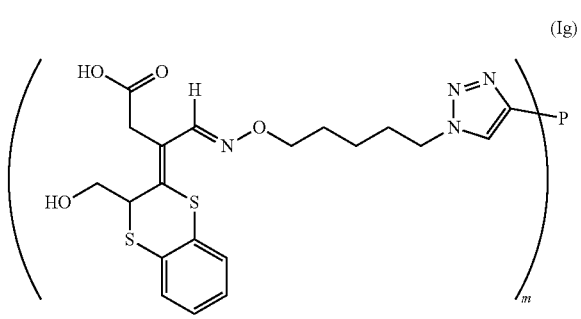

(Ig)

where:

P and m have been defined above. Preferably, P is albumin or peroxidase and m is a value selected between 1 and 50.

According to another preferred embodiment, the bioconjugate of formula (I) is a bioconjugate of formula (Ih)

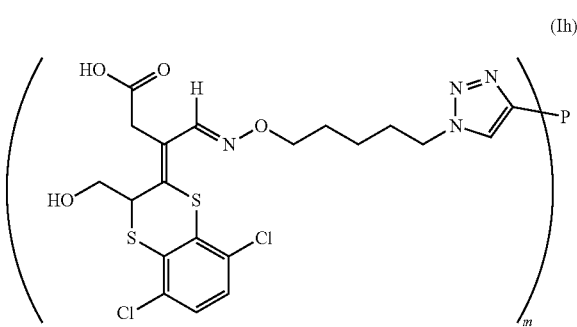

(Ih)

where:

P and m have been defined above. Preferably, P is albumin or peroxidase and m is a value selected between 1 and 50.

According to another preferred embodiment, the bioconjugate of formula (I) is a bioconjugate of formula (Ii)

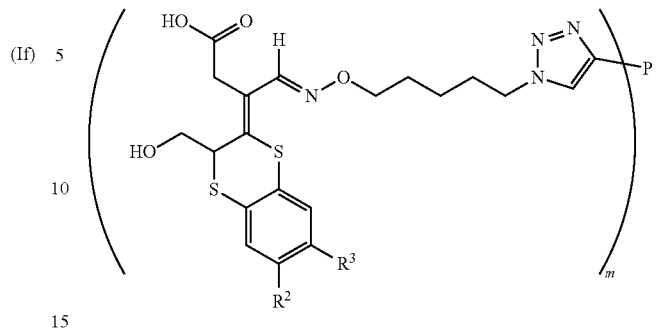

(Ii)

where $R^2$ is $CH_3$ and $R^3$ is H, or $R^2$ is H and $R^3$ is $CH_3$.

P and m have been defined above. Preferably, P is albumin or peroxidase and m is a value selected between 1 and 50.

The bioconjugate of formula (I) of the present invention can be obtained by a process that comprises reacting an adduct of formula (ii), resulting from the reaction of patulin with a benzene-1,2-dithiol, or a functionalized derivative thereof (hapten), with P, a natural or synthetic peptide or polypeptide, or a protein, of molecular weight greater than 2000 daltons, by methods widely known in the state of the art.

In another embodiment of the present invention, when the carrier material is a detectable label, the derivative is a compound of formula (II):

$$[T-L-Z]_n-Q \qquad (II)$$

where T, L, and Z have the same meaning defined above for the bioconjugate of formula (I);

Q is a detectable label; and n is a number with a value between 1 and 500; preferably, n is a value selected between 1 and 50.

In the present invention, "detectable label" is understood as any molecule or fragment that gives rise to a measurable signal by any type of analytical technique such as spectroscopic, photochemical, biochemical, immunochemical, or chemical methods. In the present invention, Q identifies a fragment or a detector, label, or tracer chemical molecule.

In a preferred embodiment, Q is an enzyme, biotin, a luminescent compound, a fluorophore, a label coupled to an indirect detection system, micro- or nanoparticles, or others. Preferably, Q is selected from the group consisting of peroxidase, alkaline phosphatase, biotin, fluorescein or any one of its derivatives, a cyanine fluorophore, a rhodamine fluorophore, a coumarin fluorophore, a ruthenium bipyryl, luciferin, or any one of its derivatives, an acridinium ester, quantum nanoparticles (quantum dots), and micro- or nanoparticles of colloidal gold, carbon, or latex.

According to a preferred embodiment, the derivative of formula (II) is a derivative of formula (IIa)

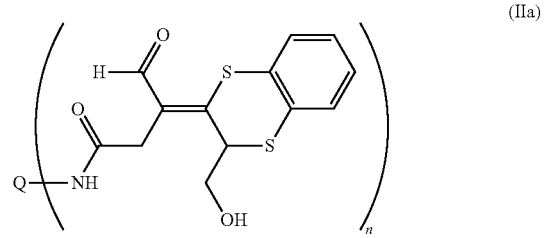

(IIa)

where Q is selected from the group consisting of peroxidase, biotin, fluorescein, or gold nanoparticles, and n is a value selected between 1 and 10.

According to a preferred embodiment, the derivative of formula (II) is a derivative of formula (IIb)

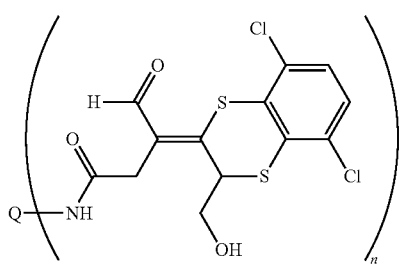
(IIb)

where Q is selected from the group consisting of peroxidase, biotin, fluorescein, or gold nanoparticles, and n is a value selected between 1 and 10.

According to a preferred embodiment, the derivative of formula (II) is a bioconjugate of formula (IIc)

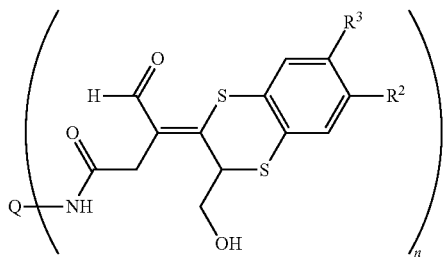
(IIc)

where $R^2$ is $CH_3$ and $R^3$ is H, or $R^2$ is H and $R^3$ is $CH_3$.

Q is selected from the group consisting of peroxidase, biotin, fluorescein, or gold nanoparticles, and n is a value selected between 1 and 10.

According to a preferred embodiment, the derivative of formula (II) is a derivative of formula (IId)

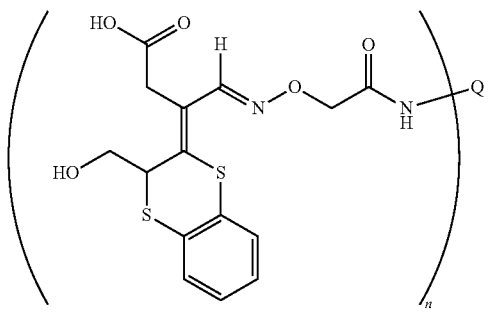
(IId)

where Q is selected from the group consisting of peroxidase, biotin, fluorescein, or gold nanoparticles, and n is a value selected between 1 and 10.

According to a preferred embodiment, the derivative of formula (II) is a derivative of formula (IIe)

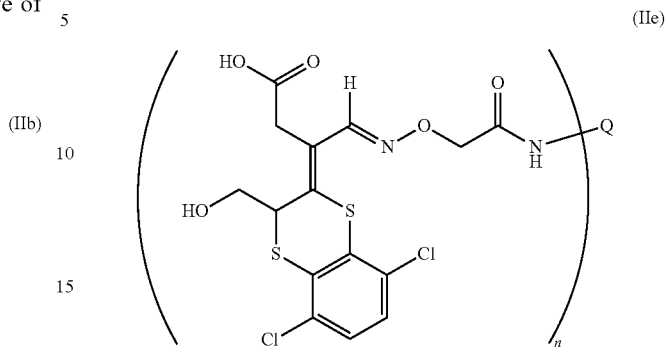
(IIe)

where Q is selected from the group consisting of peroxidase, biotin, fluorescein, or gold nanoparticles, and n is a value selected between 1 and 10.

According to a preferred embodiment, the derivative of formula (II) is a bioconjugate of formula (IIf)

(IIf)

where $R^2$ is $CH_3$ and $R^3$ is H, or $R^2$ is H and $R^3$ is $CH_3$.

Q is selected from the group consisting of peroxidase, biotin, fluorescein, or gold nanoparticles, and n is a value selected between 1 and 10.

According to a preferred embodiment, the derivative of formula (II) is a derivative of formula (IIg)

(IIg)

where Q is selected from the group consisting of peroxidase, biotin, fluorescein, or gold nanoparticles, and n is a value selected between 1 and 10.

According to a preferred embodiment, the derivative of formula (II) is a derivative of formula (IIh)

(IIh)

where Q is selected from the group consisting of peroxidase, biotin, fluorescein, or gold nanoparticles, and n is a value selected between 1 and 10.

According to a preferred embodiment, the derivative of formula (II) is a bioconjugate of formula (Ili)

(Ili)

where $R^2$ is $CH_3$ and $R^3$ is H, or $R^2$ is H and $R^3$ is $CH_3$.

Q is selected from the group consisting of peroxidase, biotin, fluorescein, or gold nanoparticles, and n is a value selected between 1 and 10.

The labeled derivative of formula (II) of the present invention can be obtained by a process that comprises reacting an adduct of formula (ii), resulting from the reaction of a benzene-1,2-dithiol with patulin, or a functionalized derivative of said adduct (hapten), with Q, a detectable label, by methods widely known in the state of the art.

To obtain the bioconjugates of formula (I) and the labeled derivatives of formula (II), some of the functional groups of the adduct can be used, preferably the $CO_2H$ group, for direct conjugation to a P carrier or Q label. Functionalized derivatives of said adduct can also be prepared, that is, structural analogs of this adduct that incorporate a functional group capable of being used for conjugation to a P carrier or Q label. This functional group is separated from the molecular backbone of the adduct by a spacer L. The position of incorporation of the functional group to the structure of the adduct for conjugation is not an obvious aspect and can be critical for the viability of the bioconjugates of formula (I) as inducers of the production of antibodies of suitable affinity and selectivity against the adducts of formula (ii), and even for the viability of the bioconjugates of formula (I) or of labeled derivatives of formula (II) to act as competing molecules that allow the development of a sensitive and specific immunoanalytical method for said adduct and indirectly for the mycotoxin patulin.

The bioconjugate of formula (I) of the present invention can be used for the production of antibodies capable of recognizing an adduct of formula (ii). The bioconjugate of formula (I) of the present invention can also be used, together with an antibody capable of recognizing an adduct of formula (ii), to determine or detect the presence of the mycotoxin patulin in a sample by immunoanalytical methods, as shall be explained later in the method of the invention. In addition, the labeled derivatives of formula (II) can be used, together with an antibody capable of recognizing an adduct of formula (ii), to determine or detect the presence of the mycotoxin patulin in a sample by immunoanalytical methods, as shall be explained later in the method of the invention.

Therefore, another aspect of the invention relates to the use of the bioconjugate of formula (I) defined above for obtaining antibodies.

Likewise, another aspect of the invention relates to the use of the bioconjugate of formula (I) and of the labeled derivative of formula (II), together with an antibody capable of recognizing an adduct of formula (ii), to detect the presence of patulin in a sample by immunoanalytical methods.

In the context of this invention, the term "antibody" refers to an immunoglobulin produced specifically by an animal or a hybrid cell (such as a hybridoma) against the immunogen of the invention (bioconjugate of the invention).

Therefore, another aspect of the present invention relates to an antibody (hereinafter antibody of the invention) generated in response to a bioconjugate of the invention, in particular to the bioconjugate of formula (I). More preferably, the antibodies are generated in response to the bioconjugate of formula (Ia), (Ib), (Ic), (Id), (Ie), (If), (Ig), (Ih) or (Ii), more preferably to the bioconjugate of formula (Ie).

The procedure for obtaining the antibodies of the invention from the bioconjugates of the invention can be carried out by immunization methods widely known in the state of the art. Antibodies generated from a bioconjugate of the present invention can be polyclonal antibodies, monoclonal antibodies, recombinant antibodies, or antibody fragments. The antibodies of the invention have high affinity and specificity towards an adduct of formula (ii), resulting from the reaction of a benzene-1,2-dithiol with patulin.

"Monoclonal antibodies" are homogeneous populations of identical antibodies, produced by a hybrid cell product of the fusion of a clone of B lymphocytes descended from a single stem cell and a tumor plasma cell, which are directed against a single site or antigenic determinant. "Polyclonal antibodies" include heterogeneous populations of antibodies that are directed against different antigenic determinants. "Recombinant antibodies" are those in which genetic engineering or molecular biology techniques have been used to obtain them.

Another aspect of the present invention relates to an antiserum (hereinafter antiserum of the invention) comprising the antibodies of the invention.

The term "antiserum" refers to a serum obtained after immunization of an animal with an immunogen. The antiserum comprises specific antibodies of said immunogen generated after the immune response produced in the animal. In the context of the present invention, the immunogen is the bioconjugate of the invention and the antiserum comprises specific antibodies generated against the bioconjugate of the invention, the antibodies of the invention.

Another aspect of the present invention relates to a method of in vitro analysis of patulin in a sample comprising the use of an antibody (or an antiserum) of the invention. In a preferred embodiment, said method comprises the following steps:

a) put in contact the sample to be analyzed with a benzene-1,2-dithiol of general structure (i) or its salts;

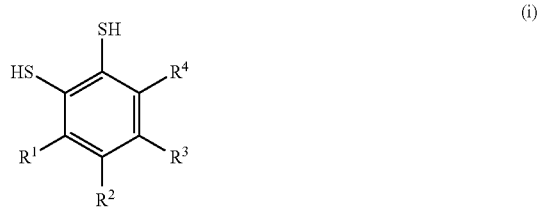

(i)

wherein $R^1$, $R^2$, $R^3$, and $R^4$ are selected from H, substituted or unsubstituted aryl groups, linear or branched alkyl groups of 1 to 6 carbon atoms, OMe, OEt, OPr, C≡N, $CO_2H$, $CO_2$—alkyl of 1 to 6 carbon atoms, $NO_2$, F, Cl, Br, and I.

b) incubate the sample of step (a) so that, in the event that the sample contains patulin, the chemical reaction of formation of the adduct of formula (ii) takes place;

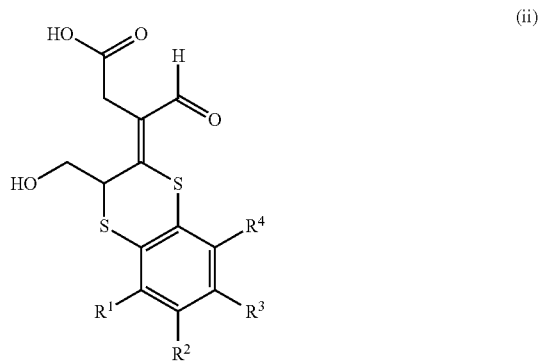

(ii)

wherein $R^1$, $R^2$, $R^3$, and $R^4$ are as defined for structure (i).

c) put in contact the sample of step (b) with the antibody (or antiserum) of the invention, which is obtained from a bioconjugate of formula (I);

d) incubate the sample and the antibody (or antiserum) of step (c)

e) determine if an immunochemical reaction has occurred between the adduct of formula (ii) and the antibody (or antiserum) of the invention after step (d), so that if an immunochemical reaction is detected, it is concluded that there is patulin in the sample and, if not, it is concluded that there is no patulin in said sample.

In step d) an immunochemical reaction will occur between the adduct (ii) and the antibody if patulin is present in the original sample. Otherwise, such reaction will not take place.

The method of the present invention allows the quantitative determination or qualitative analysis of the content of the mycotoxin patulin in a sample. Likewise, the method of the present invention enables the analysis of the patulin content in different types of samples, for example, food samples, environmental samples such as water and soil, and isolated biological samples such as saliva, urine, or serum. Preferably, the present invention provides a method of in vitro analysis of patulin in fruits and derivatives and more preferably in apples and products derived therefrom, such as juices and compotes.

The determination of the immunochemical reaction in step (e) is carried out by methods widely known in the state of the art. Said methods include, but are not limited to, different immunoassay formats, such as ELISA (Enzyme-Linked Immunosorbent Assay), LFIA (Lateral-Flow ImmunoAssay), Western Blot, radioimmunoassay (RIA), biosensors, immunochromatography, and microarrays.

According to a preferred embodiment, the incubation times of steps (b) and (d) are greater than 5 minutes.

In a preferred embodiment, step b) is carried out at temperatures between −20° C. and 60° C., According to another preferred embodiment, the determination of the immunochemical reaction in step (e) is carried out by means of a competitive immunoassay, using as a competitor a bioconjugate of formula (I) or a labeled derivative of formula (II). Preferably, the competitive immunoassay is of the ELISA type or immunochromatographic.

The term "immunoassay" refers to an analytical assay in which an immunochemical reaction occurs for the detection or quantification of an analyte. Competitive immunoassays are those in which the analyte competes with another molecule for binding to the antibody.

The term "antigen" in this patent application refers to a molecule capable of specifically interacting with an antibody. The immunochemical interaction or reaction consists of the specific and non-covalent binding between an antibody and an antigen, which may be the analyte or an assay antigen.

In the present specification, the term "assay antigen", "enzyme antigen" or "tracer" refers to a bioconjugate of formula (I) or to a labeled derivative of formula (II) that is used in the competitive assay.

A final aspect of the present invention also relates to a patulin detection kit using a benzene-1,2-dithiol of formula (i) and at least one antibody of the invention. Additionally, the patulin detection kit may comprise a bioconjugate of formula (I) or a labeled derivative of formula (II) as described in the present patent application.

The terms "immunogen" and "immunogenic" as used in the present invention refer to a substance that is recognized as foreign to the living organism and therefore is capable of generating an immune response in a host. In the present invention, the immunogen is a bioconjugate of formula (I).

Throughout the description and claims, the word "comprise" and its variants are not intended to exclude other technical features, additives, components, or steps. For those skilled in the art, other objects, advantages, and features of the invention will emerge partly from the description and partly from the practice of the invention.

The preparation of various adducts of formula (ii), resulting from the reaction of a benzene-1,2-dithiol with patulin, of some functionalized derivatives thereof (haptens), and of the corresponding bioconjugates of formula (I) and labeled derivatives of formula (II), are illustrated below by means of examples and figures that are not intended to be limiting of the present invention, an serve to show not only the form in which their preparation can be carried out, but also the importance that the structural nature of the bioconjugate of formula (I) may have in the production of antibodies of adequate affinity towards the analyte, suitable for the development of an effective immunoanalytical method.

BRIEF DESCRIPTION OF THE FIGURES

FIG. 1. Specificity assay. Two monoclonal antibodies (mAb #235 and mAb #338) obtained against the BSA-Ie conjugate, were assayed by competitive ELISA in direct format using as competitors the patulin adduct of structure (ii-2) (circles), patulin (squares), and sodium 3,6-dichlorobenzene-1,2-bis(thiolate) (triangles), compound of formula (i) which after reacting with patulin gives rise to the compound of formula (ii-2).

EXAMPLES

The invention is illustrated below by means of assays carried out by the inventors, which show how the bioconjugates of formula (I) and the labeled derivatives of formula (II) can be prepared from the 1:1 adducts resulting from the reaction of patulin with a benzene-1,2-dithiol, and that show the effectiveness of the bioconjugates of formula (I) for obtaining antibodies against this adduct. It is also shown how, from these bioconjugates, tracers, and antibodies, an immunoassay of high sensitivity can be developed for the determination of patulin that includes a previous step for its conversion into the aforementioned adduct. The numbers in bold refer to the corresponding structure shown in the diagrams. These examples are presented by way of a demonstration, but in no way can they imply a limit to the invention.

1. General Techniques 1.1. Reagents, Equipment, and General Techniques Used in the Preparation of Adducts, Haptens, and Bioconjugates The organic solvents were dried and distilled before use by standard techniques. Tetrahydrofuran (THF) was distilled over Na and benzophenone under $N_2$ atmosphere just before use. $CH_2CL_2$ and MeCN were distilled from $CaH_2$ in the same way. N,N-dimethylformamide (DMF) was distilled from $CaH_2$ at 7 mmHg and stored at ~20° C. on 4 Å molecular sieve. The remaining commercial solvents and reagents were used without prior purification. Reactions were monitored by thin layer chromatography (TLC) on pre-coated silica plates (0.25 mm layer thickness, silica gel 60 F254) using UV light as a visualizing agent and ethanolic phosphomolybodic acid or aqueous solutions of ceric ammonium molybdate and heat as development agents. Column chromatographic purifications were performed using silica gel 60 (particle size 0.043-0.063 mm). NMR spectra were recorded with a Bruker DPX300 spectrometer at 300 MHz ($^1H$) and at 75 MHz ($^{13}C$), with a Bruker DRX400 spectrometer at 400 MHz ($^1H$) and at 100 MHz ($^{13}C$) and with a Bruker DRX 500 spectrometer at 500 MHz ($^1H$) and at 125 MHz ($^{13}C$). Chemical shifts (δ) are expressed in ppm using the residual solvent as internal reference in all cases [(7.27 and 77.00), (2.05 and 29.84) and (3.58 and 67.57) ppm, for the spectra of ($^1H$ and $^{13}C$) in $CDCl_3$, acetone-$d_6$ and THF-$d_8$, respectively]. The degrees of carbon substitution were established by DEPT pulse sequences. In most cases, a combination of COSY and HSQC experiments was used for the assignment of $^1H$ and $^{13}C$ chemical shifts. Infrared (IR) spectra were acquired without prior preparation on an FTIR spectrometer from Thermo Fisher Scientific (Waltham, USA) using the Attenuated Total Reflectance (ATR) technique; the intensity of the peaks is given using the following abbreviations: s (strong), m (medium), w (weak). High resolution mass spectra (HRMS) were obtained using a TripleTOF™ 5600 LC/MS/MS System, from AB SCIEX (Nieuwerkerk aan den Ussel, The Netherlands), equipped with an electrospray source. The data obtained are expressed as mass/charge ratio (m/z).

The analysis of the bioconjugates was carried out with a mass spectrometer with matrix-assisted laser desorption ionization and time-of-flight analyzer (MALDI-TOF), Model 5800 (ABSciex), in positive linear mode (1500 shots for each position) in a mass range of 12,000-100,000 m/z.

1.2. Reagents, Equipment, and General Techniques Used in the Generation of Antibodies and Immunoassays The reference patulin was purchased from Fermentek (Jerusalem, Israel). The BSA (fraction V) was from Roche Applied Science (Mannheim, Germany). Sigma/Aldrich (Madrid, Spain) provided OVA, HRP, bovine serum, Freund's adjuvants, and o-phenylenediamine. For the purification of the bioconjugates of formula I and II, prepackaged Sephadex G-25 HiTrap™ desalting columns from GE Healthcare (Uppsala, Sweden) were used, using as elution buffer 100 mM sodium phosphate (PB), pH 7.4. Goat anti-rabbit immunoglobulins (GAR) and goat anti-mouse immunoglobulins (GAM) were obtained from Rockland Inc. (Limerick, PA, USA) and Jackson ImmunoResearch Laboratories Inc. (West Grove, PA, USA), respectively. As a secondary antibody, the polyclonal conjugate of anti-rabbit anti-mouse immunoglobulin antibody (RAM—HRP) from Dako (Glostrup, Denmark) was used. Corning (Corning, NY, USA) flat-bottom, high-binding, 96-well polystyrene Costar ELISA plates were used. ELISA absorbances were read with a BioTek Instruments PowerWave HT (Winooski, VT, USA). The microplate wells were washed with an ELx405 microplate washer also from BioTek Instruments.

2. Preparation of Patulin-Benzene-1,2-Dithiol Adducts of Formula (ii)

Example 2.1. Preparation of (Z)-3-(3-(hydroxymethyl)benzo[b][1,4]dithiin-2(3H)-ylidene)-4-oxobutanoic acid [adduct (ii-1)]

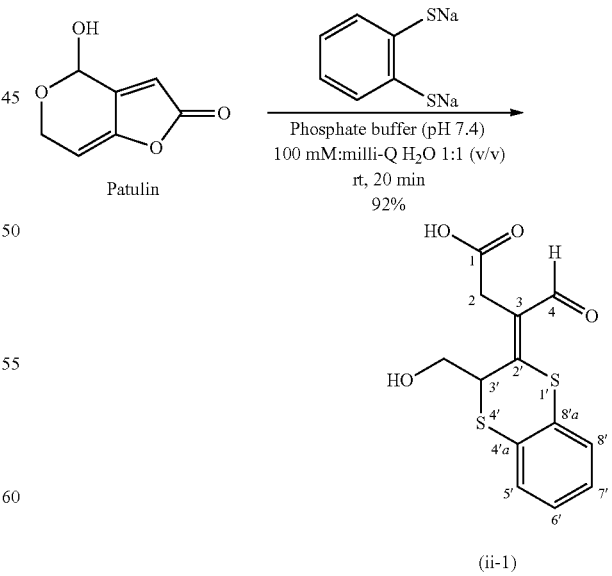

Patulin (19.7 mg, 0.130 mmol) was weighed into a round bottom flask equipped with a magnetic stir bar and then dissolved in 17.0 mL of 100 mM phosphate buffer (PB), pH 7.4. Moreover, sodium benzene-1,2-bis(thiolate) (21.2 mg, 0.141 mmol, 1.1 eq.) was weighed into a vial and dissolved in 8.7 mL of MiliQ water. The latter solution was then added to the flask with the patulin and the mixture was stirred for 20 minutes at room temperature. The reaction mixture was cooled in an ice-water bath, acidified with formic acid to pH 3-4, and extracted with EtOAc (20 mL×3). The combined organic phases were washed with brine (15 mL), dried over anhydrous $MgSO_4$, and concentrated under reduced pressure to provide the adduct (ii-1) (35.5 mg, 92%) as a yellow oil.

Spectroscopic data of the adduct (ii-1): $^1$H NMR (500 MHz, acetone-$d_6$) δ (ppm) 10.25 (s, 1H, HCO), 7.38 (dd, J=7.2, 1.9 Hz, 1H, H-8'), 7.35 (dd, J=7.0, 2.1 Hz, 1H, H-5'), 7.28-7.19 (m, 2H, H-6' and H-7'), 4.54 (t, J=7.3 Hz, 1H, H-3'), 3.70 (dd, J=11.2, 7.9 Hz, 1H, CHOH), 3.67 and 3.61 (AB system, J=16.8 Hz, each 1H, H-2), 3.62 (dd, J=11.2, 6.8 Hz, 1H, CH'OH); $^{13}$C NMR (126 MHz, acetone-$d_6$) δ (ppm) 188.7 (CH, C-4), 171.5 (C-1), 154.0 (C-2'), 131.2 (CH, C-8'), 130.7 (C, C8'a), 128.6 (C, C-4'a), 127.9 (CH, C-6'), 127.7 (CH, C-7'), 127.6 (CH, C-5'), 127.6 (C, C-3), 62.9 ($CH_2OH$), 43.7 (CH, C-3'), 32.4 ($CH_2$, C-2); IR $v_{max}$ (cm$^{-1}$) 3447m, 2924m, 1783m, 1725s, 1654s, 1558m, 1451m, 1200s, 1062s; HRMS m/z calculated for $C_{13}H_{13}O_4S_2$ [M+H]$^+$ 297.0250, found [M+H]$^+$ 297.0250.

Example 2.2. Preparation of (Z)-3-(5,8-dichloro-3-(hydroxymethyl)benzo[b][1,4]dithiin-2(3H)-ylidene)-4-oxobutanoic acid [adduct (ii-2)]

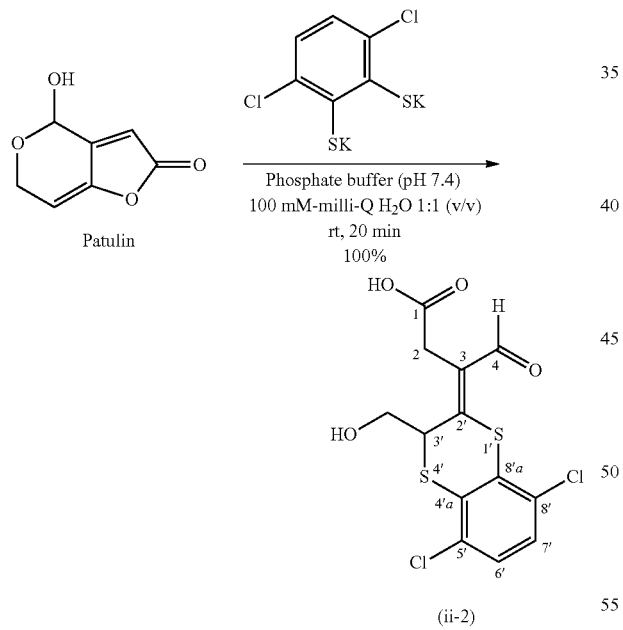

(ii-2)

Patulin (7 mg, 0.045 mmol) was weighed in a round bottom flask equipped with a magnetic stir bar and dissolved in 5.5 mL of 100 mM PB, pH 7.4. Next, a solution of potassium 3,6-dichlorobenzene-1,2-bis(thiolate) (14.2 mg, 0.049 mmol, 1.1 eq.) in 3.6 mL of MiliQ $H_2O$ was added and the mixture stirred for 20 minutes at room temperature. The reaction mixture was cooled in an ice-water bath, acidified with formic acid to pH 3-4, and extracted with EtOAc (20 mL×3). The combined organic phases were washed with brine (15 mL), dried over anhydrous $MgSO_4$, and concentrated under reduced pressure to provide the adduct (ii-2) (16.7 mg, 100%) as a yellowish foam.

Spectroscopic data of the adduct (ii-2): $^1$H NMR (500 MHz, CDCl$_3$) δ (ppm) 10.36 (s, 1H, HCO), 7.21 (s, 2H, H-6' and H-7'), 4.43 (dd, J=8.2, 6.6 Hz, 1H, H-3'), 3.81 (dd, J=11.5, 8.2 Hz, 1H, CHOH), 3.73 (dd, J=11.5, 6.6 Hz, 1H, CH'OH), 3.66 and 3.56 (AB system, J=16.6 Hz, each 1H, H-2); $^{13}$C NMR (126 MHz, CDCl$_3$) δ (ppm) 188.7 (CH, C-4), 173.8 (C, C-1), 150.1 (C, C-2'), 132.3 (C, C8'a), 129.7 (C, C-8'), 129.0 (C, C-4'a), 128.4 (C, C-5'), 128.4 (C, C-3), 127.7 (CH, C-6'), 127.5 (CH, C-7'), 63.0 ($CH_2OH$), 42.5 (CH, C-3'), 31.7 ($CH_2$, C-2); IR $v_{max}$ (cm$^{-1}$) 3278m, 2920s, 2853m, 1701m, 1656s, 1559w, 1399s, 1162s; HRMS m/z calculated for $C_{13}H_{11}Cl_2O_4S_2$ [M+H]$^+$ 364.9470, found [M+H]$^+$ 364.9454.

Example 2.3. Preparation of (Z)-3-(3-(hydroxymethyl)-6-methylbenzo[b][1,4]dithiin-2(3H)-ylidene)-4-oxobutanoic and (Z)-3-(3-(hydroxymethyl)-7-methylbenzo[b][1,4]dithiin-2(3H)-ylidene)-4-oxobutanoic [adduct (ii-3)]

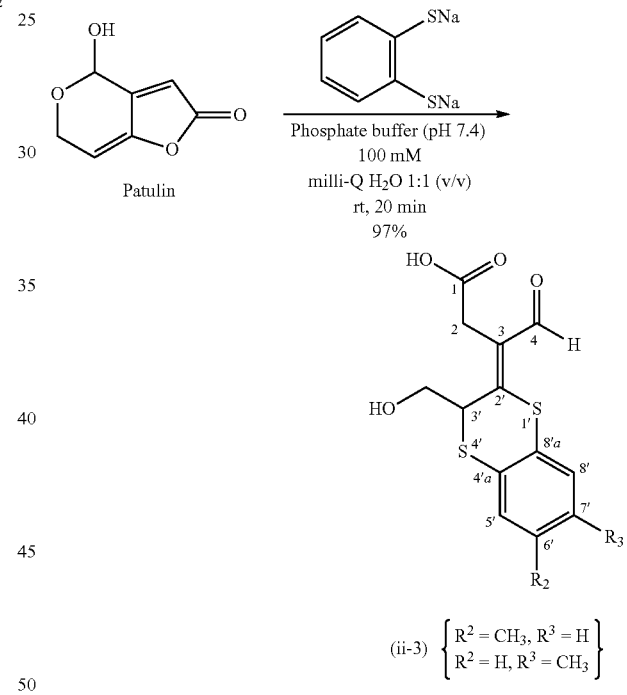

(ii-3) $\begin{cases} R^2 = CH_3, R^3 = H \\ R^2 = H, R^3 = CH_3 \end{cases}$

Patulin (15.6 mg, 0.101 mmol) was added to a round bottom flask equipped with a magnetic stir bar and then dissolved with 12.0 mL of 100 mM PB, pH 7.4. Next, a solution of sodium 4-methylbenzene-1,2-bis(thiolate) (22.1 mg, 0.110 mmol, 1.1 eq.) in 12.0 mL of MiliQ $H_2O$ was added and the mixture was stirred for 20 minutes at room temperature, cooled in an ice-water bath, and acidified with formic acid to pH 3-4. The mixture was extracted with CHCl$_3$ (20 mL×3) and the combined organic phases were washed with brine (15 mL), dried over anhydrous $MgSO_4$, and concentrated in vacuo to give an approximately equimolar mixture of adducts (ii-3) (30.3 mg, 97%) as a yellow oil.

Spectroscopic data of the adducts (ii-3): $^1$H NMR (400 MHz, CDCl$_3$) δ (ppm) 10.27 (broad s, 1H, H-4), 7.18 (d, J=8.0 Hz, 0.5H, H-5'), 7.15 (d, J=8.0 Hz, 0.5H, H-8'), 7.12

(broad s, 0.5H, H-8'), 7.09 (broad s, 0.5H, H-5'), 6.99 (dd, J=8.1, 1.0 Hz, 0.5H, H-6'), 6.97 (dd, J=8.1, 1.0 Hz, 0.5H, H-7'), 4.27 (m, 1H, H-3'), 3.75-3.58 (m, 2H, CH$_2$OH), 3.67 and 3.46 (AB system, J=16.6 Hz, each 1H, H-2), 2.31 and 2.30 (each s, each 1.5H, CH$_3$); $^{13}$C NMR (126 MHz, CDCl$_3$) δ (ppm) 188.3 (CH, C-4), 174.4 and 174.3 (C, C-1), 155.1 (C, C-2'), 137.6 and 126.0 (C, C-4'a), 137.4 and 129.1 (C, C8'a), 131.1 and 127.5 (CH, C-8'), 130, 5 and 127.0 (CH, C-5'), 128.4 and 128.3 (CH, C-7'/C-6'), 126.1 and 126.0 (C, C3), 125.9 and 123.3 (C, C-6'/C-7'), 62.3 and 62.2 (CH$_2$OH), 43.2 and 43.1 (CH, C-3'), 32.3 and 32.2 (CH$_2$, C-2), 21.13 and 21.07 (CH$_3$); IR ν$_{max}$ (cm$^{-1}$) 3406m, 2922m, 1709s, 1655s, 1562m, 1469m, 1175s, 1044s; HRMS m/z calculated for C$_{14}$H$_{13}$O$_3$S$_2$ [M–H$_2$O+H]$^+$ 293.0301, found [M–H$_2$O+H]$^+$ 293.0298.

Example 2.4. Preparation of (Z)-3-(6,7-dicyano-3-(hydroxymethyl)benzo[b][1,4]dithiin-2(3H)-ylidene)-4-oxobutanoic acid [adduct (ii-4)]

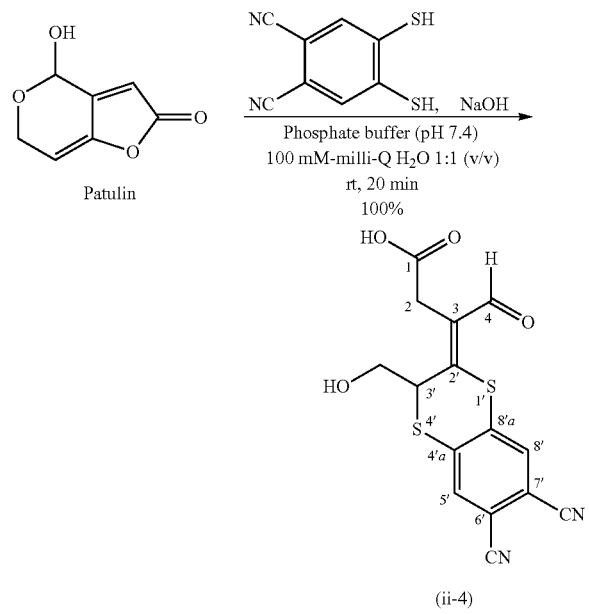

(ii-4)

Patulin (7 mg, 0.045 mmol) was weighed in a round bottom flask equipped with a magnetic stir bar and then dissolved with 6.2 mL of 100 mM PB, pH 7.4. Next, a solution of 4,5-dimercaptophthalonitrile (8.8 mg, 0.046 mmol, 1.05 eq.) in 6.2 mL of a 0.016 M aqueous NaOH solution (4.0 mg, 0.099 mmol, 2.2 eq) was prepared and it was added to the round bottom flask containing the patulin. The mixture was stirred for 20 minutes at room temperature, cooled in an ice-water bath, and acidified with formic acid to pH 3-4. The mixture was extracted with EtOAc (20 mL×3), the combined organic phases were washed with brine (15 mL), dried over anhydrous MgSO$_4$, and concentrated in vacuo to give the adduct (ii-4) (17, 4 mg, 88%) as a dark yellow oil.

Spectroscopic data of the adduct (ii-4): $^1$H NMR (300 MHz, acetone-d$_6$) δ (ppm) 10.19 (s, 1H, HCO), 8.08 (s, 1H, H-8'), 8.01 (s, 1H, H-5'), 4.77 (t broad, J=7.3 Hz, 1H, H-3'), 3.76 (dd, J=11.3, 7.8 Hz, 1H, CHOH), 3.75 and 3.68 (AB system, J=17.0 Hz, each 1H, H-2), 3.68 (dd, J=11.3, 6.8 Hz, 1H, CH'OH); $^{13}$C NMR (75 MHz, acetone-d$_6$) δ (ppm) 189.5 (CH, C-4), 171.2 (C, C-1), 148.6 (C, C-2'), 137.9 (C, C-4'a), 136.5 (C, C8'a), 135.2 (CH, C-5'), 132.3 (CH, C-8'), 129.5 (C, C-3), 115.9 (2C, CN×2), 113.0 (C, C-6'), 112.8 (C, C-7'), 63.0 (CH$_2$OH), 43.2 (CH, C-3'), 32.9 (CH$_2$, C-2); IR ν$_{max}$ (cm$^{-1}$) 3442m, 2232s, 1716s, 1668m, 1571s, 1518m, 1470m, 1220s, 1118s; HRMS m/z calculated for C$_{15}$H$_9$N$_2$O$_4$S$_2$ [M–H]$^-$ 345.0009, found [M–H]$^-$ 344.9994.

Example 2.5. Preparation of (Z)-3-(3-(hydroxymethyl)-6,7-dimethylbenzo[b][1,4]dithiin-2(3H)-ylidene)-4-oxobutanoic acid [adduct (ii-5)]

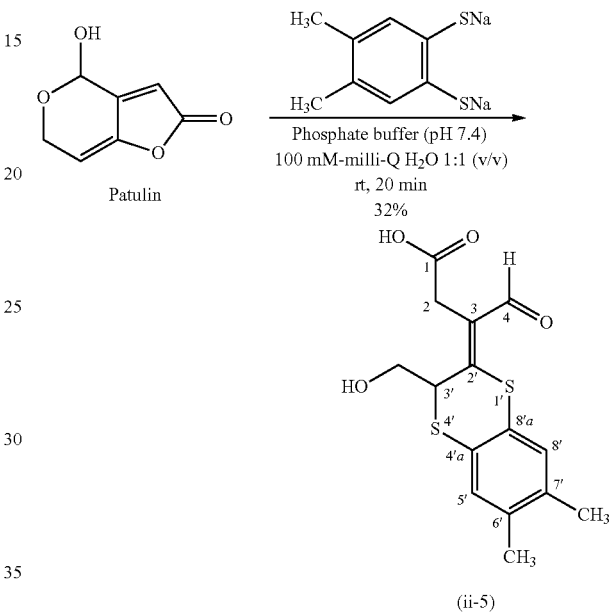

(ii-5)

Patulin (9.8 mg, 0.063 mmol) was weighed in a round bottom flask equipped with a magnetic stir bar and dissolved with 8.7 mL of 100 mM PB (pH 7.4). Next, a solution of sodium 4,5-dimethylbenzene-1,2-bis(thiolate) (15 mg, 0.070 mmol, 1.1 eq.) in 8.7 mL of MiliQ H$_2$O was added and the mixture was stirred for 20 minutes at room temperature. The resulting reaction mixture was cooled in an ice-water bath and acidified with formic acid to pH 3-4, extracted with EtOAc (20 mL×3), and the combined organic phases were washed with brine (15 mL), dried over anhydrous MgSO$_4$, and concentrated under reduced pressure on a rotary evaporator. The residue obtained was purified by means of flash column chromatography on silica gel, using a 95:5 mixture of CHCl$_3$-MeOH as eluent, to give the adduct (ii-5) (6.5 mg, 32%) as a yellow oil.

Spectroscopic data of the adduct (ii-5). $^1$H NMR (300 MHz, acetone-d$_6$) δ (ppm) 10.23 (s, 1H, HCO), 7.14 (s, 1H, H-8'), 7.11 (s, 1H, H-5'), 4.47 (dd, J=7.9, 6.8 Hz, 1H, H-3'), 3.69 (dd, J=11.1, 7.9 Hz, 1H, CHOH), 3.66 and 3.58 (AB system, J=16.9 Hz, each 1H, H-2), 3.60 (dd, J=11.1, 6.8 Hz, 1H, CH'OH), 2.23 and 2.22 (each s, each 3H, CH$_3$×2); $^{13}$C NMR (75 MHz, acetone-d$_6$) δ (ppm) 188.5 (CH, C-4), 171.7 (C, C-1), 154.9 (C, C-2'), 136.9 (C, C-4'a), 136.8 (C, C8'a), 131.8 (CH, C-8'), 128.2 (CH, C5'), 127.3 (C, C-6'), 127.3 (C, C-7'), 125.0 (C, C-3), 62.9 (CH$_2$OH), 43.9 (CH, C-3'), 32.4 (CH$_2$, C2), 19.2 (CH3×2); IR ν$_{max}$ (cm$^{-1}$) 3375m, 2922m, 1716m, 1651s, 1558m, 1455m; HRMS m/z calculated for C$_{15}$H$_{17}$O$_4$S$_2$ [M+H]$^+$ 325.0563, found [M+H]$^+$ 325.0558.

3. Preparation of Bioconjugates of Formula (I) and (II)

Example 3.1. Preparation of Bioconjugates of Formula (I) for T=R-I ($R^1$=$R^2$=$R^3$=$R^4$=H), Without L Chain, Z=—NH— and P=BSA (Bovine Serum Albumin) and OVA (Ovalbumin)

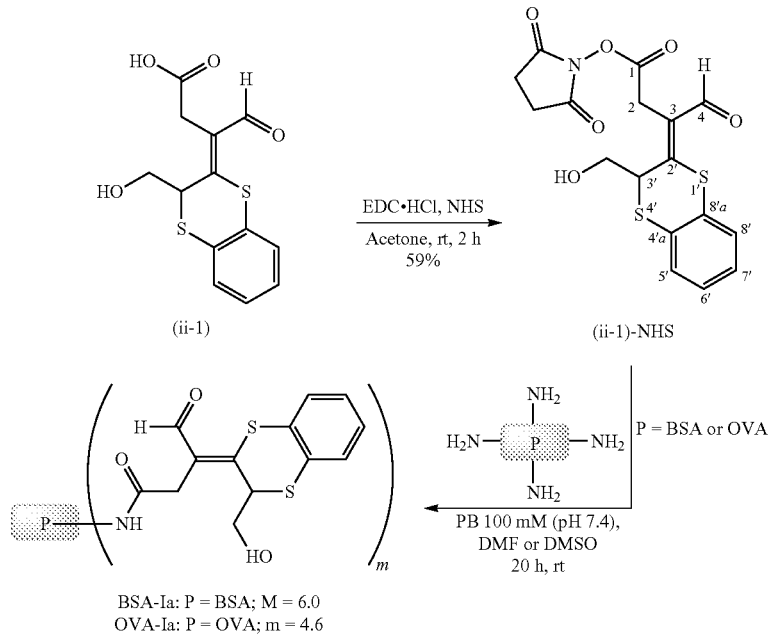

3.1.1. Activation of the Carboxylic Group of the Adduct (ii-1)

The adduct (ii-1) (5.2 mg, 0.018 mmol), N-(3-dimethylaminopropyl)-N'ethyl carbodiimide hydrochloride (EDC·HCl, 4.2 mg, 0.022 mmol, 1.25 eq.) and N-hydroxysuccinimide (NHS, 3.5 mg, 0.022 mmol, 1.25 eq.) were added to a reaction vial that was purged with nitrogen. Next, dry acetone (400 µL) was added and the mixture was stirred for 2 hours at room temperature. After checking the completion of the reaction by TLC, 5 mL of water was added to the vial and the mixture was extracted with CHCl$_3$ (10 mL×3). The combined organic phases were washed with brine (10 mL), dried over anhydrous MgSO$_4$, and concentrated under reduced pressure to give (ii-1)-NHS (4.1 mg, 59%) as a yellow oil. $^1$H NMR (500 MHz, CDCl$_3$) δ (ppm) 10.33 (s, 1H, HCO), 7.35 and 7.28 (m, 2H, H-8' and H-5'), 7.23-7.15 (m, 2H, H-6' and H-7'), 4.20 (t, J=7.3 Hz, 1H, H-3'), 4.06 and 3.73 (each d, J=17.3 Hz, each 1H, H-2), 3.71 (dd, J=11.7, 7.2 Hz, 1H, CHOH), 3.65 (dd, J=11.7, 7.5 Hz, 1H, CH'OH), 2.85 [broad s, 4H, CO(CH$_2$)$_2$CO].

3.1.2. Preparation of the Bioconjugate of the Adduct (ii-1) with BSA [Bioconjugate BSA-Ia]

132 µL of a 100 mM solution in DMSO of the active ester of the adduct (ii-1) obtained in the previous reaction, [(ii-1)-NHS], were added slowly with stirring over 0.97 mL of a solution of BSA (15 mg/mL) in 100 mM PB, pH 7.4. The conjugation reaction was incubated for 20 h with stirring at room temperature. After this time, the BSA bioconjugate formed was purified by size exclusion chromatography on three coupled Sephadex G-25 HiTrap desalting columns of 5 mL, using 100 mM PB, pH 7.4, as elution buffer. After the purification process, the collected fractions containing the BSA bioconjugate were combined, sterilized by filtration through a 0.45 µm nylon filter, brought to a final concentration of 1 mg/mL with filtered elution buffer, and stored at −20° C.

To determine the haptenic charge (m) obtained in the bioconjugate, a 100 µL aliquot of the purified BSA-Ia bioconjugate was dialyzed (dialysis against 5 L of deionized water with at least 3-4 water changes for 24 hours at 4° C.); finally, the dialyzed product was used to calculate the efficiency of conjugation, in terms of the mean number of molecules of adduct (ii-1) coupled per BSA molecule, by MALDI-TOF-MS (m=6.0, see Table 2, entry 1).

3.1.3. Preparation of the Adduct Bioconjugate (ii-1) with OVA [Bioconjugate OVA-Ia]

125 µL was taken from a 50 mM solution of the N-hydroxysuccinimidyl ester of the adduct (ii-1), [(ii-1)-NHS], in DMF were added slowly with stirring to 1.85 mL of a solution of OVA (15 mg/mL) in 100 mM PB, pH 7.4. After 20 hours of smooth stirring at room temperature, the bioconjugate formed was purified as described above for the BSA bioconjugate. The collected fractions were brought to a final concentration of 1 mg/mL in elution buffer with 0.01% (v/v) thimerosal and stored at −20° C. An aliquot of the freshly purified OVA-Ia bioconjugate was dialyzed and the mean number of molecules of adduct conjugated per molecule of OVA was determined by MALDI-TOF-MS (m=4.6, see Table 2, entry 11).

Example 3.2. Preparation of Bioconjugates of Formula (I) for T=R-I ($R^1$=$R^4$=Cl, $R^2$=$R^3$=H), without L Chain, Z=—(C=O)NH— and P=BSA (Bovine Serum Albumin) and OVA (Ovalbumin)

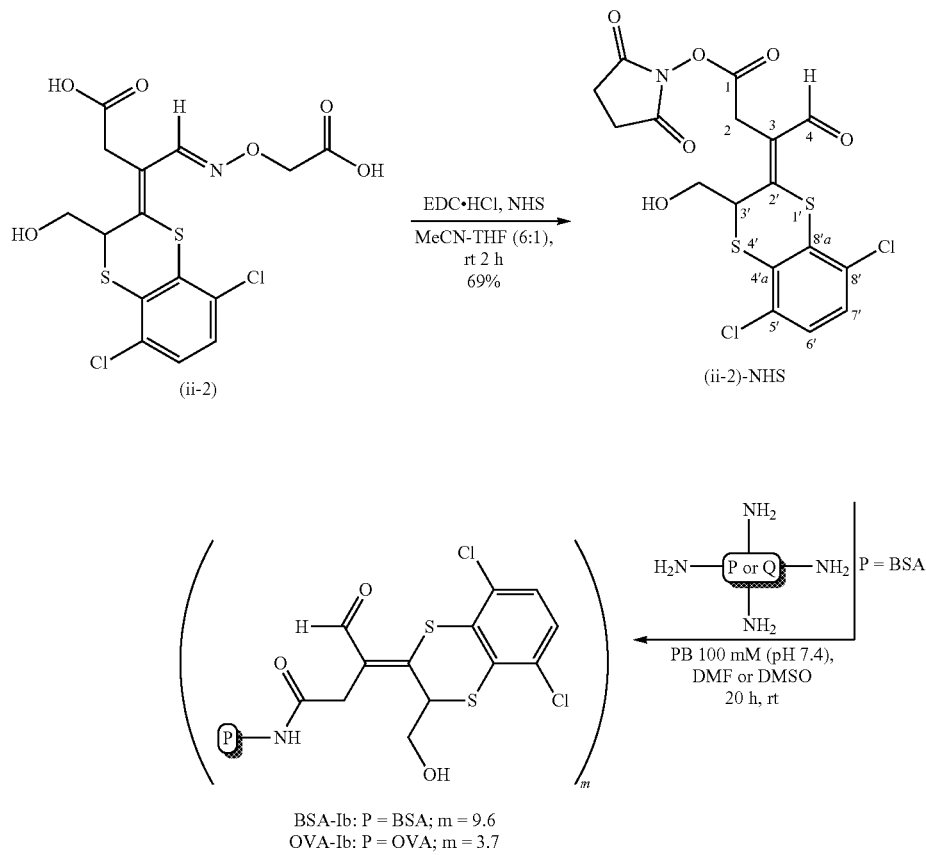

BSA-Ib: P = BSA; m = 9.6
OVA-Ib: P = OVA; m = 3.7

3.2.1. Activation of the Carboxylic Group of the Adduct (ii-2)

Adduct (ii-2) (13.0 mg, 0.036 mmol), EDC·HCl (8.5 mg, 0.045 mmol, 1.25 eq.), and NHS (5.4 mg, 0.047 mmol, 1.3 eq.) were weighed in a vial. After purging with nitrogen, a mixture of anhydrous MeCN (600 µL) and THF (100 µL) was added, and the resulting mixture was stirred for 2 hours at room temperature. Then, 5 mL of water was added and the mixture was extracted with $CH_2Cl_2$ (10 mL×3). The combined organic phases were washed with brine (10 mL), dried over anhydrous $MgSO_4$, and concentrated under reduced pressure to give (ii-2)-NHS (11.5 mg, 69%) as a yellow oil. $^1$H NMR (300 MHz, $CDCl_3$) δ (ppm) 10.38 (s, 1H, HCO), 7.21 (s, 2H, H-6' and H-7'), 4.34 (t, J=7.3 Hz, 1H, H-3'), 4.05 and 3.79 (each d, J=17.3 Hz, each 1H, H-2), 3.73 (m, 2H, $CH_2OH$), 2.86 [broad s, 4H, $CO(CH_2)_2CO$].

3.2.2. Preparation of the Bioconjugate of the Adduct (ii-2) with BSA [Bioconjugate BSA-Ib]

Prepared following the same procedure described above for the BSA-Ia bioconjugate (section 3.1.2) from 132 µL of a 100 mM solution of the active ester of the adduct (ii-2), [(ii-2)-NHS], in DMSO and 0.97 mL of a solution of BSA (15 mg/mL) in 100 mM PB, pH 7.4. After the purification process, the collected fractions containing the BSA bioconjugate were combined, sterilized by filtration through a 0.45 µm nylon filter, brought to a final concentration of 1 mg/mL with filtered elution buffer, and stored at −20° C. The mean number of molecules of adduct (ii-2) conjugated per each molecule of BSA, determined by MALDI-TOF-MS, was m=9.6 (see Table 2, entry 2).

3.2.3. Preparation of the Bioconjugate of the Adduct (ii-2) with OVA [Bioconjugate OVA-Ib]

Prepared as described above for the OVA-Ia bioconjugate (section 3.1.3) from 125 µL of a 50 mM solution in DMF of the activated adduct (ii-2), [(ii-2)-NHS], and 0.97 mL of a solution of OVA (15 mg/mL) in 100 mM PB, pH 7.4. After the corresponding chromatographic purification, the collected fractions were brought to a final concentration of 1 mg/mL in elution buffer with 0.01% (v/v) thimerosal and stored at −20° C. The mean number of molecules of the adduct (ii-2) conjugated per each molecule of OVA, determined by MALDI-TOF-MS, was m=3.7 (see Table 2, entry 12).

Example 3.3. Preparation of Bioconjugates of Formula (I) for T=R-I [(R¹=R³=R⁴=H, R²=CH₃) and (R¹=R²=R⁴=H, R³=CH₃)], without L Chain, Z=—NH— and P=BSA (Bovine Serum Albumin) and OVA (Ovalbumin)

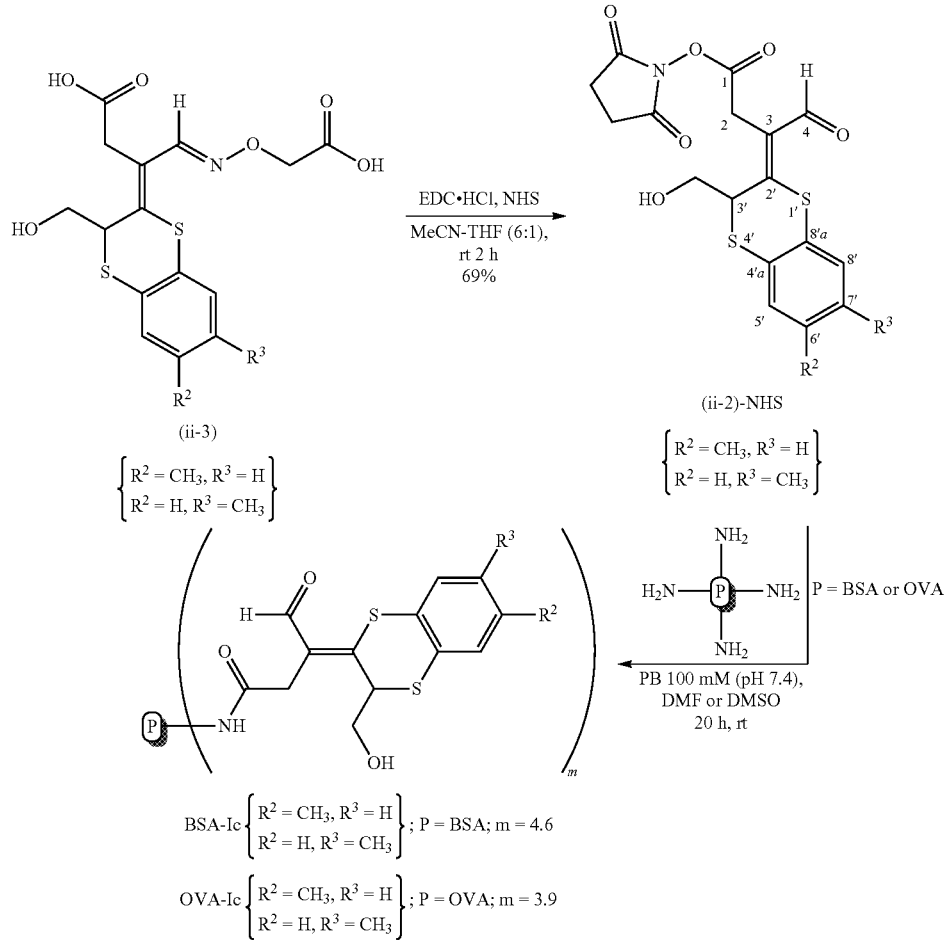

3.3.1. Activation of the Carboxylic Group of the Adducts (ii-3)

A solution of the mixture of the adducts (ii-3) (26.0 mg, 0.09 mmol), EDC·HCl (21.0 mg, 0.11 mmol, 1.25 eq.), and NHS (12.7 mg, 0.11 mmol, 1.25 eq.) in dry acetone (1.5 mL) was stirred at room temperature for 2 hours. After completion of the reaction, 10 mL of water was added to the reaction and it was extracted with CH₂Cl₂ (20 mL×3). The combined organic phases were washed with brine (15 mL), dried over anhydrous MgSO₄, and concentrated under reduced pressure to give the N-hydroxysuccinimidyl esters of adducts (ii-3) (20.4 mg, 55%) as a yellow oil. ¹H NMR (300 MHz, CDCl₃) δ (ppm)¹H NMR (300 MHz, CDCl₃) δ (ppm) 10.32 and 10.31 (each s, each 0.5H, H-4), 7.22 (d, J=8.0 Hz, 0.5H, H-5'), 7.17 (d, J=8.0 Hz, 0.5H, H-8'), 7.17 (m, 0.5H, H-8'), 7.11 (m, 0.5H, H-5'), 7.01 (m, 0.5H, H-6'), 6.99 (m, 0.5H, H-7'), 4.21-4.01 (m, 2H, H-3' and H-2), 3.80-3.58 (m, 3H, H'-2 and CH₂OH), 2.84 [broad s, 4H, CO(CH₂)₂CO], 2.31 and 2.30 (each s, each 1.5H, CH₃).

3.3.2. Preparation of the Bioconjugate of Adduct (ii-3) with BSA [Bioconjugate BSA-Ic]

Prepared as described above for the BSA-Ia bioconjugate (section 3.1.2) from 132 μL of a 50 mM solution in DMF of the mixture of the active esters of the adducts (ii-3) and 0.97 mL of a BSA solution (15 mg/mL) in 100 mM PB, pH 7.4. After the purification process, the collected fractions containing the BSA bioconjugate were collected, sterilized by filtration through a 0.45 μm nylon filter, and they were brought to a final concentration of 1 mg/mL with filtered elution buffer, and stored at −20° C. The mean number of molecules of adducts (ii-3) conjugated per each molecule of BSA, determined by MALDI-TOF-MS, was m=4.6 (see Table 2, entry 3).

3.3.3. Preparation of the Bioconjugate of the Adducts (ii-3) with OVA [Bioconjugate OVA-Ic]

Prepared as described above for the OVA-Ia bioconjugate (section 3.1.3) from 125 μL of a 50 mM solution in DMF of the active esters of the adducts (ii-3) and 1.85 mL of a solution of OVA (15 mg/mL) in 100 mM PB, pH 7.4. After chromatographic purification, the collected fractions were brought to a final concentration of 1 mg/mL in elution buffer with 0.01% (v/v) thimerosal and stored at −20° C. The mean number of molecules of adducts (ii-3) conjugated per each molecule of OVA, determined by MALDI-TOF-MS, was m=3.9 (see Table 2, entry 13).

Example 3.4. Preparation of Bioconjugates of Formula (I) and (II) for T=R-II [($R^1$=$R^2$=$R^3$=$R^4$=H), L=N—O—$CH_2$—, Z=—(C=O)NH— and P=BSA (Bovine Serum Albumin) and OVA (Ovalbumin) and Q=HRP (Horseradish Peroxidase)

3.4.1. Preparation of (3Z,4E)-4-((carboxymethoxy)imino)-3-(3-(hydroxymethyl)benzo[b][1,4]dithiin-2(3H)-ylidene)butanoic acid [Hapten (h-d)]

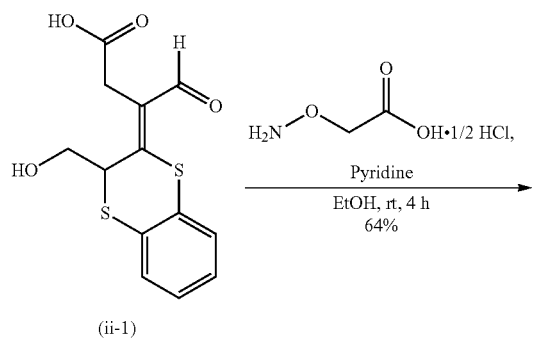

(ii-1)

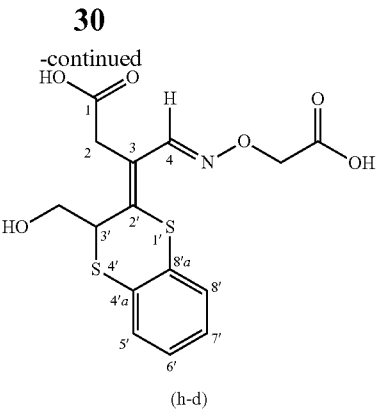

(h-d)

The adduct (ii-1) (17.5 mg, 0.059 mmol) and O-(carboxymethyl)hydroxylamine hemihydrochloride (10.31 mg, 0.094 mmol, 1.6 eq.) were weighed in a vial equipped with a magnetic stir bar. The vial was purged with nitrogen, 0.4 mL of absolute EtOH, 100 μL of anhydrous THF, and dry pyridine (10 μL, 0.124 mmol, 2.1 eq.) were added, and the resulting solution was stirred at room temperature for 4 hours. The solvents were evaporated under reduced pressure, the residue was suspended in 1 mL of a 1M aqueous solution of cold HCl and extracted with EtOAc (10 mL×3). The combined organic phases were washed with brine (15 mL), dried over anhydrous $MgSO_4$, and concentrated on the rotary evaporator to give hapten (h-d) (14 mg, 64%) as a yellow film.

Spectroscopic data of hapten (h-d): $^1$H NMR (500 MHz, acetone-$d_6$) δ (ppm) 8.54 (s, 1H, H-4), 7.31 (dd, J=7.9, 1.5 Hz, 1H, H-5'), 7.29 (dd, J=7.7, 1.7 Hz, 1H, H-8'), 7.19 (td, J=7.6, 1.7 Hz, 1H, H-6'), 7.15 (td, J=7.4, 1.5 Hz, 1H, H-7'), 4.66 (s, 2H, $NOCH_2$), 4.51 (dd, J=7.9, 6.8 Hz, 1H, H-3'), 3.71 (dd, J=11.1, 7.9 Hz, 1H, CHOH), 3.70 and 3.65 (AB system, J=16.9 Hz, each 1H, H-2), 3.60 (dd, J=11.1, 6.8 Hz, 1H, CH'OH); $^{13}$C NMR (126 MHz, acetone-$d_6$) δ (ppm) 171.4 (C, C-1), 170.7 ($CO_2$H), 148.5 (CH, C-4), 140.0 (C, C-2'), 130.95 (CH, C-8'), 130.9 (C, C-8'a), 128.4 (C, C-4'a), 127.5 (CH, C-5'), 127.3 (CH, C-6'), 127.1 (CH, C-7'), 121.8 (C, C-3), 71.4 ($NOCH_2$), 63.5 ($CH_2OH$), 43.4 (CH, C-3'), 33.7 ($CH_2$, C-2); IR $v_{max}$ (cm$^{-1}$) 3006m, 2926s, 2113w, 1707s, 1628w, 1420m, 1360s, 1220s, 1092s; HRMS calculated for C15H16NO6S2 [M+H]$^+$ 370.0414, found [M+H]$^{·+}$ 370.0420.

3.4.2. Preparation of the Bioconjugates of Hapten (h-d)

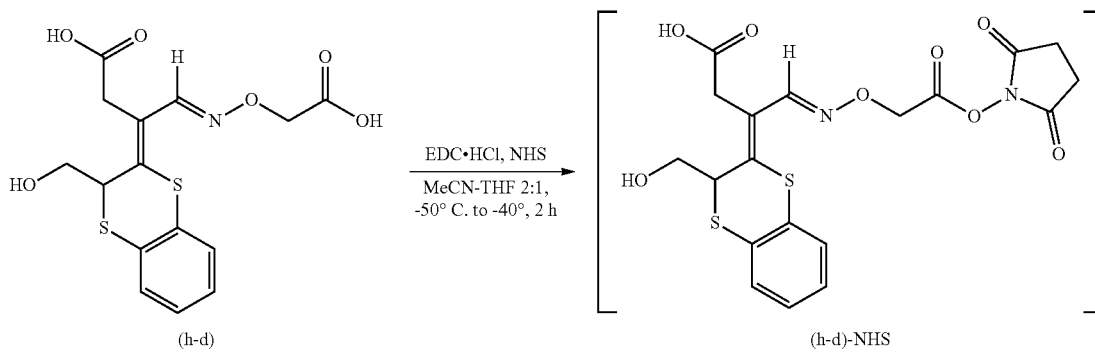

(h-d)    (h-d)-NHS

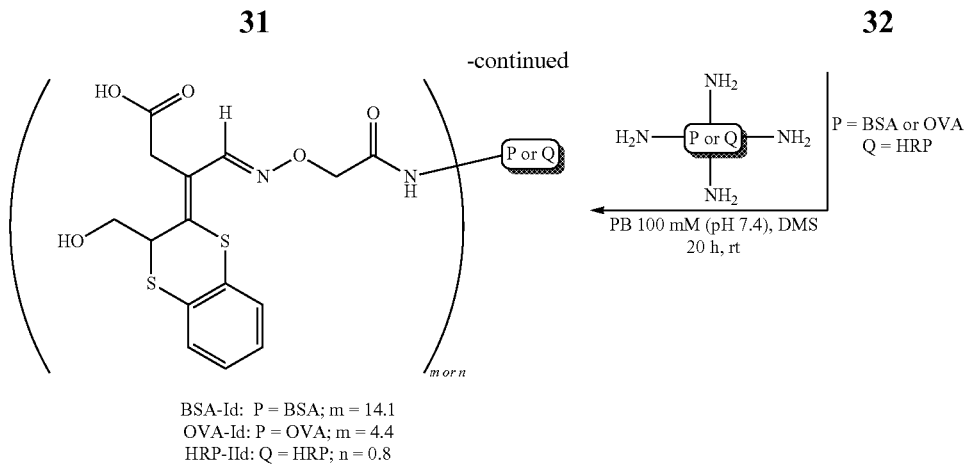

BSA-Id: P = BSA; m = 14.1
OVA-Id: P = OVA; m = 4.4
HRP-IId: Q = HRP; n = 0.8

3.4.2.1. Activation of Hapten (h-d).

Hapten (h-d) (7.9 mg, 0.021 mmol), EDC·HCl (4.1 mg, 0.021 mmol, 1 eq.), and NHS (2.4 mg, 0.021 mmol, 1 eq.) were weighed in a reaction vial and purged with nitrogen. The vial was then cooled to −50° C. and then 300 μL of a 2:1 mixture of anhydrous MeCN and THF were added. The mixture was stirred for 2 hours, keeping the temperature between −45° C. and −40° C. Then 5 mL of cold water was added to the vial and the mixture was extracted with EtOAc (10 mL×3). The combined organic phases were washed with brine (15 mL), dried over anhydrous $MgSO_4$, and concentrated in vacuo to give the active ester (h-d)-NHS as a yellow oil (6.6 mg).

3.4.2.2. Preparation of the Bioconjugate of Hapten (h-d) with BSA [Bioconjugate BSA-Id].

Prepared as described above for the BSA-Ia bioconjugate (section 3.1.2) from 132 μL of a 100 mM solution of the active ester of hapten (h-d) in DMSO and 0.97 mL of a BSA solution (15 mg/mL) in 100 mM PB, pH 7.4. After the purification process, the collected fractions containing the BSA bioconjugate were combined, sterilized by filtration through a 0.45 μm nylon filter and brought to a final concentration of 1 mg/mL with filtered elution buffer and stored at −20° C. The mean number of molecules of hapten (h-d) conjugated per each molecule of BSA, determined by MALDI-TOF-MS, was m=14.1 (see Table 2, entry 4).

3.4.2.3. Preparation of the Bioconjugate of Hapten (h-d) with OVA [Bioconjugate OVA-Id].

Prepared as described above for the OVA-Ia bioconjugate (section 3.1.3) from 80 μL of a 50 mM solution of the N-hydroxysuccinimidyl ester of hapten (h-d) in DMSO and 1 mL of a solution of OVA (5 mg/mL) in 100 mM PB, pH 7.4. After chromatographic purification, the collected fractions were brought to a final concentration of 1 mg/mL in elution buffer with 0.01% (v/v) thimerosal and stored at −20° C. The mean number of molecules of hapten (h-d) conjugated per each molecule of OVA, determined by MALDI-TOF-MS, was m=4.4 (see Table 2, entry 14).

3.4.2.4. Preparation of the Bioconjugate of Hapten (h-d) with HRP [Bioconjugate HRP-IId].

122 μL was taken from a 20 mM solution of the mixture of the active ester of hapten (h-d) in DMF and they were slowly added with stirring to 0.9 mL of a solution of HRP (3 mg/mL) in 100 mM phosphate buffer, pH 7.4. The conjugation reaction was incubated for 20 hours at room temperature. After conjugation, the enzyme tracers were purified following the procedure previously described for the BSA and OVA bioconjugates. An aliquot of the freshly purified HRP-IId bioconjugate was dialyzed and the mean number of molecules of adduct conjugated per molecule of HRP was determined by MALDI-TOF-MS (n=0.8, see Table 2, entry 21). The remainder of the tracer was brought to known concentrations of 250-650 μg/mL in PB with 1% (v/v) BSA and 0.02% (v/v) thimerosal, and stored at 4° C.

Example 3.5. Preparation of Bioconjugates of Formula (I) and (II) for T=R-II [($R^1$=$R^4$=Cl, $R^2$=$R^3$=H), L=N—O—$CH_2$—, Z=—(C=O)NH— and P=BSA (Bovine Serum Albumin) and OVA (Ovalbumin) and Q=HRP (Horseradish Peroxidase)

3.5.1. Preparation of (3Z,4E)-4-((carboxymethoxy)imino)-3-(5,8-dichloro-3-(hydroxymethyl) benzo[b][1,4]dithiin-2(3H)-ylidene) butanoic acid [Hapten (h-e)]

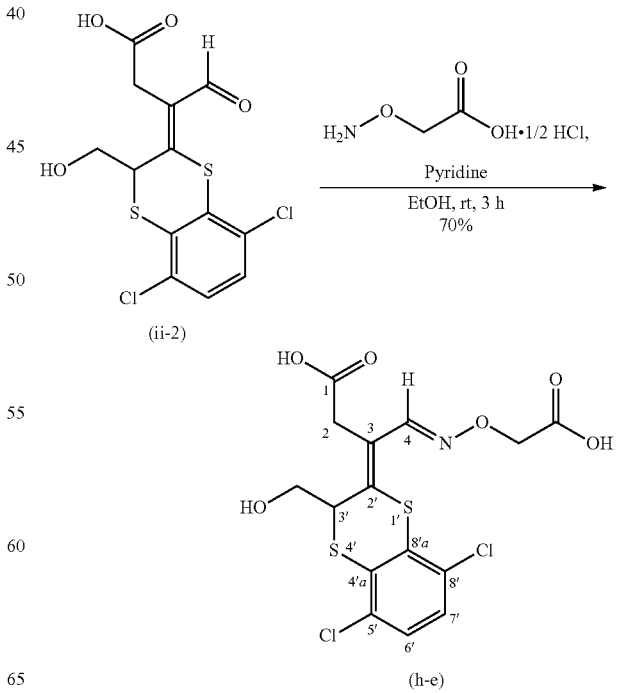

The adduct (ii-2) (16.3 mg, 0.045 mmol) and O-(carboxymethyl)hydroxylamine hemihydrochloride (6.4 mg, 0.058 mmol, 1.3 eq.) were weighed in a vial equipped with a magnetic stir bar, the vial was purged with nitrogen and 0.4 mL of absolute ethanol and dry pyridine (7.6 μL, 0.095 mmol, 2.1 eq.) were added. The resulting solution was stirred for 3 hours at room temperature, the solvent was evaporated under reduced pressure, and the resulting residue was suspended in 1 mL of a cold 1M aqueous HCl solution and extracted with EtOAc (10 mL×3). The combined organic phases were washed with brine (15 mL), dried over anhydrous MgSO$_4$, and concentrated on the rotary evaporator to give hapten (h-e) (13.7 mg, 70%) as a yellow film.

Spectroscopic data of hapten (h-e): $^1$H NMR (500 MHz, acetone-d$_6$) δ (ppm) 8.61 (s, 1H, H-4), 7.33 (AB system, J=8.6 Hz, 2H, H-6' and H-7'), 4.71 (dd, J=8.4, 6.3 Hz, 1H, H-3'), 4.69 (s, 2H, NOCH$_2$), 3.78 and 3.69 (AB system, J=16.8 Hz, each 1H, H-2), 3.77 (dd, J=11.1, 8.4 Hz, 1H, CHOH), 3.68 (dd, J=11.1, 6.3 Hz, 1H, CH'OH); $^{13}$C NMR (126 MHz, acetone-d$_6$) δ (ppm) 171.0 (C, C-1), 170.6 (CO$_2$H), 148.8 (CH, C-4), 136.2 (C, C-2'), 132.3 (C, C-8'a), 130.4 (C, C-5'), 130.0 (C, C-8'), 129.7 (C, C-4'a), 127.8 (CH, C-7'), 127.7 (CH, C-6'), 124.8 (C, C-3), 71.4 (NOCH$_2$), 64.0 (CH$_2$OH), 43.1 (CH, C-3'), 33.8 (CH$_2$, C-2); IR $v_{max}$ (cm$^{-1}$) 3054m, 2924s, 2117w, 1701s, 1403s, 1353m, 1220s, 1164s, 1090s, 1071s; HRMS calculated for C$_{15}$H$_{14}$Cl$_2$NO$_6$S$_2$ [M+H]$^+$437.9634, found [M+H]$^+$437.9632.

3.5.2. Preparation of the Bioconjugates of Hapten (h-e)

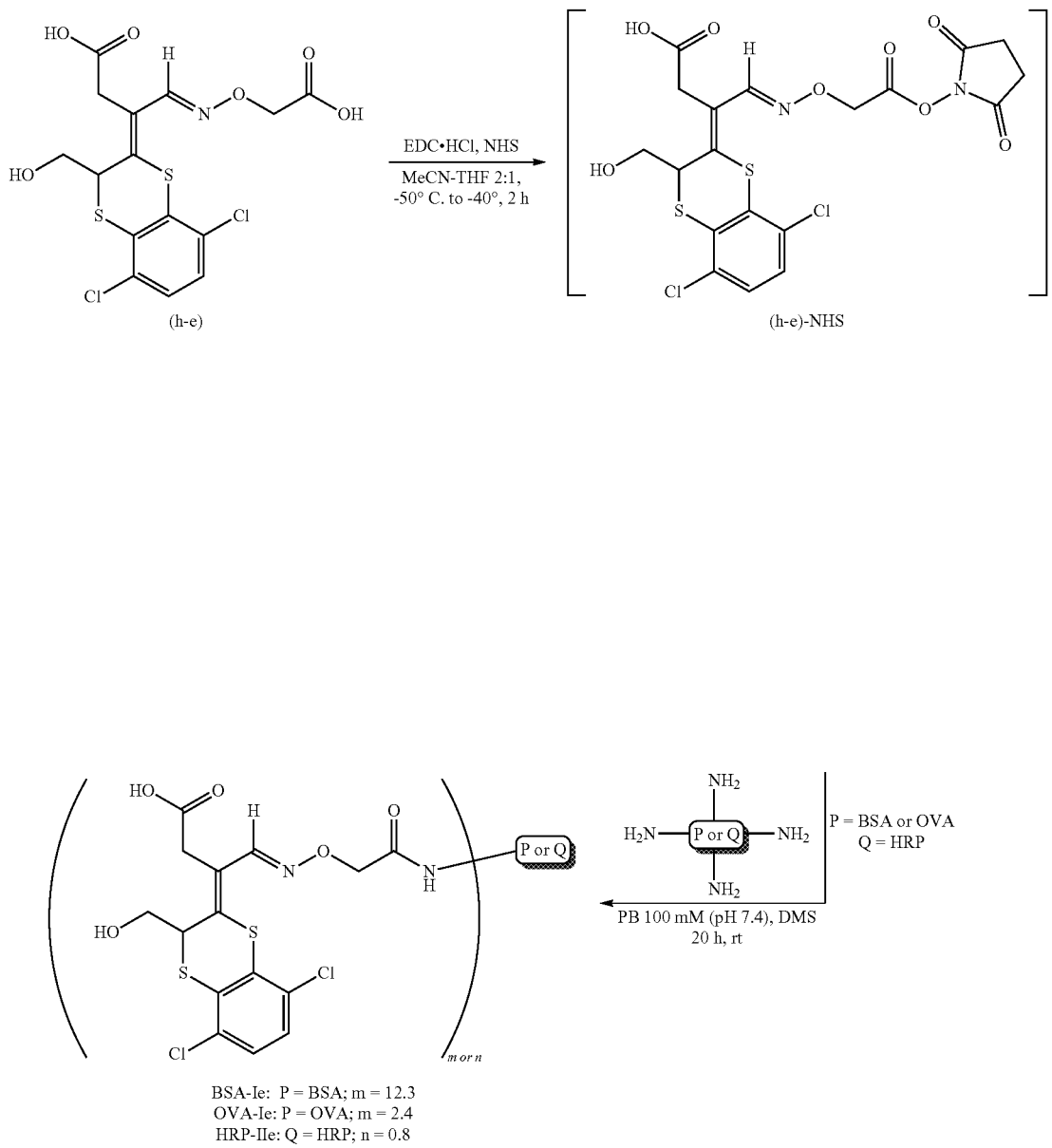

3.5.2.1. Activation of hapten (h-e).

Hapten (h-e) (6.7 mg, 0.015 mmol), EDC·HCl (2.9 mg, 0.015 mmol, 1 eq.) and NHS (1.7 mg, 0.015 mmol, 1 eq.) were weighed in a vial that was purged with nitrogen. The vial was cooled to −50° C. and a mixture of dry MeCN (300 µL) and THF (100 µL) was added, the resulting mixture was stirred for 2 hours, keeping the temperature between −45° C. and −40° C. Next, 5 mL of cold water was added and the mixture was extracted with EtOAc (10 mL×3), the combined organic phases were washed with brine (15 mL), dried over anhydrous MgSO$_4$, and concentrated under reduced pressure to give the active ester (h-e)-NHS (6.9 mg) as a yellow oil.

3.5.2.2. Preparation of the Bioconjugate of Hapten (h-e) with BSA [Bioconjugate BSA-Ie].

Prepared as described above for the BSA-Ia bioconjugate (section 3.1.2) from 132 µL of a 100 mM solution of the active ester of hapten (h-e) in DMSO and 0.97 mL of a solution of BSA (15 mg/mL) in 100 mM PB, pH 7.4. After the purification process, the collected fractions containing the BSA bioconjugate were combined, sterilized by filtration through a 0.45 µm nylon filter, brought to a final concentration of 1 mg/mL with filtered elution buffer, and stored at −20° C. The mean number of molecules of hapten (h-e) conjugated per each molecule of BSA, determined by MALDI-TOF-MS, was m=12.3 (see Table 2, entry 5).

3.5.2.3. Preparation of the Bioconjugate of Hapten (h-e) with OVA [Bioconjugate OVA-Ie]

Prepared as described above for the OVA-Ia bioconjugate (section 3.1.3) from 80 µL of a 50 mM solution of the N-hydroxysuccinimidyl ester of hapten (h-e) in DMSO and 1 mL of a solution of OVA (5 mg/mL) in 100 mM PB, pH 7.4. After chromatographic purification, the collected fractions were brought to a final concentration of 1 mg/mL in elution buffer with 0.01% (v/v) thimerosal and stored at −20° C. The mean number of molecules of hapten (h-e) conjugated per each molecule of OVA, determined by MALDI-TOF-MS, was m=2.4 (see Table 2, entry 15).

3.5.2.4. Preparation of the Bioconjugate of Hapten (h-e) with HRP [Bioconjugate HRP-IIe]

Prepared as described above for the HRP-IIa bioconjugate (section 3.4.5.) from 122 µL of a 20 mM solution of mixture of the active ester of hapten (h-e) in DMSO and 0.9 mL of a solution of HRP (3 mg/mL) in 100 mM PB, pH 7.4. After chromatographic purification, the fractions obtained containing the enzyme tracer were brought to known concentrations of between 250-650 µg/mL in PB with 1% BSA (v/v) and 0.02% (v/v) thimerosal and stored at 4° C. The mean number of molecules of hapten (h-e) conjugated per each molecule of HRP, determined by MALDI-TOF-MS, was n=0.8 (see Table 2, entry 22).

Example 3.6. Preparation of Bioconjugates of Formula (I) and (II) for T=R-II [(R$^1$=R$^3$=R$^4$=H, R$^2$=CH$_3$) and (R$^1$=R$^2$=R$^4$=H, R$^3$=CH$_3$)], L=N—O—CH$_2$—, Z=—(C=O)NH— and P=BSA (Bovine Serum Albumin) and OVA (Ovalbumin) and Q=HRP (Horseradish Peroxidase)

3.6.1. Preparation of (3Z,4E)-4-((carboxymethoxy) imino)-3-(3-(hydroxymethyl)-6-methylbenzo [b][1,4]dithiin-2(3H)-ylidene)butanoic and (3Z,4E)-4-((carboxymethoxy)imino)-3-(3-(hydroxyl methyl)-7-methylbenzo[b][1,4]dithiin-2(3H)-ylidene)butanoic acids [Hapten (h-f)]

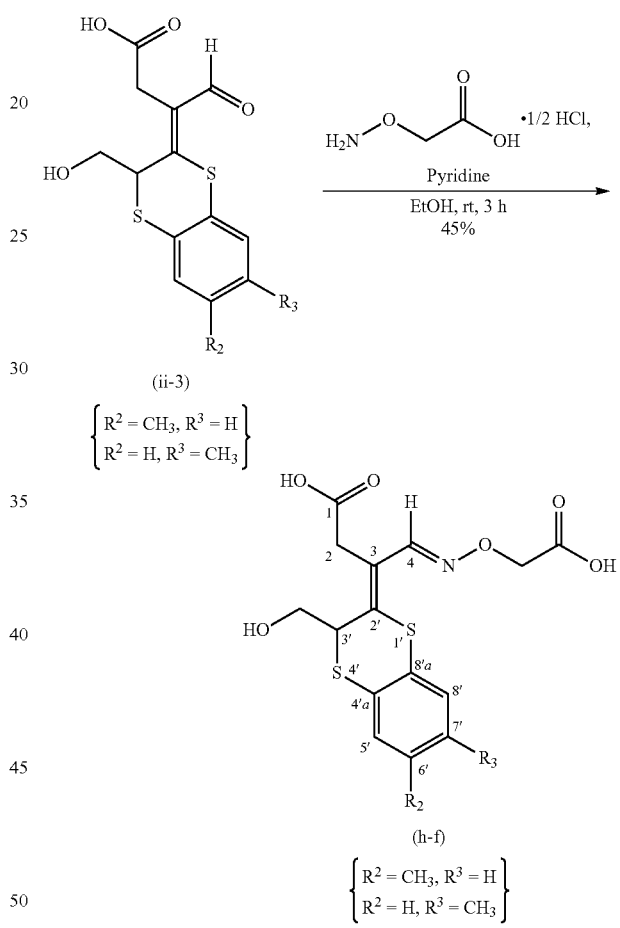

O-(Carboxymethyl)hydroxylamine hemihydrochloride (4.8 mg, 0.044 mmol, 1.3 eq.) was dissolved in a mixture of 0.2 mL of EtOH and pyridine (5.8 µL, 0.071 mmol, 2.1 eq.) in a round bottom flask equipped with a magnetic stir bar. To the resulting solution, a solution of the mixture of the adducts (ii-3) obtained in Example 2.3 (10.5 mg, 0.034 mmol) in 0.5 mL of EtOH was added dropwise. The mixture was stirred for 3 hours at room temperature.

Then, the solvent was evaporated in vacuo on a rotary evaporator and the residue obtained was suspended in 1 mL of a 1M aqueous solution of HCl cooled in an ice-water bath. The aqueous phase was extracted with EtOAc (10 mL×3), the combined organic extracts were washed with brine (15 mL), dried over anhydrous MgSO$_4$, and concentrated under reduced pressure. The resulting mixture was purified by flash column chromatography on silica gel, using a 95:5 mixture of CHCl$_3$-MeOH as eluent, to provide a mixture of haptens (h-f) as a yellow oil (5.8 mg, 45%).

Spectroscopic data of haptens (h-f): $^1$H NMR (500 MHz, acetone-d$_6$) δ (ppm) 10.80 (broad s, CO$_2$H), 8.53 and 8.528 (each s, each 0.5H, H-4), 7.18 (d, J=8.1 Hz, 0.5H, H-8'), 7.16 (d, J=8.1 Hz, 0.5H, H-5'), 7.13 (d, J=2.1 Hz, 0.5H, H-8'), 7.11 (d, J=2.1 Hz, 0.5H, H-5'), 7.02 (dd, J=8.1, 2.1 Hz, 0.5H, H-6'), 6.98 (dd, J=8.1, 2.1 Hz, 0.5H, H-7'), 4.67 and 4.66 (each s, each 1H, CH$_2$ON), 4.48 and 4.47 (each dd, J=7.9, 6.8 Hz, each 0.5H, H-3'), 3.69 and 3.66 (each dd, J=11.2, 7.9 Hz, 1H, CHOH), 3.69 and 3.63 (AB system, J=17.2 Hz, each 1H, H-2), 3.58 (dd, J=11.2, 6.6 Hz, 1H, CH'OH), 2.29 and 2.27 (each s, each 1.5H, CH3); $^{13}$C NMR (126 MHz, acetone-d$_6$) δ (ppm) 171.4 (CH, C1), 170.7 (C, CO$_2$H), 148.5, (C, C-2'), 148.5 (CH, C-4), 140.5 and 140.4 (C, C4'a), 137.4 and 137.2 (C, C-6'/C-7'), 131.3 and 130.8 (CH, C-5'), 130.7 and 128.1 (C, C-8'a), 128.3 and 128.1 (CH, C7'/C6'), 127.7 and 127.3 (CH, C-8'), 121.5 and 121.4 (C, C-3), 71.3 (CH$_2$ON), 63.5 and 63.4 (CH$_2$OH), 43.6 and 43.5 (CH, C-3'), 33.7 (CH$_2$, C-2), 20.8 and 20.7 (CH$_3$); IR v$_{max}$ (cm$^{-1}$) 3408m (broad), 2924s, 2118w, 1705s, 1631w, 1420m, 1358s, 1220s, 1094s; HRMS m/zcalculated for C$_{16}$H$_{18}$NO$_6$S$_2$ [M+H]$^{-+}$ 384.0570, found [M+H]$^{-+}$ 384.0582.

3.6.3. Preparation of the Bioconjugates of Hapten (h-f)

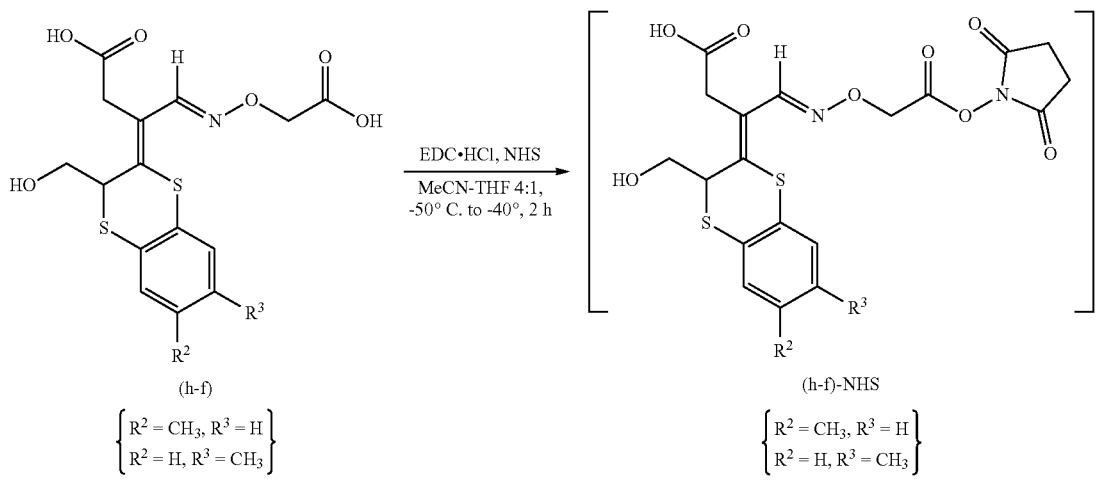

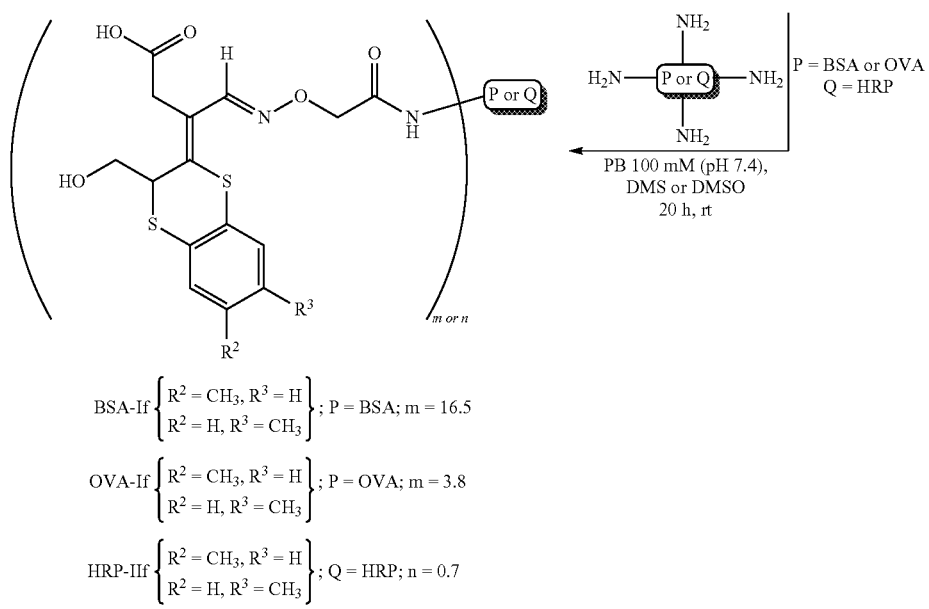

3.6.3.1. Activation of the Carboxylic Group of Hapten (h-f).

A mixture of anhydrous MeCN (350 μL) and THF (150 μL) was added under nitrogen over a mixture of the haptens (h-f) (11.8 mg, 0.031 mmol), EDC·HCl (5.9 mg, 0.031 mmol, 1 eq.) and NHS (3.6 mg, 0.031 mmol, 1 eq.), cooled to −50° C. and the resulting solution was stirred for 2 hours, keeping the temperature between −45° C. and −40° C. Next, 5 mL of cold water was added and the mixture was extracted with EtOAc (10 mL×3), the combined organic phases were washed with brine (15 mL), dried over anhydrous $MgSO_4$, and concentrated in vacuo on a rotary evaporator to give the active esters (h-f)-NHS (10.7 mg) as a yellow oil.

3.6.3.2. Preparation of the Bioconjugate of Haptens (h-f) with BSA [Bioconjugate BSA-If].

Prepared as described above for the bioconjugate BSA-Ia (section 3.1.2) from 132 μL of a 100 mM solution of the mixture of active esters (h-f)-NHS in DMSO and 0.97 mL of a solution of BSA (15 mg/mL) in 100 mM PB, pH 7.4. After the purification process, the collected fractions containing the BSA bioconjugate were combined, sterilized by filtration through a 0.45 μm nylon filter, and brought to a final concentration of 1 mg/mL with filtered elution buffer, and stored at −20° C. The mean number of molecules of haptens (h-f) conjugated per each molecule of BSA, determined by MALDI-TOF-MS, was m=16.5 (see Table 2, entry 6).

3.6.3.3. Preparation of the Bioconjugate of Haptens (h-f) with OVA [Bioconjugate OVA-If].

Prepared as described above for the OVA-Ia bioconjugate (section 3.1.3) from 120 μL of a 46 mM solution in DMF of the esters (h-f)-NHS and 1.85 mL of a solution of OVA (15 mg/mL) in 100 mM PB, pH 7.4. After chromatographic purification, the collected fractions were brought to a final concentration of 1 mg/mL in elution buffer with 0.01% (v/v) thimerosal and stored at −20° C. The mean number of molecules of hapten (h-f) conjugated per each molecule of OVA, determined by MALDI-TOF-MS, was m=3.8 (see Table 2, entry 16).

3.6.3.4. Preparation of the Bioconjugate of Haptens (h-f) with HRP [Bioconjugate HRP-IIf].

Prepared as described above for the HRP-IIa bioconjugate (section 3.4.5.) from 100 μL of a 4.6 mM solution of the mixture of the active esters of haptens (h-f) in DMF and 0.9 mL of a HRP solution (3 mg/mL) in 100 mM PB, pH 7.4. After chromatographic purification, the fractions obtained containing the enzyme tracer were brought to known concentrations of between 250-650 μg/mL in PBS buffer with 1% (w/v) BSA and 0.02% (w/v) thimerosal and stored at 4° C. The mean number of molecules of haptens (h-f) conjugated per each molecule of HRP, determined by MALDI-TOF-MS, was n=0.7 (see Table 2, entry 23).

Example 3.7. Preparation of Bioconjugates of Formula (I) and (II) for T=[($R^1$=$R^2$=$R^3$=$R^4$=H), L=N—O—$(CH_2)_5$—

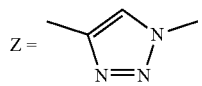

and P=BSA (Bovine Serum Albumin) and OVA (Ovalbumin) and Q=HRP (Horseradish Peroxidase)

3.7.1. Preparation of (3Z,4E)-4-(((5-azidopentyl)oxy)imino)-3-(3-(hydroxymethyl)benzo[b][1,4]dithiin-2(3H)-ylidene)butanoic acid [Hapten (h-g)]

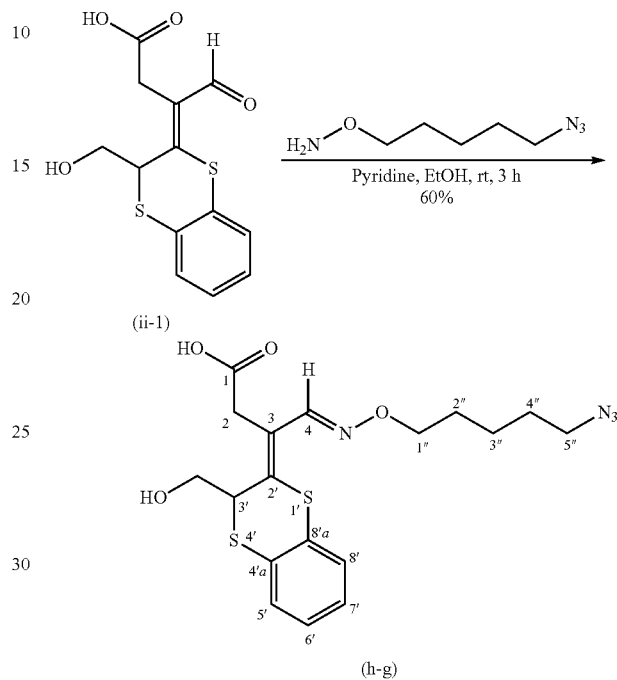

Anhydrous pyridine (6.0 μl, 0.073 mmol, 2.1 eq.) was added to a solution of the adduct (ii-1) (10.9 mg, 0.035 mmol) and O-(5-azidopentyl)hydroxylamine (6.8 mg, 0.047 mmol, 1.3 eq.) in 0.3 mL of EtOH under nitrogen atmosphere. The resulting mixture was stirred at room temperature for 3 hours. Then, the solvents were removed under reduced pressure, the residue obtained was treated with 1 mL of a cold 1M aqueous HCl solution, and extracted with EtOAc (10 mL×3). The combined organic phases were washed with brine (15 mL), dried over anhydrous $MgSO_4$, and concentrated under reduced pressure. The obtained residue was purified by flash silica gel chromatography, using a 98:2 mixture of $CHCl_3$-MeOH as eluent, to provide the hapten (h-g) (8.9 mg, 60%) as a clear oil.

Spectroscopic data of hapten (h-g): $^1$H NMR (300 MHz, acetone-$d_6$) δ (ppm) 8.44 (s, 1H, H-4), 7.28 (m, 2H, H-5' and H-8'), 7.17 (m, 2H, H-6' and H-7'), 4.52 (t, J=7.3 Hz, 1H, H-3'), 4.10 (t, J=6.5 Hz, 2H, H-1"), 3.73 and 3.66 (AB system, J=16.9 Hz, each 1H, H-2), 3.70 (dd, J=11.1, 7.8 Hz, 1H, CHOH), 3.59 (dd, J=11.1, 6.9 Hz, 1H, CH'OH), 3.35 (t, J=6.8 Hz, 2H, H-5"), 1.77-1.58 (m, 4H, H-2" and H-4"), 1.52-1.41 (m, 2H, H-3"); $^{13}$C NMR (75 MHz, acetone-$d_6$) δ (ppm) 171.7 (C, C-1), 146.9 (CH, C-4), 138.4 (C, C-2'), 128.4 (C, C-4'a), 130.9 (CH, C-8'), 131.1 (C, C-8'a), 127.5 (CH, C-6'), 127.3 (CH, C-7'), 127.0 (CH, C-5'), 122.4 (C, C-3), 74.8 ($CH_2$, C-1"), 63.5 ($CH_2OH$), 51.9 ($CH_2$, C-5"), 43.5 (CH, C-3'), 33.8 ($CH_2$, C2), 29.5 ($CH_2$, C-4"), 29.4 ($CH_2$, C-2"), 23.8 ($CH_2$, C-3"); IR $v_{max}$ ($cm^{-1}$) 3181m, 2939s, 2871m, 2096s, 1707s, 1455m, 1422m, 1217s, 1187s, 1108s, 1049s, 933s; HRMS m/z calculated for $C_{18}H_{23}N_4O_4S_2$ $[M+H]^{30}$ 423.1155, found $[M+H]^+$ 423.1149.

3.7.2. Preparation of Proteins and Enzymes Modified with Alkynyl Residues

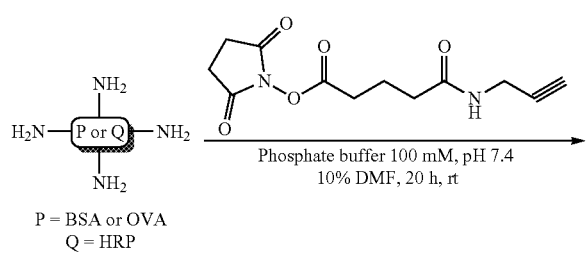

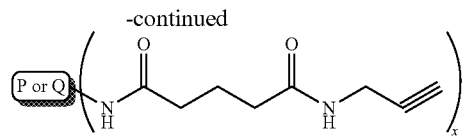

BSa-alkyne: P = BSA, x = 25.0
OVA-alkyne: P = OVA, x = 3.6
HRP-alkyne, Q = HRP, x = 0.4

The N-hydroxysuccinimidyl ester of 5-oxo-5-(prop-2-in-1-ylamino)pentanoic acid was dissolved in DMF and added dropwise to a solution of each protein (BSA, OVA) or enzyme (HRP) in 100 mM PB (pH 7.4). The molar ratios of alkyne to protein ($MR_0$) used in the reaction mixture were 40, 12 and 10 for the derivatization of BSA, OVA and HRP, respectively (see Table 1). The conjugation reaction was carried out with a maximum DMF content of 10% (v/v). After incubation overnight at room temperature, the alkynylated proteins were purified by size exclusion chromatography using a 15 mL Sephadex G-25 HiTrap® desalting column and 100 mM PB (pH 7.4) as eluent, at a flow of 5 mL/min and collecting fractions of 1 mL, and were stored at 4° C. until use. The mean number of incorporated alkyne residues to each molecule of protein/enzyme (hapten:protein molar ratio, MR) was calculated by MALDI-TOF-MS. The MRs obtained for BSA-alkyne, OVA-alkyne, and HRP-alkyne were 25.0, 3.6, and 0.4, respectively (see Table 2, entries 7, 17, and 24).

TABLE 1

Conditions for the preparation of alkyne modified proteins/enzymes

| | Protein | | | (alkyne)-NHS ester | | | |
|---|---|---|---|---|---|---|---|
| Bioconjugate | V (µL)[a] | C (mg/mL)[b] | n (µmol)[c] | V (µL)[d] | C (mM)[e] | n (µmol)[f] | Equivalents[g] |
| BSA-alkyne | 2500 | 16 | 0.61 | 160 | 150 | 24 | 40 |
| OVA-alkyne | 1900 | 15 | 0.64 | 50 | 154 | 7.7 | 12 |
| HRP-alkyne | 1670 | 3 | 0.11 | 23 | 50 | 1.1 | 10 |

[a]Used volume of protein/enzyme solution in 100 mM PB (pH 7.4).
[b]Concentration of protein/enzyme in PB.
[c]µmol of protein/enzyme used.
[d]Used volume of dissolution of (alkyne)-NHS ester in DMF.
[f]µmol of the (alkyne)-NHS ester used.
[g]Equivalents of (alkyne)-NHS ester used to protein equivalent (MR0).

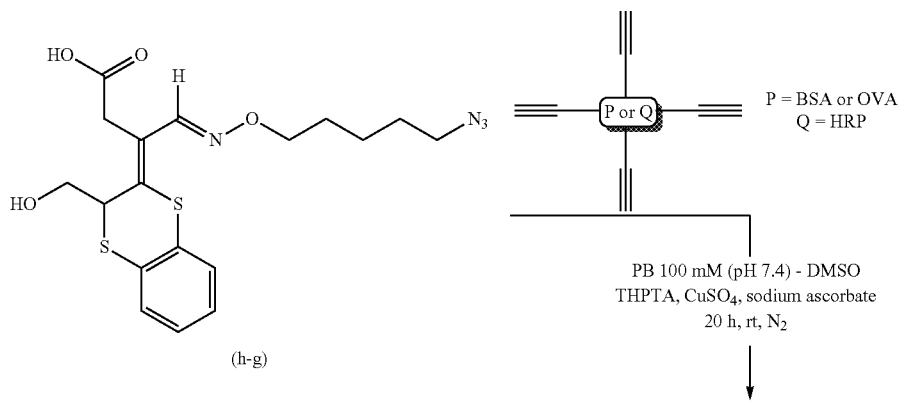

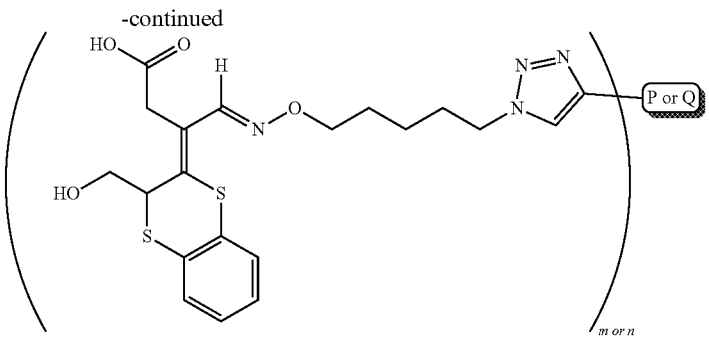

BSA-Ig: P = BSA; m = 16.0
OVA-Ig: P = OVA; m = 2.3
HRP-IIg: Q = HRP; n = 0.3

3.7.3. Preparation of the Bioconjugate of Hapten (h-g) with BSA [Bioconjugate BSA-Ig]

622.8 μL of a dissolution of hapten (h-g) (3.0 mg, 7.1 μmol, 2 hapten equivalents per alkyne residue) in DMSO were added dropwise over a solution of the BSA-alkyne described in section 3.7.2 (MR=25, 10 mg, 0.142 μmol) in 25 mL of PB 100 mM, pH 7.4, with stirring at room temperature. Then, to the resulting solution, 66.54 of a solution of THPTA (54.1 mM, 3.55 μmol, 1 equivalent per alkyne residue) and CuSO$_4$ (10.7 mM, 0.71 μmol, 0.2 equivalent per alkyne residue) in MiliQ H$_2$O were added dropwise. The resulting mixture was degassed by vacuum/nitrogen purges and 150 μL (10 equivalents per alkyne residue) of a 230 mM solution of sodium ascorbate in MiliQ H$_2$O, also previously degassed by vacuum/nitrogen purges, was added. The resulting solution was stirred for 22 hours at room temperature, and the BSA-Ig bioconjugate formed was separated from the rest of the reagents using Amicon® Ultra-4 10K filters. Three cycles of 20 min were carried out at 4800 rpm, using 100 mM PB, pH 7.4, obtaining a final volume of 2 mL. The BSA_Ig bioconjugate was purified by size exclusion chromatography on 3 coupled 5 mL Sephadex G-25 HiTrap desalting columns, using 100 mM PB, pH 7.4, as elution buffer. After the purification process, the collected fractions containing the BSA bioconjugate were collected, sterilized by filtration through a 0.45 μm nylon filter, and brought to a final concentration of 1 mg/mL with filtered elution buffer, and stored at −20° C. The mean number of molecules of hapten (h-g) conjugated per each molecule of BSA-alkyne, determined by MALDI-TOF-MS, was m=16 (see Table 1, entry 8).

3.7.4. Preparation of the Bioconjugate of Hapten (h-g) with OVA [Bioconjugate OVA-Ig]

The OVA-Ig bioconjugate was prepared as described in section 3.7.3. for the BSA analog bioconjugate, using solutions of OVA-alkyne (MR=3.6) in PB 100 mM (1.0 mg/mL, 6 mL, 0.12 μmol), hapten (h-g) in DMSO (11.4 mM, 153.5 μL, 1.75 μmol), THPTA (13.2 mM, 0.88 μmol)/CuSO$_4$ (2.71 mM, 0.18 μmol) in MiliQ H$_2$O (66.5 μL) and sodium ascorbate in MiliQ H$_2$O (230 mM, 40 μL, 8.8 μmol). The bioconjugate obtained after purification was brought to a final concentration of 1 mg/mL in PB and stored at −20° C. The mean number molecules of hapten (h-g) conjugated per each molecule of OVA-alkyne, determined by MALDI-TOF-MS, was m=2.3 (see Table 1, entry 18).

3.7.5. Preparation of the Bioconjugate of Hapten (h-g) with HRP [Bioconjugate HRP-1Ig]

The HRP-IIg bioconjugate was prepared as described in section 3.7.3. for the BSA analog bioconjugate, using solutions of HRP-alkyne (MR=0.4) in PB 100 mM (1.5 mg/mL, 1.33 mL, 45 nmol), hapten (h-g) in DMSO (10 mM, 18 μL, 180 nmol), THPTA (0.68 mM, 45 nmol)/CuSO$_4$ (0.135 mM, 9 nmol) in MiliQ H$_2$O (66.5 μL) and sodium ascorbate in MiliQ H$_2$O (10 mM, 45 μL, 450 nmol). The bioconjugate obtained after purification was brought to known concentrations of 250-650 μg/mL in PB with 1% (w/v) BSA and 0.02% (w/v) thimerosal and stored at 4° C. The mean number of molecules of hapten (h-g) conjugated per each molecule of HRP, determined by MALDI-TOF-MS, was n=0.3 (see Table 1, entry 25).

Example 3.8. Preparation of Bioconjugates of Formula (I) and (II) for T=R-II [(R$^1$=R$^4$=Cl, R$^2$=R$^3$=H), L=N—O—(CH$_2$)$_5$—

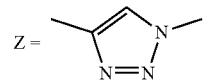

and P=BSA (Bovine Serum Albumin) and OVA (Ovalbumin) and Q=HRP (Horseradish Peroxidase)

3.8.1. Preparation of (3Z,4E)-4-(((5-azidopentyl)oxy)imino)-3-(5,8-dichloro-3-(hydroxymethyl)benzo[b][1,4]dithiin-2(3H)-ylidene)butanoic acid [Hapten (h-h)]

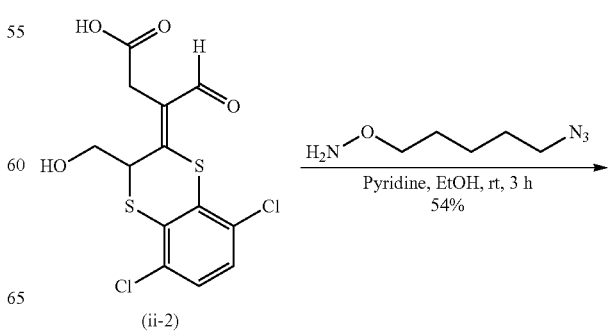

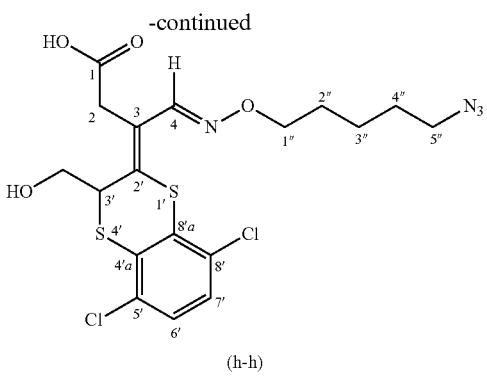

(h-h)

Anhydrous pyridine (5.3 μl, 0.065 mmol, 2.1 eq.) was added to a solution of the adduct (ii-2) (11.1 mg, 0.031 mmol) and O-(5-azidopentyl)hydroxylamine (7.5 mg, 0.052 mmol, 1.7 eq.) in 0.3 mL of EtOH under nitrogen. The mixture was stirred for 3 hours at room temperature and the solvents were removed under reduced pressure. The residue was treated with a cold 1M aqueous HCl solution and extracted with EtOAc (10 mL×3). The organic phases were combined and washed with brine (15 mL), dried over anhydrous MgSO$_4$, and concentrated in vacuo on a rotary evaporator. The resulting residue was purified by flash column chromatography, using a 98:2 mixture of CHCl$_3$-MeOH as eluent, to provide the hapten (h-h) (8.1 mg, 54%) as a yellow oil.

Spectroscopic data of hapten (h-h): $^1$H NMR (400 MHz, acetone-d$_6$) δ (ppm) 8.51 (s, 1H, H-4), 7.32 (AB system, J=8.7 Hz, each 1H, H-6' and H-7'), 4.72 (dd, J=8.2, 6.4 Hz, 1H, H-3'), 4.12 (t, J=6.4 Hz, 2H, H-1"), 3.81 and 3.70 (AB system, J=16.9 Hz, each 1H, H-2), 3.77 (dd, J=11.1, 8.2 Hz, 1H, CHOH), 3.68 (dd, J=11.1, 6.4 Hz, 1H, CH'OH), 3.35 (t, J=6.8 Hz, 2H, H-5"), 1.72 (pent, J=6.7 Hz, 2H, H-2"), 1.64 (pent, J=6.7H, 2H, H-4"), 1.48 (m, 2H, H-3"); $^{13}$C NMR (101 MHz, acetone-d$_6$) δ (ppm) 171.3 (C, C-1), 147.3 (CH, C4), 134.5 (C, C-2'), 130.6 (C, C-4'a), 132.3 (C, C8'a), 130.0 (C, C-8'), 129.7 (C, C-5'), 127.7 and 127.6 (each CH, C-6' and C-7'), 125.5 (C, C-3), 74.9 (CH$_2$, C-1"), 64.0 (CH$_2$OH), 51.9 (CH$_2$, C5"), 43.2 (CH, C-3'), 33.9 (CH$_2$, C-2), 29.3 (CH$_2$, C-4"), 29.2 (CH$_2$, C-2"), 23.9 (CH$_2$, C-3"); IR ν$_{max}$ (cm$^{-1}$) 3181m, 2939s, 2871m, 2098s, 1705s, 1403s, 1353m, 1217s, 1164s, 1071s, 1038s, 930s; HRMS m/z calculated for C$_{18}$H$_{21}$Cl$_2$N$_4$O$_4$S$_2$ [M+H]$^+$491.0376, found [M+H]$^+$ 491.0364.

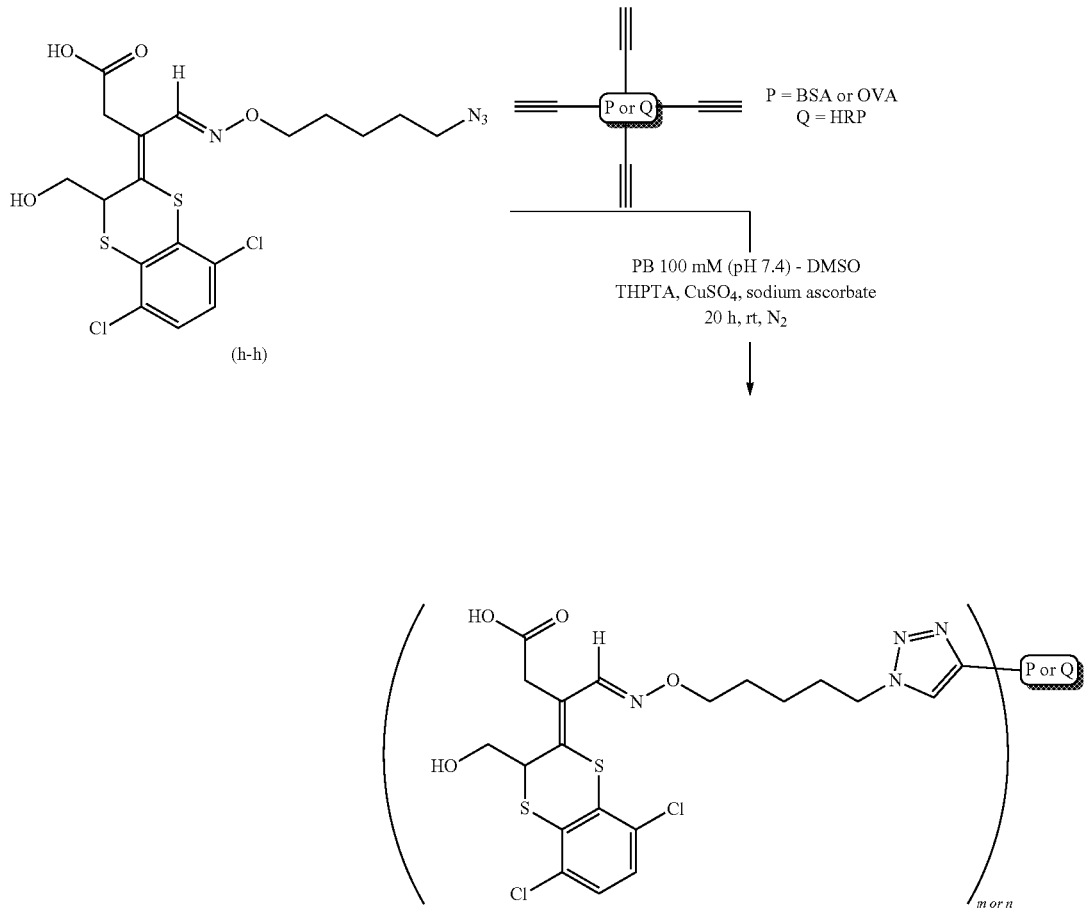

BSA-Ih: P = BSA; m = 20.9
OVA-Ih: P = OVA; m = 1.5
HRP-IIh: Q = HRP; n = 0.2

3.8.2. Preparation of the Bioconjugate of Hapten (h-h) with BSA [Bioconjugate BSA-Ih]

The BSA-Ih bioconjugate was prepared as described in section 3.7.3. for the BSA analog bioconjugate, using solutions of BSA-alkyne (MR=25.0) in 100 mM PB (4.44 mg/mL, 2.25 mL, 0.142 µmol), hapten (h-h) in DMSO (11.4 mM, 622.8 µL, 7.1 µmol), THPTA (54.1 mM, 3.6 µmol)/CuSO$_4$ (10.7 mM, 0.71 µmol), and sodium ascorbate in MiliQ H$_2$O (230 mM, 150 µL, 36 µmol). The bioconjugate obtained after purification was brought to a final concentration of 1 mg/mL in PB and stored at −20° C. The mean number of molecules of hapten (h-h) conjugated per each molecule of BSA-alkyne, determined by MALDI-TOF-MS, was m=20.9 (see Table 1, entry 9).

3.8.3. Preparation of the Bioconjugate of Hapten (h-h) with OVA [Bioconjugate OVA-Ih]

The OVA-Ih bioconjugate was prepared as described in section 3.7.3. for the BSA analog bioconjugate, using solutions of OVA-alkyne (MR=3.6) in 100 mM PB (1.0 mg/mL, 6 mL, 0.12 µmol), hapten (h-h) in DMSO (11.4 mM, 153.5 µL, 1.75 µmol), THPTA (13.2 mM, 0.88 µmol)/CuSO$_4$ (2.71 mM, 0.18 µmol) in MiliQ H$_2$O (66.5 µL), and sodium ascorbate in MiliQ H$_2$O (230 mM, 40 µL, 8.8 µmol). The bioconjugate obtained after purification was brought to a final concentration of 1 mg/mL in PB and stored at −20° C. The mean number of molecules of hapten (h-h) conjugated per each molecule of OVA-alkyne, determined by MALDI-TOF-MS, was m=1.5 (see Table 1, entry 19).

3.8.4. Preparation of the Bioconjugate of Hapten (h-h) with HRP [Bioconjugate HRP-IIh]

The HRP-IIh bioconjugate was prepared as described in section 3.7.3. for the BSA analog bioconjugate, using solutions of HRP-alkyne (MR=0.4) in 100 mM PB (1.5 mg/mL, 1.33 mL, 45 nmol), hapten (h-h) in DMSO (10 mM, 18 µL, 180 nmol), THPTA (0.68 mM, 45 nmol)/CuSO$_4$ (0.135 mM, 9 nmol) in MiliQ H$_2$O (66.5 µL), and sodium ascorbate in MiliQ H$_2$O (10 mM, 45 µL, 450 nmol). The bioconjugate obtained after purification was brought to known concentrations of 250-650 µg/mL in PB with 1% (w/v) BSA and 0.02% (w/v) thimerosal and stored at 4° C. The mean number of molecules of hapten (h-h) conjugated per each molecule of HRP, determined by MALDI-TOF-MS, was n=0.2 (see Table 1, entry 26).

Example 3.9. Preparation of Bioconjugates of Formula (I) and (II) for T=R-II [(R$^1$=R$^3$=R$^4$=H, R$^2$=CH$_3$) and (R$^1$=R$^2$=R$^4$=H, R$^3$=CH$_3$), L=N—O—(CH$_2$)$_5$—

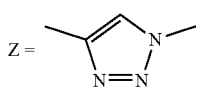

and P=BSA (Bovine Serum Albumin) and OVA (Ovalbumin) and Q=HRP (Horseradish Peroxidase)

3.9.1. Preparation of (3Z,4E)-4-(((5-azidopentyl)oxy)imino)-3-(3-(hydroxymethyl)-6-methyl benzo[b][1,4]dithiin-2(3H)-ylidene)butanoic and (3Z,4E)-4-(((5-azidopentyl)oxy)imino)-3-(3-(hydroxymethyl)-7-methylbenzo[b][1,4]dithiin-2(3H)-ylidene)butanoic acids [Hapten (h-i)]

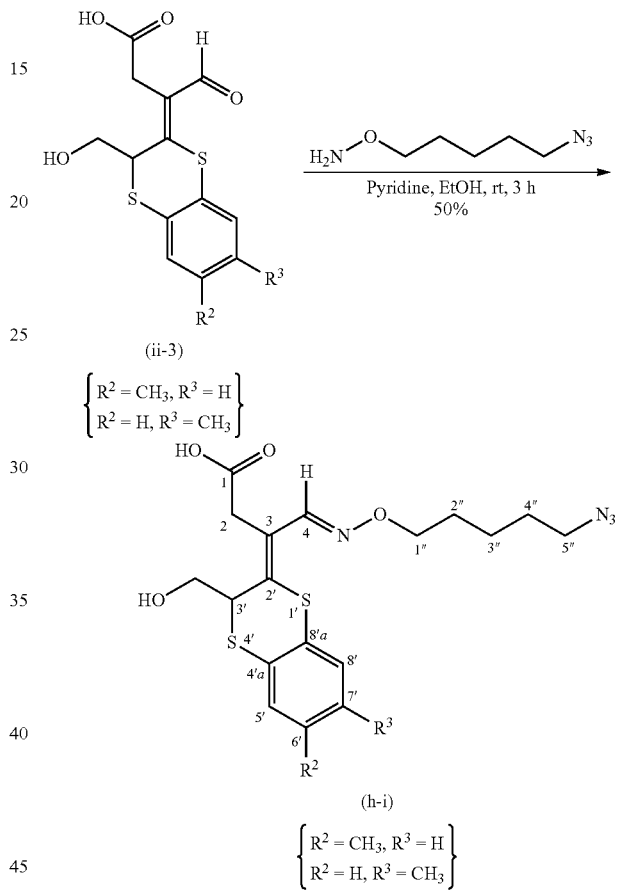

Dry pyridine (7.8 µL, 0.097 mmol, 2.1 eq.) was added to a solution of the adducts (ii-3) (14.2 mg, 0.046 mmol) and O-(5-azidopentyl)hydroxylamine (8.9 mg, 0.062 mmol, 1.3 eq.) in 0.4 mL of ethanol under nitrogen. The mixture was stirred for 3 hours at room temperature, the solvent was evaporated, the residue was suspended in 1 mL of a cold 1M aqueous HCl solution, and extracted with EtOAc (10 mL×3). The combined extracts were washed with brine (15 mL), dried over anhydrous MgSO$_4$, and concentrated in vacuo on a rotary evaporator. The resulting residue was purified by flash chromatography on silica gel, using a 95:5 mixture of CHCl$_3$-MeOH to provide the mixture of regioisomeric haptens (h-i) (10.0 mg, 50%) as a clear oil.

Spectroscopic data of haptens (h-i): $^1$H NMR (500 MHz, acetone-d$_6$) δ (ppm) 8.43 and 8.42 (each s, each 0.5H, H-4), 7.17 and 7.16 (each d, J=8.0 Hz, each 0.5H, H-5'/H-8'), 7.12 and 7.11 (each d, J=1.9 Hz, each 0.5H, H5'/H-8'), 7.01 and 6.98 (each dd, J=8.9, 1.9 Hz, each 0.5H, H-6'/H-7'), 4.48 (each t, J=7.0 Hz, each 0.5H, H-3'), 4.10 (t, J=6.4 Hz, 2H, H-1"), 3.71 and 3.66 (AB system, J=17.0 Hz, each 1H, H-2), 3.68 (dd, overlapped with signal at 3.66, 1 H, CHOH), 3.57 (dd, J=11.1, 7.0 Hz, 1H, CH'OH), 3.35 (t, J=6.8 Hz, 2H, H-5"), 2.28 and 2.27 (each s, each 1.5H, CH$_3$), 1.71 (quint, J=6.9 Hz, 2H, H-2"), 1.64 (quint, J=7.0 Hz, 2H, H-4"), 1.47 (tt, J=7.6, 7.1 Hz, 2H, H-3"); $^{13}$C NMR (126 MHz, acetone-d$_6$) (ppm) 171.7 and 171.6 (C, C-1), 147.0 (CH, C-4), 146.9 (C, C-2'), 138.8 and 138.7 (C, C4'a), 137.3 and 137.1 (C, C-6'/C-7'), 131.3 and 130.8 (CH, C-5'), 130.9 and 128.2 (C, C-8'a), 128.3 and 128.1 (CH, C-6'/C-7'), 127.7 and 127.3 (CH, C-8'), 122.2 and 122.1 (C, C-3), 74.8 and 74.7 (CH$_2$, C1"), 63.5 and 63.4 (CH$_2$OH), 51.9 (CH$_2$, C-5"), 43.7 and 43.6 (CH$_2$, C-3'), 33.8 (CH$_2$, C-2), 29.4 (CH$_2$, C-2" and C-4"), 23.8 (CH$_2$, C-3"), 20.8 and 20.7 (CH$_3$); IR v$_{max}$ (cm$^{-1}$) 3408m, 2937s, 2870m, 2096s, 1709s, 1468m, 1377m, 1216s, 1114s, 1051s, 937s; HRMS calculated for C$_{19}$H$_{25}$N$_4$O$_4$S$_2$ [M+H]$^+$ 437.1312, found [M+H]$^+$ 437.1305.

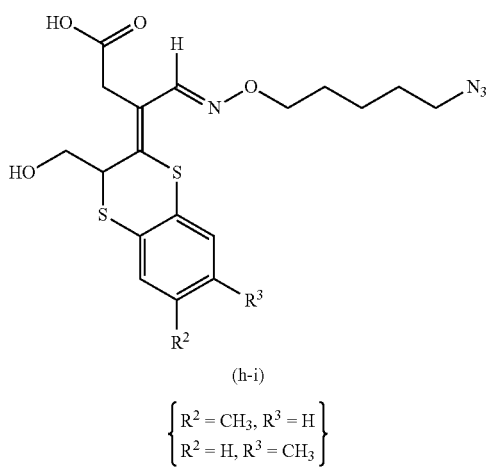

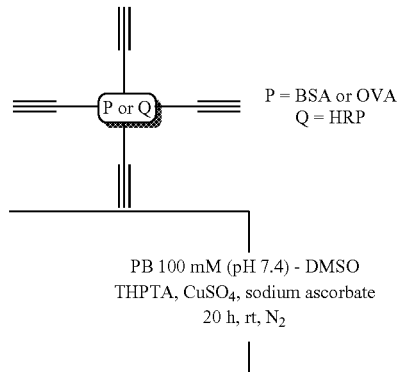

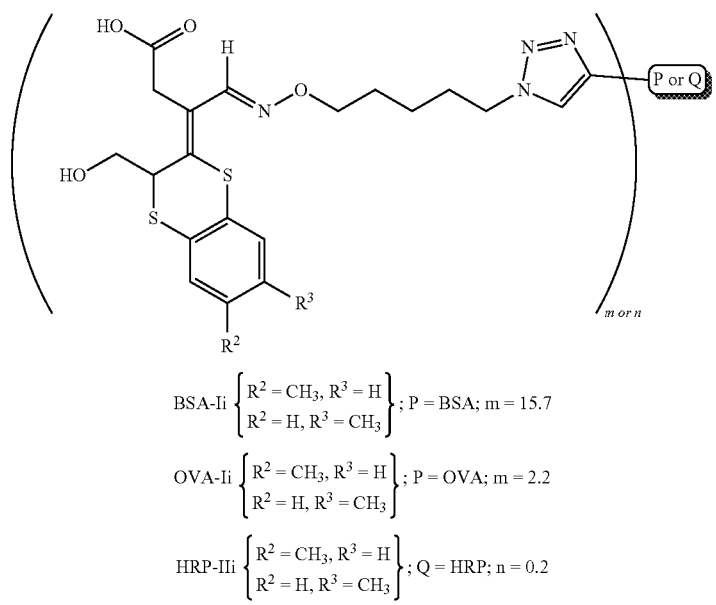

3.9.2. Preparation of the Bioconjugate of Haptens (h-i) with BSA [Bioconjugate BSA-Ii]

The BSA-Ii bioconjugate was prepared as described in section 3.7.3. for the BSA analog bioconjugate, using solutions of BSA-alkyne (MR=25.0) in 100 mM PB (4.44 mg/mL, 2.25 mL, 0.142 μmop, a mixture of haptens (h-i) in DMSO (11.4 mM, 622.8 μL, 7.1 μmol), THPTA (54.1 mM, 3.6 μmol)/CuSO$_4$ (10.7 mM, 0.71 μmol), and sodium ascorbate in MiliQ H$_2$O (230 mM, 150 μL, 36 μmol). The bioconjugate obtained after purification was brought to a final concentration of 1 mg/mL in PB and stored at −20° C. The mean number of molecules of hapten (h-i) conjugated per each molecule of BSA-alkyne, determined by MALDI-TOF-MS, was m=15.7 (see Table 1, entry 10).

3.9.3. Preparation of the Bioconjugate of Haptens (h-i) with OVA [Bioconjugate OVA-Ii]

The OVA-Ii bioconjugate was prepared as described in section 3.7.3. for the BSA analog bioconjugate, using solutions of OVA-alkyne (MR=3.6) in 100 mM PB (1.0 mg/mL, 6 mL, 0.12 μmol), a mixture of haptens (h-i) in DMSO (11.4 mM, 153.5 μL, 1.75 μmol), THPTA (13.2 mM, 0.88 μmol)/CuSO$_4$ (2.71 mM, 0.18 μmol) in MiliQ H$_2$O (66.5 μL), and sodium ascorbate in MiliQ H$_2$O (230 mM, 40 μL, 8.8 μmol). The bioconjugate obtained after purification was brought to a final concentration of 1 mg/mL in PB and stored at −20° C. The mean number of molecules of haptens (h-i) conjugated per each molecule of OVA-alkyne, determined by MALDI-TOF-MS, was m=2.2 (see Table 1, entry 20).

3.9.4. Preparation of the Bioconjugate of Haptens (h-i) with HRP [Bioconjugate HRP-IIi]

The HRP-IIi bioconjugate was prepared as described in section 3.7.3. for the BSA analog bioconjugate, using solutions of HRP-alkyne (MR=0.4) in 100 mM PB (1.5 mg/mL, 1.33 mL, 45 nmol), haptens (h-i) in DMSO (10 mM, 18 μL, 180 nmol), THPTA (0.68 mM, 45 nmol)/CuSO$_4$ (0.135 mM, 9 nmol) in MiliQ H$_2$O (66.5 μL) and sodium ascorbate in MiliQ H$_2$O (10 mM, 45 μL, 450 nmol). The bioconjugate obtained after purification was brought to known concentrations of 250-650 μg/mL in PB with 1% (w/v) BSA and 0.02% (w/v) thimerosal and stored at 4° C. The mean number of molecules of haptens (h-i) conjugated per each molecule of HRP, determined by MALDI-TOF-MS, was n=0.2 (see Table 1, entry 27).

TABLE 2

Determination by MALDI-TOF-MS of hapten charge in protein bioconjugates and enzyme tracers

| | Bioconjugate | MR$_0$ | m/z | ΔM | Δ(m/z) | m/n/x (MR) |
|---|---|---|---|---|---|---|
| 1 | BSA-Ia | 60 | 68525 | 278 | 1663 | 6.0 |
| 2 | BSA-Ib | 60 | 70174 | 346 | 3312 | 9.6 |
| 3 | BSA-Ic | 30 | 67892 | 292 | 1330 | 4.6 |
| 4 | BSA-Id | 60 | 71642 | 351 | 4954 | 14.1 |
| 5 | BSA-Ie | 60 | 71825 | 419 | 5137 | 12.3 |
| 6 | BSA-If | 60 | 72694 | 365 | 6006 | 16.5 |
| 7 | BSA-Alkyne | 40 | 70584 | 152 | 3866 | 25.4 |
| 8 | BSA-Ig | 50 | 77366 | 422 | 6782 | 16.0 |
| 9 | BSA-Ih | 50 | 79421 | 490 | 8837 | 20.9 |
| 10 | BSA-Ii | 50 | 78527 | 436 | 7673 | 15.7 |
| 11 | OVA-Ia | 10 | 25829$^a$ | 278 | 640 | 4.6$^b$ |
| 12 | OVA-Ib | 10 | 25837$^a$ | 346 | 648 | 3.7$^b$ |
| 13 | OVA-Ic | 10 | 25765$^a$ | 292 | 576 | 3.9$^b$ |
| 14 | OVA-Id | 35 | 26024$^a$ | 351 | 766 | 4.4$^b$ |
| 15 | OVA-Ie | 35 | 25753$^a$ | 419 | 495 | 2.4$^b$ |
| 16 | OVA-If | 9 | 27098$^a$ | 365 | 691 | 3.8$^b$ |
| 17 | OVA-Alkyne | 12 | 25477$^a$ | 152 | 270 | 3.6$^b$ |
| 18 | OVA-Ig | 15 | 25962$^a$ | 422 | 485 | 2.3$^b$ |
| 19 | OVA-Ih | 15 | 25841$^a$ | 490 | 3640 | 1.5$^b$ |
| 20 | OVA-Ii | 15 | 25958$^a$ | 436 | 481 | 2.2$^b$ |
| 21 | HRP-IId | 20 | 43845 | 351 | 281 | 0.8 |
| 22 | HRP-IIe | 20 | 43884 | 419 | 320 | 0.8 |
| 23 | HRP-IIf | 8 | 44217 | 365 | 265 | 0.7 |
| 24 | HRP-Alkyne | 10 | 43794 | 152 | 66 | 0.4 |
| 25 | HRP-IIg | 4 | 43901 | 422 | 107 | 0.3 |
| 26 | HRP-IIh | 4 | 43011 | 490 | 117 | 0.2 |
| 27 | HRP-IIi | 4 | 43874 | 436 | 80 | 0.2 |

MR$_0$: Adduct, hapten, or alkyne equivalents per protein molecule or enzyme tracer used for conjugation.
m: Mean number of molecules of hapten or adduct conjugated per molecule of protein; n: Mean number of molecules of hapten or adduct conjugated per molecule of enzyme; x: Mean number of molecules of alkyne conjugated per molecule of protein.
ΔM: Increase in mass per each molecule of conjugated adduct, hapten, or alkyne.
Δ(m/z): (m/z of the conjugate) − (m/z of the reference protein).
$^a$Doubly charged ion.
$^b$Calculation based on the doubly charged ion, (m, n, x) = [(ΔM/Δ(m/z)] × 2.

4. ELISA Procedure 96-well polystyrene plates were used. Each antibody obtained from bioconjugates of formula (I) of the present invention was evaluated in the two classic competitive ELISA formats (the immobilized antigen or conjugate with indirect detection and the immobilized antibody with direct detection) using homologous assay antigens, that is, an assay antigen from the same bioconjugate of formula (I) as that used to obtain the immunogen but wherein P=OVA or HRP, and also using heterologous assay antigens, that is, an assay antigen from a bioconjugate of formula (I) different from that used to obtain the immunogen and wherein P=OVA or HRP. After each incubation step, the plates were washed four times with a washing solution using a 96-channel ELx405 washer (Biotek Instruments, Winooski, USA). The signal produced by the peroxidase used as a label was revealed with 100 μL per well of a 2 mg/mL solution of o-phenylenediamine in 25 mM citrate buffer, 62 mM phosphate, pH 5.4, containing 0.012% (v/v) of H$_2$O$_2$. This development was run for 10 min at room temperature and stopped using 100 μL per well of 1 M sulfuric acid. At the end of the assays, the absorbance of each well was read at 492 nm using a reference wavelength of 650 nm in a PowerWave HT microplate reader (Biotek Instruments, Winooski, USA). The sigmoid standard curves obtained by plotting absorbance versus analyte concentration were fitted to a four parameter logistic equation using the SigmaPlot software package from SPSS (Chicago, USA).

The affinity of the antibodies was estimated from the IC$_{50}$ value, that is, the concentration of free analyte capable of reducing the maximum signal by half (Amax).

4.1. Competitive ELISA Assays with Immobilized Conjugate or Antigen Format with Indirect Detection (Indirect Assay)

The plates were coated with 100 μL per well of the assay antigen that is a bioconjugate of formula (I) where P is OVA, at 0.01, 0.1 or 1 μg/mL in 50 mM carbonate buffer, pH 9.6, by incubation overnight at room temperature. For the construction of the standard curve, serial dilutions of patulin in PBS were prepared and to each of them a 1% (v/v) of a solution in water of the salt of a compound of structure (i) was added. After incubating the patulin solutions for 1 hour at room temperature in the dark, 50 µL per well of each standard was dispensed in a column of the previously washed plates, followed by 50 µL per well of a specific antibody diluted in PBST. The immunochemical reaction was carried out for 1 hour at room temperature and then the plates were washed. Each well then received 100 µL of a 1/2000 dilution of RAM-HRP in PBST. This reaction was incubated at room temperature for 1 hour. After washing the plates, the retained peroxidase activity was revealed and the absorbance at 492 nm was read as described above.

4.2. Competitive ELISA Assays in Immobilized Antibody Format with Direct Detection (Direct Assay)

The plates were coated by adding 100 µL per well of a 1 mg/mL solution of anti-rabbit immunoglobulin antibody (in the case of antisera) or anti-mouse immunoglobulin antibody (in the case of monoclonal antibodies), in 50 mM carbonate buffer, pH 9.6. After incubation overnight at room temperature, the plates were washed, and 100 µL of a certain dilution of a particular antiserum in PBST, or a certain concentration of a particular monoclonal antibody in PBST, was added. After incubation for 1 hour at room temperature, the plates were washed, and 50 µL per well of a complete standard curve of the analyte in PBS, prepared as described above, was dispensed into each column, followed by 50 µL per well of a specific concentration of enzyme bioconjugate in PBST, which is a bioconjugate of formula (II) where P is HRP. The immunochemical reaction was carried out for 1 hour at room temperature and then the plates were washed. Finally, the retained peroxidase activity was revealed and the absorbance at 492 nm was read as described above.

5. Production of Polyclonal Antibodies. Rabbit Antisera

For the immunization of rabbits, the bioconjugates of formula (I) wherein P is BSA (immunizing conjugates) and T is R-II were used. Female New Zealand rabbits weighing approximately 2 kg were used. In each dose, 300 µg of bioconjugate was administered subcutaneously to each rabbit, the total administered volume being 1 mL. In the first immunization, the bioconjugate was provided in an emulsion prepared with complete Freund's adjuvant (1:1, v/v). At 3-week intervals, the animals received three additional immunizations, in these cases emulsifying the bioconjugates with incomplete Freund's adjuvant. 10 days after the fourth injection, the animals were exsanguinated and the serum was obtained after coagulation overnight at 4 degrees and subsequent centrifugation. The antisera thus obtained were precipitated 2 times with a volume of a saturated solution of ammonium sulfate and stored at 4° C.

6. Production of Mouse Monoclonal Antibodies

6.1. Immunization of Mice

For the immunization of mice, the bioconjugates of formula (I) wherein P is BSA (immunizing conjugates) and T is R-II were used. Female BALB/c mice (6-8 week old) were used. In each dose, 100 µg of bioconjugate was administered intraperitoneally to each mouse, the total administered volume being 200 µL. In the first immunization, the bioconjugate was provided in an emulsion prepared with complete Freund's adjuvant (1:1, v/v). At 3-week intervals, the mice received two additional immunizations, in these cases emulsifying the bioconjugates with incomplete Freund's adjuvant. Four days before each cell fusion, the selected mouse received a final dose of 100 µg of the corresponding bioconjugate diluted in PBS.

6.2. Cell Fusions for Hybridoma Generation

The fusions with the immunized mice were basically carried out following previously described and well-established methodologies in the state of the art. Immediately after euthanasia of the mice, the spleen was extracted and disaggregated with the plunger of a sterile syringe. After lysing the red blood cells by osmotic shock with 1 mL of lysis buffer for one minute, the lymphocytes were washed 2 times with cold complete medium (with serum) and they filtered to eliminate the formed clots.

The myeloma line P3-X63-Ag8.653 was cultivated the days prior to the fusion in DMEM-supplemented medium [2 mM L-alanine-L-glutamine, 1 mM non-essential amino acids, 25 µg/mL gentamicin, 10% (v/v) fetal bovine serum (FBS)], maintaining the cells in the exponential growth phase such that the day of the fusion there was a sufficient number of the same.

After two washes with serum-free medium, both cell populations were combined at a lymphocyte:myeloma ratio of 4:1. Then, the cells were centrifuged, to immediately afterwards carry out the cell fusion. To do so, the chemical fusing agent PEG 1500 (1 mL per spleen, 1 minute) was used, which upon partially dissolving the membranes enables the fusion of the cells. Once both populations have been fused, the cells were resuspended in DMEM-supplemented medium [15% (v/v) FBS] and were seeded into 96-well culture plates (100 µL per well) at a cellular density of $150\times10^3$ lymphocytes per well, and the plates were incubated at 37° C. in an atmosphere with 5% $CO_2$ and 95% humidity. Twenty-four hours after the fusion, 100 µL per well of HAT medium was added for hybridoma selection [DMEM-supplemented with 100 µM hypoxanthine, 0.4 µM aminopterin, 16 µM thymidine, 20% (v/v) FBS, and 1% (v/v) HFCS (hybridoma fusion and cloning supplement)].

6.3. Selection, Cloning, and Preservation of Hybridomas

Approximately 10-12 days after the cellular fusion, the evaluation of supernatants of the cultured wells was carried out with the aim of identifying those containing antibody-secreting hybridomas capable of recognizing the patulin adduct, which is a compound of structure (ii). Previously, the efficacy of the fusion was determined by visual inspection, defined as the percentage of wells that presented at least one clearly visible clone under microscope.

In order to carry out the identification of competitor clones, the culture supernatants were analyzed by a differential ELISA technique consisting of analyzing in adjacent wells, in a parallel manner, each supernatant in the absence of analyte and in the presence of a prefixed analyte concentration, usually 100 nM. For this purpose, the plates were coated with the homologous conjugate, which is a bioconjugate of formula (I) wherein P is OVA, at a concentration of 0.1 µg/mL, and the assay was carried out by adding 50 µL of the culture supernatant. The conditions for the indirect ELISA format are detailed in section 4.1.

Thereafter, the wells containing antibody-producing hybridomas capable of providing an absorbance signal equal to or greater than 0.5 in the assay in the absence of analyte and inhibiting the signal equal to or greater than 80% in the assay in the presence of analyte, were selected. Additionally, for all the wells with signals greater than 2.0, a more comprehensive second screening was carried out in a bidimensional competitive manner with the aim of selecting the best hybridomas with greater certainty. Therefore, the supernatant of each hybridoma was assayed at 4 dilutions (1/8, 1/32, 1/128, and 1/512) in plates coated with the homologous bioconjugate at 0.01 and 0.1 µg/mL, and using the patulin adduct of formula (ii) as competitor at 5 and 50 nM (in assay). Thus, 200 µL of the culture supernatant was diluted in 600 µL of PBST and the following dilutions were performed in a serial manner from this first dilution. The assay was performed by adding 50 µL per well of the corresponding dilution of supernatant and 50 µL of analyte solution in PBS at the concentration of 100, 10, and 0 nM.

The cells of the wells ultimately selected were cloned by limiting dilution method, seeding base on each well a new 96-well plate with 2 cells per well in HT medium, with the same composition as HAT but without aminopterin, and containing HFCS at 1% (v/v)

Generally, 7-10 days after the first cloning, the wells containing a single clone were visually identified, again evaluating the culture supernatant in the same way as previously described for fusion supernatants. This process was carried out as many times as was necessary (at least twice) to ensure the monoclonality of the hybridomas selected, as well as its stability. Lastly, the cell lines selected were expanded, progressively culturing the hybridoma in containers of a larger volume. Once the clone was grown, the cells were frozen in liquid nitrogen at a concentration of $10^7$ cells per vial (2-4 vials for each hybridoma) in a FBS solution with 10% (v/v) DMSO as the cryoprotective agent. The vials were kept at -80° C. inside a polystyrene box for 24 h before transferring them to a liquid nitrogen container.

6.4. Production and Purification of Monoclonal Antibodies

In the last phase of the cellular expansion, the hybridomas were progressively divided into culture plates until a final volume of between 100 and 200 mL of supernatant was reached.

The cells were left to grow until the confluence was reached, and once the culture medium was depleted of nutrients, the content of the plates was collected. The collected volume was centrifuged to eliminate cell remains and the supernatant was precipitated by adding a volume of an ammonium sulfate saturated solution, being stored at 4° C. until purification.

The purification of the antibodies was carried out by protein G column affinity chromatography following the manufacturer instructions. For this purpose, the precipitated antibody was centrifuged for 20 minutes at 5000 rpm (4000×g) and the supernatant was discarded. The precipitate that contained the antibodies was redissolved with 20 mM sodium phosphate buffer, pH 7.4, and filtered with nitrocellulose membranes (pore diameter 0.45 µm) to eliminate suspended particles. The elution of the antibody from the column was carried out with 100 mM sodium citrate buffer, pH 2.5. The fractions that contained the antibody were identified by means of UV spectrophotometry and were collected. The solution was neutralized by adding 1 M Tris-HCl, pH 9.5. Finally, the concentration of the purified antibody was determined by UV spectrophotometry and a working solution was prepared at a concentration of 500 µg/mL in PBS with 1% (w/v) BSA and 0.01% (w/v) thimerosal, which was stored at 4° C. The remaining solution was precipitated with saturated ammonium sulfate [1:1, (v/v)].

7. Results

7.1. Immune Response in Rabbits and Production of Antisera

By immunization of rabbits with bioconjugates of formula (I) wherein P is BSA and T is R-II (2 rabbits with each immunogen) a total of 12 antisera were obtained. Each antiserum was named with a code formed by the bioconjugate of formula (I) from which it derives [(Id), (Ie), (If), (Ig), (Ih), (Ii)], and a number (#1 or #2), and was assayed in indirect competitive ELISA using as assay antigens bioconjugates of formula (I) wherein P is OVA, at 0.1 and 1 µg/mL, and T is R-I or R-II. The characterization of the antisera is summarized in Tables 3-5. As it can be seen, all immunizing conjugates were capable of triggering an immune response characterized by the induction of antibodies that recognize the corresponding patulin adduct with nanomolar affinities (see $IC_{50}$ values). These results demonstrate the ability and utility of the bioconjugates of formula (I) to generate antisera useful for patulin analysis. That said, it should be mentioned that the lowest $IC_{50}$ values (highest affinity) were obtained with immunizing conjugates of formula (Ie) and (Ih), which shows that the bioconjugate of formula (I) that is more suitable for obtaining antibodies against patulin is not clear or obvious.

Regarding the behavior of the antisera in direct competitive ELISA, it was found that only those that come from immunizing conjugates of formula (Ie) and (Ih) provide adequate $A_{max}$ and $IC_{50}$ values for the development of immunoanalytical methods, thus again emphasizing the idea that not all bioconjugates of formula (I) are equally valid for the intended biotechnological application.

TABLE 3

Result of assays with rabbit antisera (rAs) by indirect competitive ELISA format in combination with conjugates derived from haptens Ie and Ih

| | OVA-Ie | | | OVA-Ih | | |
|---|---|---|---|---|---|---|
| rAs | Dilution rAs (×10³) | Amax | IC50 (nM) | Dilution rAs (×10³) | Amax | IC50 (nM) |
| Ie#1 | 100 | 1.59 | 24.97 | 30 | 1.42 | 15.44 |
| Ie#2 | 100 | 1.44 | 13.74 | 30 | 1.46 | 15.55 |
| Ih#1 | 100 | 1.59 | 30.94 | 100 | 1.13 | 31.14 |
| Ih#2 | 100 | 1.41 | 42.88 | 30 | 1.73 | 127.69 |
| Id#1 | 10 | 1.63 | >1000 | 10 | 0.49 | 41.54 |
| Id#2 | 10 | 0.91 | 94.89 | 10 | 0.49 | 29.97 |
| Ig#1 | 30 | 0.89 | 14.63 | 10 | 0.63 | 26.53 |
| Ig#2 | 30 | 1.11 | 157.27 | 10 | 0.58 | 153.98 |
| If#1 | 30 | 1.72 | 313.56 | 10 | 1.35 | 18.74 |
| If#2 | 30 | 1.21 | 63.93 | 10 | 1.13 | 9.05 |
| Ii#1 | 30 | 0.95 | 157.61 | 10 | 0.80 | 175.03 |
| Ii#2 | 30 | 0.83 | 65.35 | 10 | 0.80 | 21.56 |

TABLE 4

Result of the assays with rabbit antisera (rAs) by indirect competitive ELISA format in combination with conjugates derived from haptens If and Ii

| | OVA-If | | | OVA-Ii | | |
|---|---|---|---|---|---|---|
| rAs | Dilution rAs (×10³) | Amax | IC50 (nM) | Dilution rAs (×10³) | Amax | IC50 (nM) |
| Ie#1 | 100 | 0.97 | 5.41 | 30 | 1.44 | 7.98 |
| Ie#2 | 100 | 1.14 | 7.77 | 30 | 0.97 | 9.28 |
| Ih#1 | 100 | 0.89 | 7.98 | 100 | 0.74 | 12.38 |
| Ih#2 | 30 | 1.81 | 55.48 | 100 | 0.80 | 116.52 |
| Id#1 | 30 | 1.29 | 555.63 | 30 | 1.40 | 17.30 |
| Id#2 | 30 | 1.36 | 71.66 | 30 | 1.38 | 6.72 |
| Ig#1 | 30 | 0.81 | 37.79 | 100 | 0.82 | 63.49 |
| Ig#2 | 10 | 1.49 | 207.33 | 30 | 1.28 | 154.95 |
| If#1 | 100 | 1.39 | 33.46 | 100 | 0.86 | 262.24 |
| If#2 | 100 | 1.26 | 17.43 | 100 | 1.10 | 133.25 |
| Ii#1 | 100 | 0.92 | 40.12 | 100 | 1.17 | 195.13 |
| Ii#2 | 100 | 1.29 | 60.80 | 100 | 1.29 | 646.13 |

TABLE 5

Result of the assays with rabbit antisera (rAs) by indirect competitive ELISA format in combination with conjugates derived from haptens Id and Ig

| | OVA-Id | | | OVA-Ig | | |
|---|---|---|---|---|---|---|
| rAs | Dilution rAs (×10³) | Amax | IC50 (nM) | Dilution rAs (×10³) | Amax | IC50 (nM) |
| Ie#1 | 30 | 1.20 | 7.79 | 10 | 1.16 | 7.24 |
| Ie#2 | 30 | 1.43 | 7.49 | 30 | 1.00 | 3.44 |
| Ih#1 | 30 | 1.38 | 7.26 | 30 | 1.37 | 31.88 |
| Ih#2 | 10 | 1.41 | 48.68 | 10 | 1.51 | 174.33 |
| Id#1 | 100 | 0.93 | >1000 | 30 | 1.09 | 325.46 |
| Id#2 | 100 | 1.28 | 216.76 | 30 | 1.69 | 171.37 |
| Ig#1 | 100 | 0.73 | 62.72 | 100 | 0.84 | 134.25 |
| Ig#2 | 30 | 1.57 | 235.53 | 30 | 1.67 | 377.09 |
| If#1 | 100 | 1.22 | 32.78 | 30 | 1.31 | 16.01 |
| If#2 | 100 | 0.89 | 10.27 | 30 | 1.19 | 2.43 |
| Ii#1 | 30 | 1.58 | 53.97 | 100 | 1.01 | 65.70 |
| Ii#2 | 30 | 0.97 | 27.71 | 30 | 1.53 | 321.09 |

7.1. Generation of Hybridomas Producing Monoclonal Antibodies Against Patulin Adducts of Structure (ii)

From mice immunized with bioconjugates of formula (I) wherein P is BSA and T is R-II, cell fusions aimed at the generation of hybridomas were carried out. A total of 52 monoclonal antibody-producing cell lines capable of recognizing the corresponding patulin derivatives with an aryldithiol of formula (i) were obtained: 27 monoclonals from the bioconjugate of formula (Ie), 12 monoclonals from bioconjugates of formula (If), and 9 monoclonals from the bioconjugate of formula (Id). These results clearly demonstrate that the proposed approach enables the pursued objective, that is, the generation of antibodies capable of recognizing a patulin derivative of structure (ii), thus allowing its detection. The data also show that not all bioconjugates of formula (I) are equally useful for this purpose, since the number of hybridomas obtained from the bioconjugate of formula (Ie) was clearly higher than that obtained with the other bioconjugates. It should also be pointed out that the affinity for the patulin adducts of formula (ii-2) of the antibodies derived from the bioconjugate of formula (le) was clearly higher than that of the antibodies generated from the other bioconjugates. In short, these results also clearly show that the most suitable bioconjugate of formula (I) to obtain antibodies that allow the detection of patulin is not clear or obvious.

7.2. Determination of Antibody Affinity

Once purified, a selection of monoclonal antibodies derived from the bioconjugate of formula (Ie) was assayed by immunoassay to more accurately determine their affinity towards the patulin adduct of structure (ii-2). Assays were conducted in both direct and indirect formats. In the first case, the antibodies were assayed in combination with the enzyme bioconjugate of formula (IIe) (homologous bioconjugate, HRP-IIe), since it was the only tracer recognized by the antibodies. In the indirect format, the monoclonal antibodies were assayed in combination with all recognized bioconjugates of formula (I) where P is OVA. As it can be seen in the tables, the antibodies showed an excellent affinity for the patulin adduct, with $IC_{50}$ values comprised between 0.12 nM and 1.29 nM in the indirect format, and between 0.44 nM and 1.59 nM in the direct format.

TABLE 6

Result of the assays with monoclonal antibodies (mAb) by indirect competitive ELISA format in combination with conjugates derived from the haptens Ie, Id, and If.

| | OVA-Ie | | OVA-Id | | OVA-If | |
|---|---|---|---|---|---|---|
| mAb | $A_{max}$ | $IC_{50}$ (nM) | $A_{max}$ | $IC_{50}$ (nM) | $A_{max}$ | $IC_{50}$ (nM) |
| Ie#14 | 0.86 | 0.50 | 0.81 | 0.36 | 0.41 | 0.17 |
| Ie#18 | 0.96 | 0.56 | 0.93 | 0.43 | 0.46 | 0.16 |
| Ie#232 | 0.55 | 0.87 | 0.76 | 0.35 | — | — |
| Ie#235 | 0.37 | 0.45 | 0.88 | 0.48 | 0.33 | 0.12 |
| Ie#313 | 0.47 | 0.50 | 0.41 | 0.25 | 0.44 | 0.14 |
| Ie#319 | 0.47 | 0.37 | 0.54 | 0.19 | 0.57 | 0.13 |
| Ie#325 | 0.76 | 0.70 | 0.58 | 0.32 | 0.82 | 0.24 |
| Ie#332 | 0.52 | 1.29 | 0.78 | 0.90 | 0.91 | 0.73 |

TABLE 7

Result of the assays with the monoclonal antibodies (mAb) by direct competitive ELISA format with the homologous HRP-IIe bioconjugate

| mAb | [mAb] (µg/mL) | $A_{max}$ | $IC_{50}$ (nM) | [mAb] (µg/mL) | $A_{max}$ | $IC_{50}$ (nM) |
|---|---|---|---|---|---|---|
| Ie#14 | 1 | 0.63 | 0.82 | 0.1 | 0.31 | 0.56 |
| Ie#15 | 1 | 0.60 | 0.75 | 0.1 | 0.27 | 0.54 |
| Ie#18 | 1 | 0.85 | 0.80 | 0.1 | 0.44 | 0.52 |
| Ie#31 | 1 | 0.71 | 0.92 | 0.1 | — | — |
| Ie#34 | 1 | 0.72 | 0.59 | 0.1 | 0.59 | 0.87 |
| Ie#38 | 1 | 0.66 | 0.49 | 0.1 | 0.52 | 0.72 |
| Ie#220 | 1 | 1.35 | 1.59 | 0.1 | 0.49 | 0.96 |
| Ie#235 | 1 | 0.87 | 0.72 | 0.1 | 0.23 | 0.71 |
| Ie#237 | 1 | 1.34 | 1.28 | 0.1 | 0.48 | 0.44 |
| Ie#313 | 1 | 0.99 | 0.76 | 0.1 | 0.23 | 0.56 |
| Ie#327 | 1 | 1.49 | 1.10 | 0.1 | 0.40 | 1.05 |
| Ie#338 | 1 | 0.85 | 0.50 | 0.1 | — | — |

7.3. Determination of the Antibody Specificity

To demonstrate the specificity of the monoclonal antibodies, competitive ELISAs were carried out in which each antibody obtained from the BSA-Ie bioconjugate was assayed in combination with patulin, in combination with its corresponding adduct [compound (ii-2)], and in combination with sodium 3,6-dichlorobenzene-1,2-bis(thiolate), salt that when reacting with patulin originates the adduct (ii-2). The experiments showed conclusively that the antibodies only recognize the adduct of formula (ii-2) (FIG. 1), thus confirming that it is possible to determine patulin by means of the protected immunoreagents included in this patent application after a simple previous, rapid, and quantitative step, wherein a sample containing patulin is reacted with 1% (v/v) of a 1 mg/mL solution in water, for 60 minutes at room temperature, of a salt of a compound of formula (i) wherein $R^1$=Cl, $R^2$=H, $R^3$=H and $R^4$=Cl.

Equivalently, when specificity studies were performed with the rest of the monoclonal antibodies, it was found that those obtained from the BSA-Id bioconjugate only recognized the adduct of formula (ii-1), and that the antibodies obtained from the BSA-If bioconjugate only recognized the adduct of formula (ii-3). These results highlight the generality of the proposed approach to determine patulin by means of immunoanalytical methods.

8. Analysis of Patulin in Apple Juices by Means of Immunoassay

As proof of concept of the ability of the antibodies and conjugates disclosed in this patent to determine patulin, 3 competitive ELISAs were developed in the direct format and the patulin content of 2 certified juices containing different concentrations of the mycotoxin was analyzed. The samples analyzed were, (1) a natural apple juice, without clarification, supplied by Fera Science (code T1618QC) and whose patulin content certified by FAPAS (Food Analysis Performance Assessment Scheme) was 9.32 ng/mL, with an acceptable analytical range of 5.22-13.42 ng/mL (|z|≤2); (2) an apple juice from concentrate, supplied by LGC Standards (code 520, round BV280) and whose patulin content certified by the intercomparative study was 27.04±12.72 ng/mL.

The samples were diluted 50, 100 and 200 times with 75 mM Tris-HCl buffer, pH 7.4, and to each dilution was added 1% (v/v) of a 1 mg/mL solution in water of the potassium salt of 3,6-dichlorobenzene-1,2-bis(thiolate). The samples were incubated for 60 min at room temperature, and then analyzed by direct competitive ELISA using three monoclonal antibodies, mAb #235, mAb #313 and mAb #338, in combination with the HRP-IIe conjugate.

The three assays gave very similar patulin values, the mean analytical result being 7.78±0.28 ng/mL for the T1618QC sample, and 34.13±5.37 ng/mL for the 520-BV280 sample. These data provide unequivocal proof of the validity of the immunoreagents (antibodies and conjugates) described and of the immunoassays proposed for the quantitative analysis of patulin in apple juices.

The invention claimed is:

1. A bioconjugate of general formula (I):

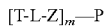  (I)

where:

T is selected from the group consisting of the radicals R-I and R-II wherein $R^1$, $R^2$, $R^3$, and $R^4$ are independently selected from H, substituted or unsubstituted aryl groups, linear or branched alkyl groups of 1 to 6 carbon atoms, OMe, OEt, OPr, C≡N, $CO_2H$, $CO_2$-alkyl of 1 to 6 carbon atoms, $NO_2$, $NH_2$, F, Cl, Br, and I

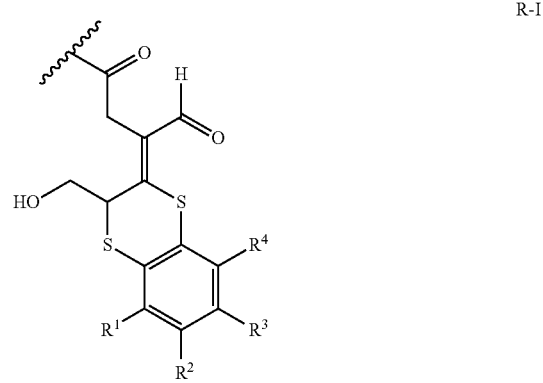

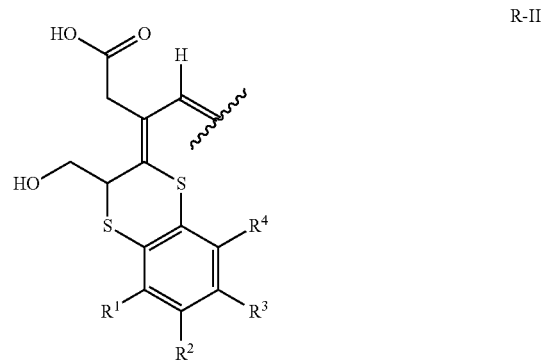

L is a hydrocarbon chain, saturated or unsaturated, of 0 to 14 carbon atoms, where the chain is linear or branched, and said hydrocarbon chain comprises the substitution of between 0 and 7 carbon atoms by heteroatoms, which are selected from the group consisting of S, O and N, Z is a functional group selected from:

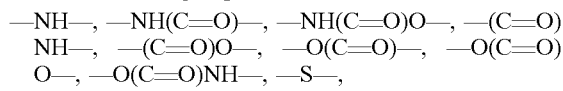

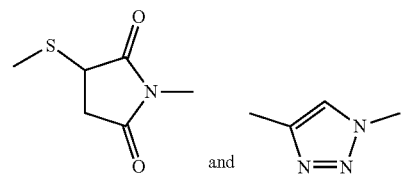

P is a natural or synthetic peptide or polypeptide, or a protein, with a molecular weight greater than 2000 daltons, m is a number with a value between 1 and 500.

2. The bioconjugate of formula (I) according to claim 1 wherein L is a linear hydrocarbon chain of 0 to 7 carbon atoms and said hydrocarbon chain comprises the substitution of between 0 and 3 carbon atoms by heteroatoms selected from the group consisting of O and N.

3. The bioconjugate of formula (I) according to claim 1, characterized in that Z is selected from the group consisting of:

—NH—, —NH(C=O)—, —(C=O)NH—,

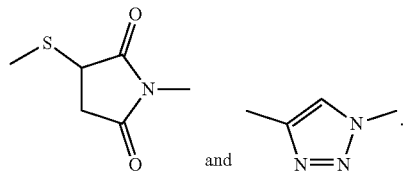 and

4. The bioconjugate of formula (I) according to claim 1 characterized in that L is a linear hydrocarbon chain of 0 to 3 carbon atoms and said hydrocarbon chain comprises the substitution of between 0 and 2 carbon atoms by heteroatoms selected from the group consisting of O and N.

5. The bioconjugate of formula (I) according to claim 1 characterized in that Z is —(C=O)NH—.

6. The bioconjugate of formula (I) according to claim 1, characterized in that P is selected from the group consisting of albumin, thyroglobulin, hemocyanin, beta-galactosidase, phosphatase, peroxidase, and oxidase.

7. The bioconjugate of formula (I) according to claim 1, characterized in that m is a number with a value between 1 and 50.

8. The bioconjugate of formula (I) according to claim 1, having the formula (Ia)

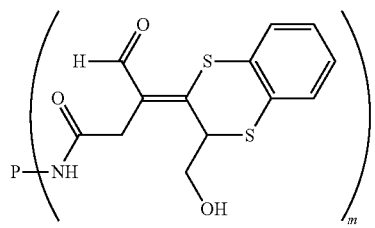

(Ia)

where P is selected from the group consisting of albumin or peroxidase, and m is a value selected between 1 and 50.

9. The bioconjugate of formula (I) according to claim 1, having the formula (Ib)

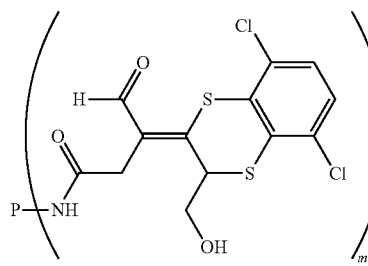

(Ib)

where P is selected from the group consisting of albumin or peroxidase, and m is a value selected between 1 and 50.

10. The bioconjugate of formula (I) according to claim 1, having the formula (Ic)

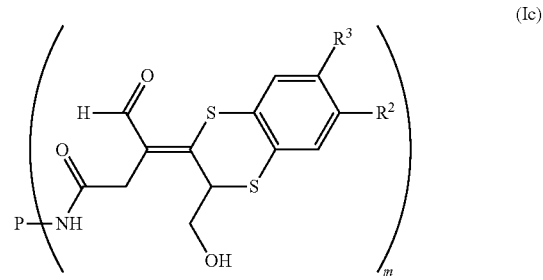

(Ic)

where P is selected from the group consisting of albumin or peroxidase, m is a value selected between 1 and 50, and where $R^2$ is $CH_3$ and $R^3$ is H, or $R^2$ is H and $R^3$ is $CH_3$.

11. The bioconjugate of formula (I) according to claim 1, having the formula (Id)

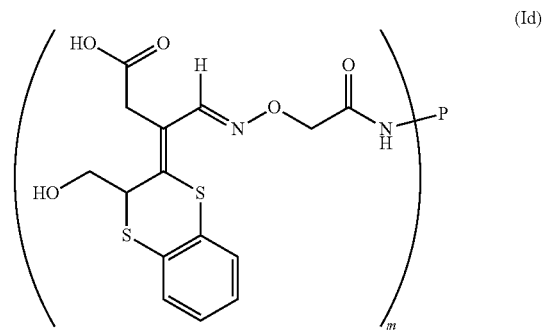

(Id)

where P is selected from the group consisting of albumin or peroxidase, and m is a value selected between 1 and 50.

12. The bioconjugate of formula (I) according to claim 1, having the formula (Ie)

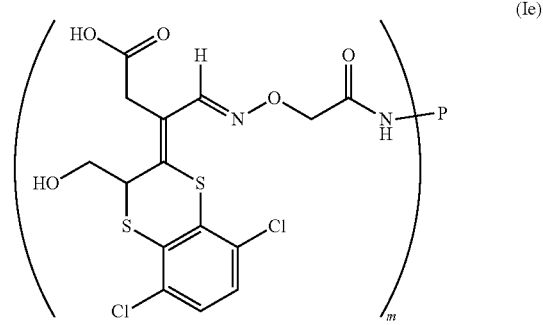

(Ie)

where P is selected from the group consisting of albumin or peroxidase, and m is a value selected between 1 and 50.

13. The bioconjugate of formula (I) according to claim 1, having the formula (If)

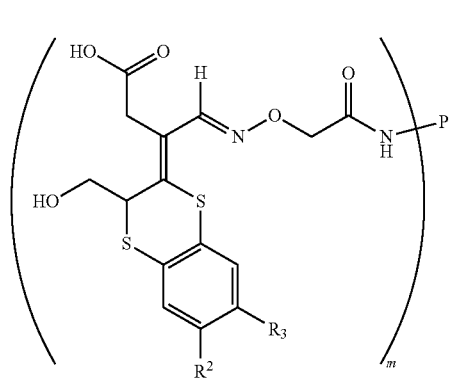

where P is selected from the group consisting of albumin or peroxidase, and m is a value selected between 1 and 50, and where $R^2$ is $CH_3$ and $R^3$ is H, or $R^2$ is H and $R^3$ is $CH_3$.

14. The bioconjugate of formula (I) according to claim 1, having the formula (Ig)

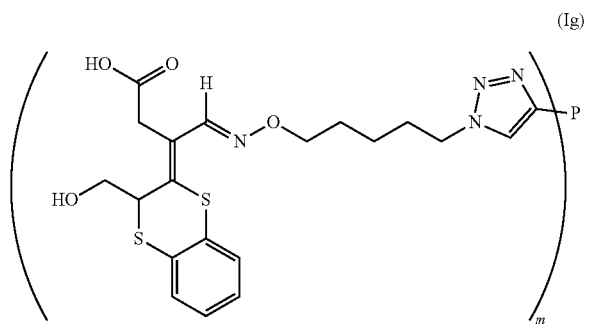

where P is selected from the group consisting of albumin or peroxidase, and m is a value selected between 1 and 50.

15. The bioconjugate of formula (I) according to claim 1, having the formula (Ih)

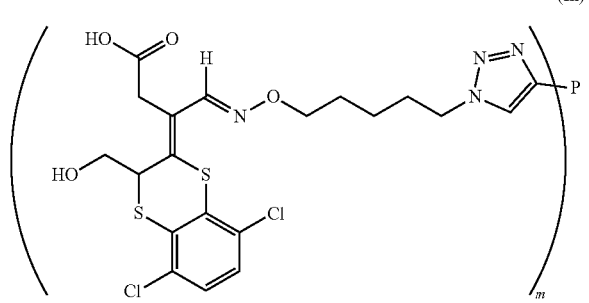

where P is selected from the group consisting of albumin or peroxidase, and m is a value selected between 1 and 50.

16. The bioconjugate of formula (I) according to claim 1, having the formula (Ii)

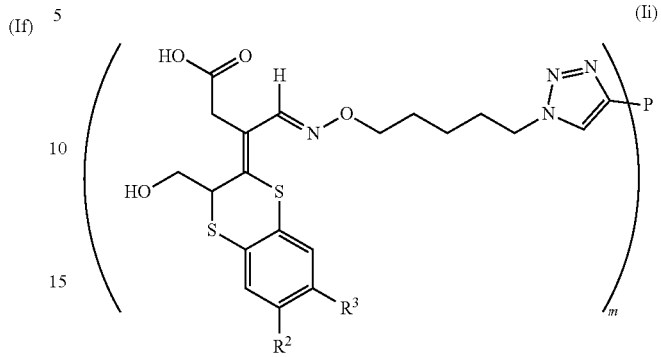

where P is selected from the group consisting of albumin or peroxidase, m is a value selected between 1 and 50, and where $R^2$ is $CH_3$ and $R^3$ is H, or $R^2$ is H and $R^3$ is $CH_3$.

17. A labeled derivative of formula (II):

$$[T\text{-}L\text{-}Z]_n\text{-}Q \quad (II)$$

wherein,
T and L have been defined according to claim 1; Z has been defined in claim 1; Q is a detectable label and n is a number with a value between 1 and 500.

18. The labeled derivative of formula (II) according to claim 17, where Q is selected from the group consisting of enzymes, biotin, fluorescein or any one of its derivatives, a cyanine fluorophore, a rhodamine fluorophore, a coumarin fluorophore, a ruthenium bipyryl, luciferin or any one of its derivatives, an acridinium ester, quantum nanoparticles (quantum dots), and micro- or nanoparticles of colloidal gold, carbon, or latex.

19. The labeled derivative of formula (II) according to claim 17 characterized in that Z is selected from the group consisting of

—NH—, —NH(C═O)—, —(C═O)NH—,

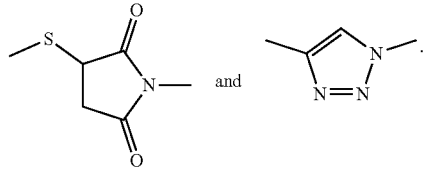

20. The bioconjugate of formula (II) according to claim 17, characterized in that m is a number with a value between 1 and 50.

21. The labeled derivative of formula (II) according to claim 17, having the formula (IIa)

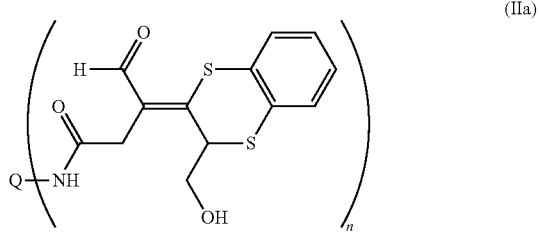

where Q is selected from the group consisting of peroxidase, biotin, fluorescein, or gold nanoparticles, and n is a value selected between 1 and 10.

22. The labeled derivative of formula (II) according to claim 17, having the formula (IIb)

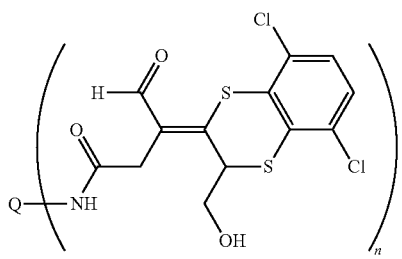

(IIb)

where Q is selected from the group consisting of peroxidase, biotin, fluorescein, or gold nanoparticles, and n is a value selected between 1 and 10.

23. The labeled derivative of formula (II) according to claim 17, having the formula (IIc)

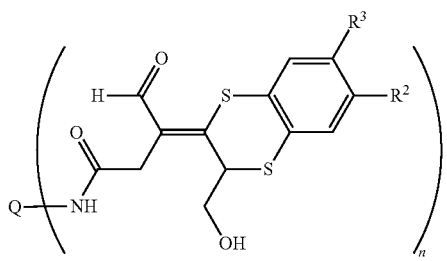

(IIc)

where Q is selected from the group consisting of peroxidase, biotin, fluorescein, or gold nanoparticles, n is a value selected between 1 and 10, and where $R^2$ is $CH_3$ and $R^3$ is H, or $R^2$ is H and $R^3$ is $CH_3$.

24. The labeled derivative of formula (II) according to claim 17, having the formula (IId)

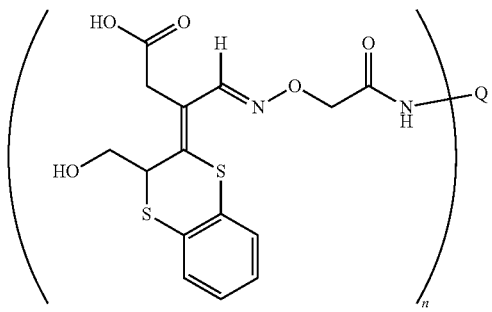

(IId)

where Q is selected from the group consisting of peroxidase, biotin, fluorescein, or gold nanoparticles, and n is a value selected between 1 and 10.

25. The labeled derivative of formula (II) according to claim 17, having the formula (IIe)

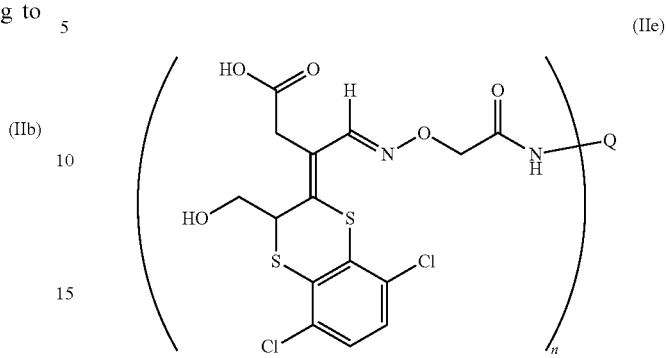

(IIe)

where Q is selected from the group consisting of peroxidase, biotin, fluorescein, or gold nanoparticles, and n is a value selected between 1 and 10.

26. The labeled derivative of formula (II) according to claim 17, having the formula (IIf)

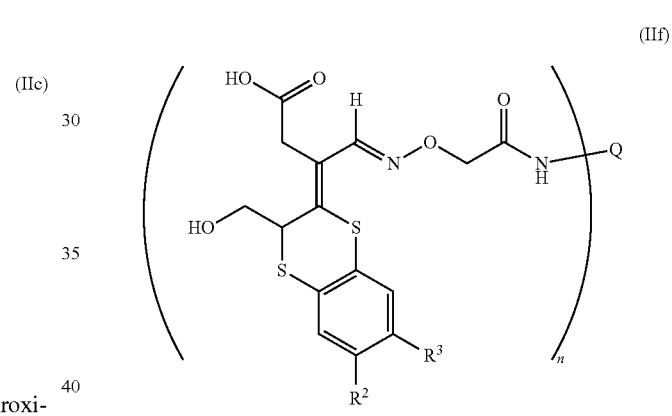

(IIf)

where Q is selected from the group consisting of peroxidase, biotin, fluorescein, or gold nanoparticles, n is a value selected between 1 and 10, and where $R^2$ is $CH_3$ and $R^3$ is H, or $R^2$ is H and $R^3$ is $CH_3$.

27. The labeled derivative of formula (II) according to claim 17, having the formula (IIg)

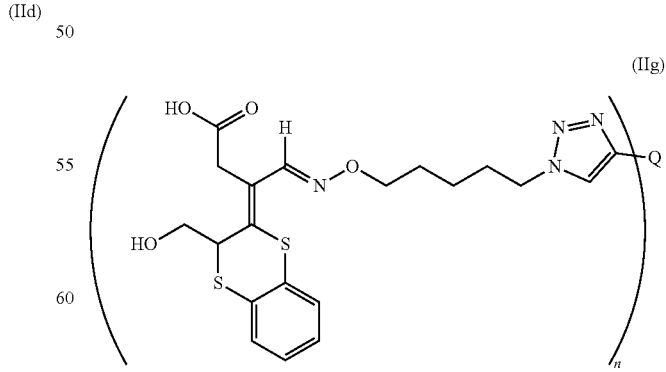

(IIg)

where Q is selected from the group consisting of peroxidase, biotin, fluorescein, or gold nanoparticles, and n is a value selected between 1 and 10.

28. The labeled derivative of formula (II) according to claim 17, having the formula (IIh)

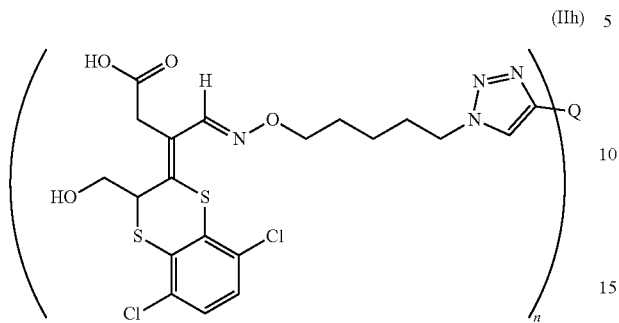

(IIh)

where Q is selected from the group consisting of peroxidase, biotin, fluorescein, or gold nanoparticles, and n is a value selected between 1 and 10.

29. The labeled derivative of formula (II) according to claim 17, having the formula (IIi)

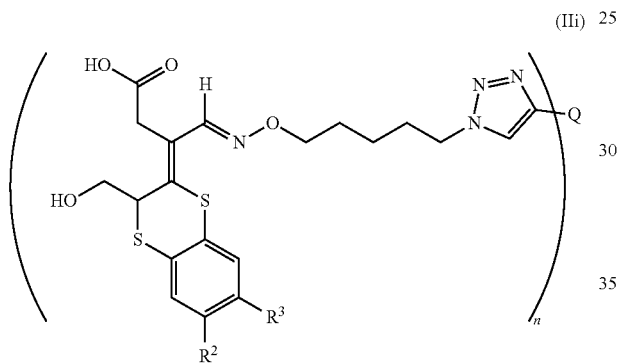

(IIi)

where Q is selected from the group consisting of peroxidase, biotin, fluorescein, or gold nanoparticles, n is a value selected between 1 and 10, and where $R^2$ is $CH_3$ and $R^3$ is H, or $R^2$ is H and $R^3$ is $CH_3$.

30. A method for obtaining an antibody that comprises using of a bioconjugate defined in claim 1.

31. A method for in vitro analysis of patulin in a sample comprising the use of an antibody obtained by using a bioconjugate as described in claim 1.

32. The method according to claim 31 which comprises the following steps:
a) Put in contact the sample to be analyzed with a benzene-1,2-dithiol of general formula (i) or its salts:

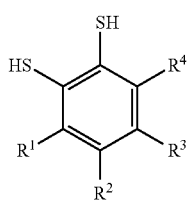

(i)

wherein $R^1$, $R^2$, $R^3$, and $R^4$ are independently selected from H, substituted or unsubstituted aryl groups, linear or branched alkyl groups of 1 to 6 carbon atoms, OMe, OEt, OPr, C≡N, $CO_2H$, $CO_2$-alkyl of 1-6 carbon atoms, $NO_2$, F, Cl, Br, and I;

b) incubate the sample of step (a) so that, in the event that the sample contains patulin, the chemical reaction of formation of the adduct of formula (ii) takes place:

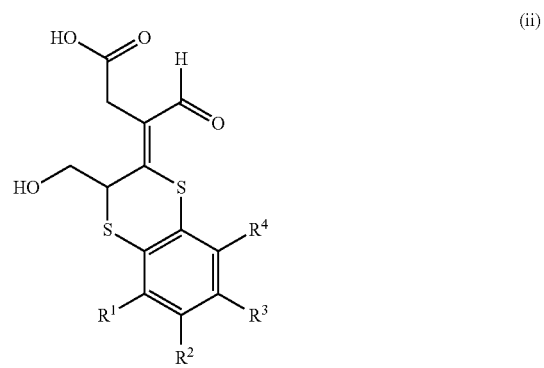

(ii)

wherein $R^1$, $R^2$, $R^3$, and $R^4$ are as defined for structure (i) in step (a);

c) put in contact the sample from step (b) with the antibody;
d) incubate the sample and the antibody of step (c);
e) determine if an immunochemical reaction has occurred after step (d) between the adduct of formula (ii) and the antibody.

33. The method according to claim 32, where the incubation time of steps (b) and (d) is greater than 5 minutes.

34. The method according to claim 32 in step (b) is carried out at temperatures between −20° C. and 60° C.

35. The method according to claim 32, wherein the determination of the immunochemical reaction in step (d) is carried out by means of a competitive assay, using as competitor the bioconjugate.

36. The method according to claim 32, wherein the determination of the immunochemical reaction in step (d) is carried out by means of a competitive assay, using as competitor a labeled derivative of formula (II):

[T-L-Z]n-Q   (II)

wherein, Q is a detectable label; n is a number with a value between 1 and 500; and T, L, and Z have the same meaning defined above for the bioconjugate of formula (I).

37. A kit for the detection and/or determination of patulin, which comprises a benzene-1,2-dithiol or its salts as described in claim 34, section a, and one or more of the antibody obtained by using the bioconjugate together with the bioconjugate of formula (I) or together with a labeled derivative of formula (II):

[T-L-Z]n-Q   (II)

wherein, Q is a detectable label; n is a number with a value between 1 and 500; and T, L, and Z have the same meaning defined above for the bioconjugate of formula (I).

* * * * *